June 13, 1950 H. W. BALZER 2,511,145

OPERATOR REGISTER-SENDER CONTROLLED TELEPHONE SWITCHING SYSTEM

Filed Jan. 13, 1948 17 Sheets-Sheet 1

INVENTOR.
Harvey W. Balzer

BY
Smith, Olsen & Baird

Attys

June 13, 1950 | H. W. BALZER | 2,511,145

OPERATOR REGISTER-SENDER CONTROLLED TELEPHONE SWITCHING SYSTEM

Filed Jan. 13, 1948 | 17 Sheets-Sheet 2

INVENTOR.
Harvey W. Balzer

BY
Smith, Olsen & Baird
Attys.

June 13, 1950 H. W. BALZER 2,511,145

OPERATOR REGISTER-SENDER CONTROLLED TELEPHONE SWITCHING SYSTEM

Filed Jan. 13, 1948 17 Sheets-Sheet 3

*INVENTOR.*
Harvey W. Balzer

*BY*
Smith, Olsen + Baird

Attys.

INVENTOR.
Harvey W. Balzer
BY
Smith, Olsen & Baird
Attys.

June 13, 1950

H. W. BALZER

OPERATOR REGISTER-SENDER CONTROLLED TELEPHONE SWITCHING SYSTEM 2,511,145

Filed Jan. 13, 1948

17 Sheets-Sheet 5

INVENTOR.
Harvey W. Balzer

BY
Smith, Olsen + Baird

Attys

June 13, 1950 H. W. BALZER 2,511,145

OPERATOR REGISTER-SENDER CONTROLLED TELEPHONE SWITCHING SYSTEM

Filed Jan. 13, 1948 17 Sheets-Sheet 6

INVENTOR.
Harvey W Balzer
BY
Smith, Olsen & Baird
Atty.

June 13, 1950 H. W. BALZER 2,511,145

OPERATOR REGISTER-SENDER CONTROLLED TELEPHONE SWITCHING SYSTEM

Filed Jan. 13, 1948 17 Sheets-Sheet 7

INVENTOR.
Harvey W. Balzer
BY
Smith, Olsen & Baird
Attys.

June 13, 1950 H. W. BALZER 2,511,145

OPERATOR REGISTER-SENDER CONTROLLED TELEPHONE SWITCHING SYSTEM

Filed Jan. 13, 1948 17 Sheets-Sheet 8

INVENTOR.
Harvey W. Balzer

BY
Smith, Olsen & Baird

Attys

June 13, 1950 H. W. BALZER 2,511,145

OPERATOR REGISTER-SENDER CONTROLLED TELEPHONE SWITCHING SYSTEM

Filed Jan. 13, 1948 17 Sheets-Sheet 9

INVENTOR.
Harvey W. Balzer

BY Smith, Olsen + Baird

Attys.

June 13, 1950

H. W. BALZER

OPERATOR REGISTER-SENDER CONTROLLED
TELEPHONE SWITCHING SYSTEM 2,511,145

Filed Jan. 13, 1948

17 Sheets-Sheet 10

INVENTOR.
Harvey W. Balzer

BY

Smith, Olsen + Baird

Attys.

June 13, 1950

H. W. BALZER
OPERATOR REGISTER-SENDER CONTROLLED
TELEPHONE SWITCHING SYSTEM 2,511,145

Filed Jan. 13, 1948

17 Sheets-Sheet 11

*INVENTOR.*
Harvey W. Balzer

*BY*
Smith, Olsen + Baird

Attys

INVENTOR.
Harvey W. Balzer
BY
Smith, Olsen + Baird
Attys.

June 13, 1950

Filed Jan. 13, 1948

H. W. BALZER
OPERATOR REGISTER-SENDER CONTROLLED
TELEPHONE SWITCHING SYSTEM 2,511,145

17 Sheets-Sheet 13

INVENTOR.
Harvey W. Balzer
BY
Smith, Olsen & Baird
Attys

INVENTOR.
Harvey W. Balzer
BY
Smith, Olsen & Baird
Attys.

June 13, 1950 H. W. BALZER 2,511,145

OPERATOR REGISTER-SENDER CONTROLLED TELEPHONE SWITCHING SYSTEM

Filed Jan. 13, 1948 17 Sheets-Sheet 15

INVENTOR.
Harvey W Balzer
BY
Smith, Olsen & Baird
Attys

INVENTOR.
Harvey W. Balzer
BY
Smith, Olsen & Baird
Attys

INVENTOR.
Harvey W. Balzer
BY
Smith, Olsen + Baird
Attys

Patented June 13, 1950

2,511,145

UNITED STATES PATENT OFFICE 2,511,145

OPERATOR REGISTER-SENDER CONTROLLED TELEPHONE SWITCHING SYSTEM

Harvey W. Balzer, Downers Grove, Ill., assignor to Automatic Electric Laboratories, Inc., Chicago, Ill., a corporation of Delaware Application January 13, 1948, Serial No. 2,116

40 Claims. (Cl. 179—27)

Figure 1:
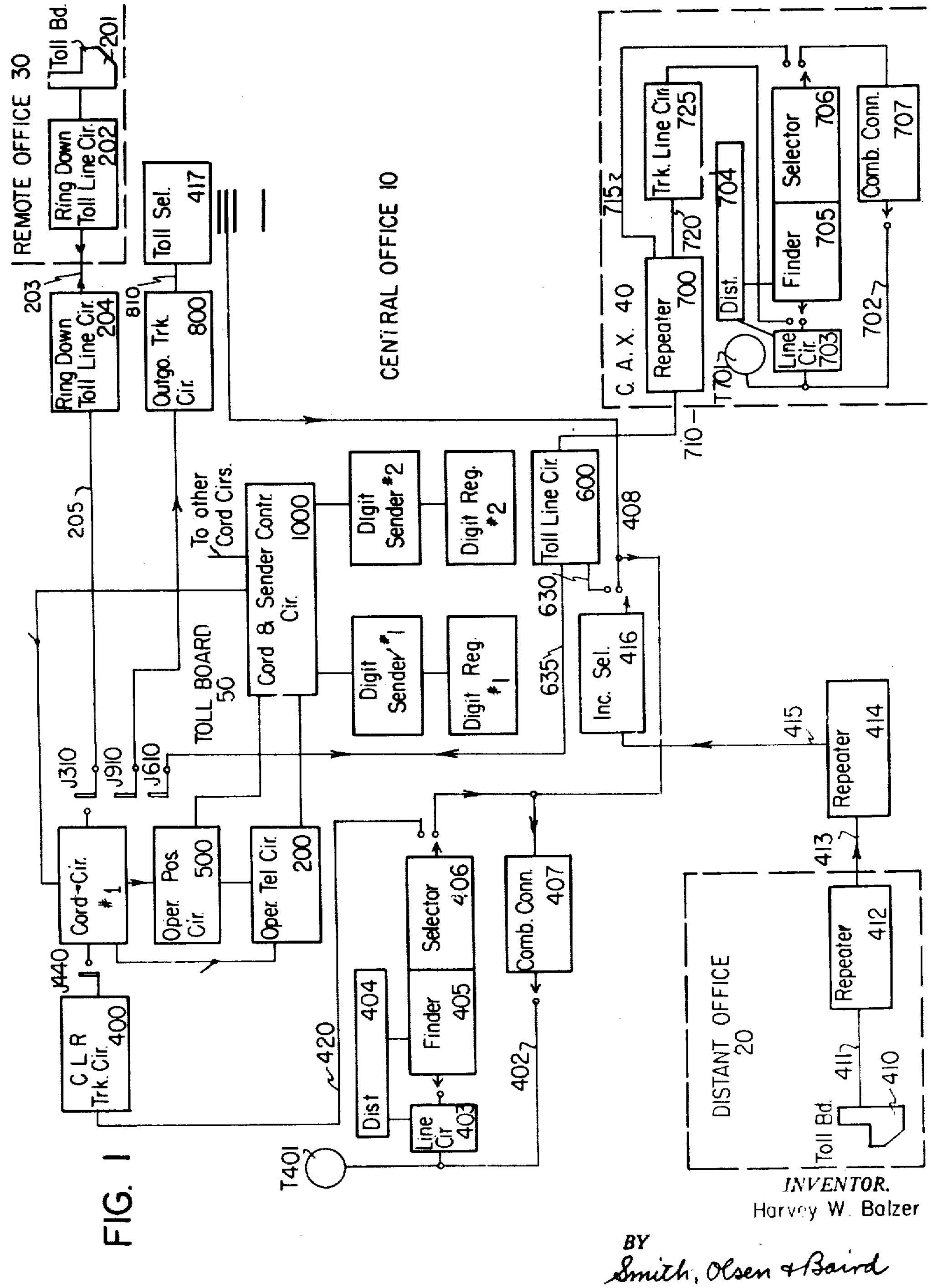

The present invention relates to toll switching systems and more particularly to such systems including switchboards of the cord circuit type provided with register-sender apparatus.

It is an object of the present invention to provide in a toll switching system including a switchboard of the cord circuit type, an improved register-sender arrangement controllable from the switchboard and operative to send digits over a cord circuit thereat to associated automatic switching apparatus.

Another object of the invention is to provide a toll switching system of the character noted, wherein the sender comprises improved facility for releasing the associated register in the event registration of the digits at the switchboard is begun before the connected link or cord circuit thereat has been connected to the associated automatic switching apparatus.

Another object of the invention is to provide a toll switching system of the character noted, wherein the sender comprises improved facility for releasing the associated register in the event the connected link or cord circuit at the switchboard is disconnected from the associated automatic switching apparatus prior to the sending of all of the digits registered in the register.

Another object of the invention is to provide a toll switching system of the character noted, wherein the sender comprises improved facility for releasing the associated register in response to the operation of a release device or error key at the switchboard.

Another object of the invention is to provide in an automatic telephone system, a sender comprising improved facility responsive to the return of delay and ready signals from the associated switching apparatus for selectively controlling the sending operations thereof.

Another object of the invention is to provide in an automatic telephone system, a sender comprising improved facility responsive to the return of a busy signal from the associated switching apparatus for releasing the associated register.

A further object of the invention is to provide a sender of the character noted, wherein the various timing intervals required therein for control purposes are obtained by operation of a set of counting relays therein through corresponding counting cycles, which set of counting relays is also employed for counting impulses incident to sending of a digit from the sender.

A further object of the invention is to provide in a toll switching system including a switchboard, an improved arrangement responsive to the connection of a link at the switchboard to a trunk for producing an immediate delay signal and then for producing a ready signal only after automatic switching apparatus has been associated with the trunk and is in readiness to receive a digit.

A further object of the invention is to provide in a toll switching system including a switchboard provided with a link circuit of the three-conductor type, an improved arrangement for superimposing all of the control and supervisory signals upon a hold signal on the third or control conductor of the link circuit.

A still further object of the invention is to provide in a toll switching system including repeaters or trunk circuits terminating the opposite ends of a trunk, improved facility in the repeaters for transferring control and supervisory signals therebetween.

Further features of the invention pertain to the particular arrangement of the circuit elements of the system, whereby the above-outlined and additional operating features thereof are attained.

*Sect. 1.—The general arrangement of the telephone system*

The invention, both as to its organization and method of operation, together with further objects and advantages thereof, will best be understood by reference to the following specification taken in connection with the accompanying drawings, in which Figure 1 is a schematic diagram of the area served by a telephone system embodying the present invention and illustrating the general arrangement of the apparatus incorporated in several of the offices and the exchange thereof; Figs. 2 to 17, inclusive, taken together, illustrate the details of certain of the apparatus incorporated in the telephone system, which apparatus has embodied therein the features of the invention as briefly outlined above; and Fig. 18 illustrates the mode of combining Figs. 2 to 17, inclusive, to form a unified diagram.

Figures 2, 18:
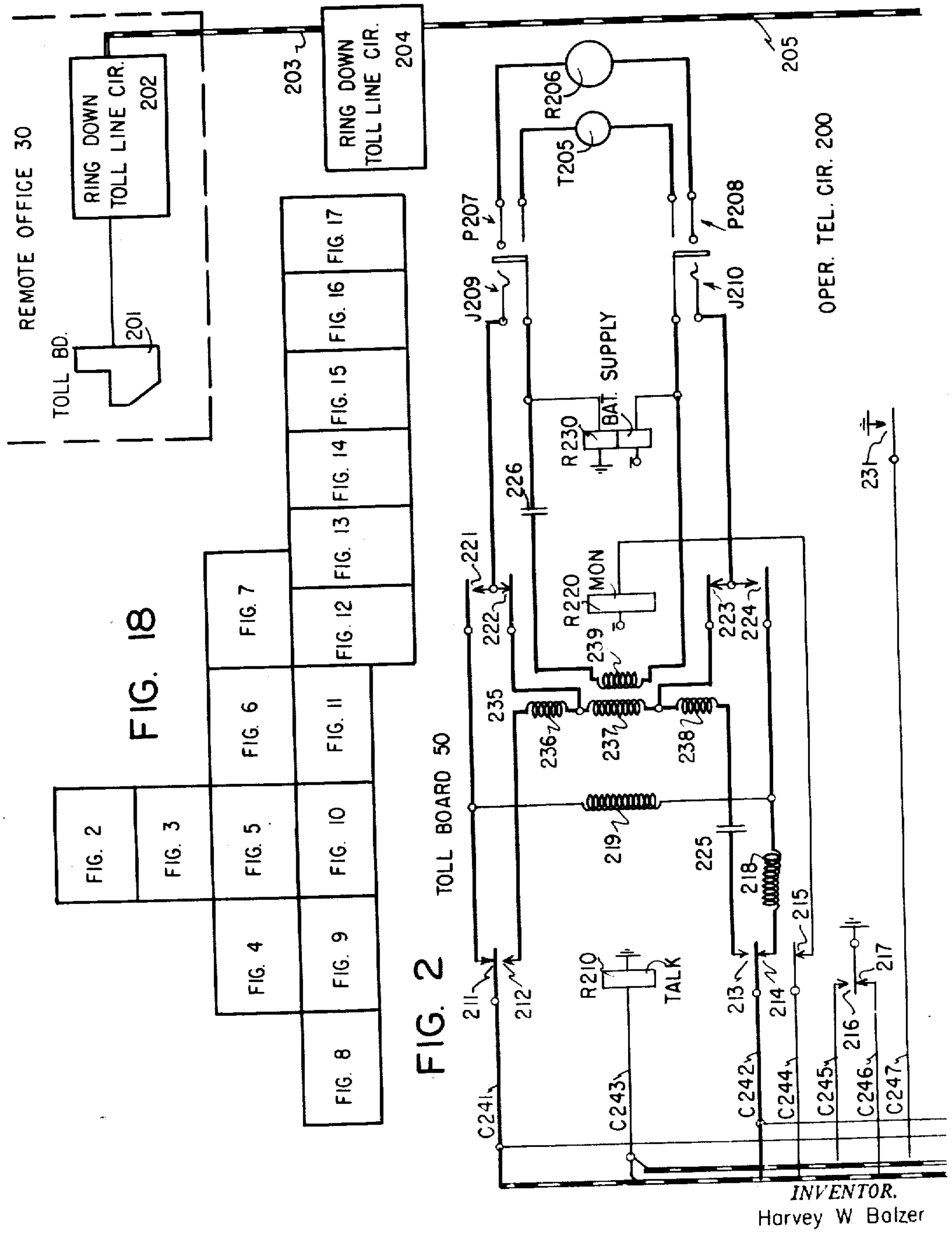
Figure 3:
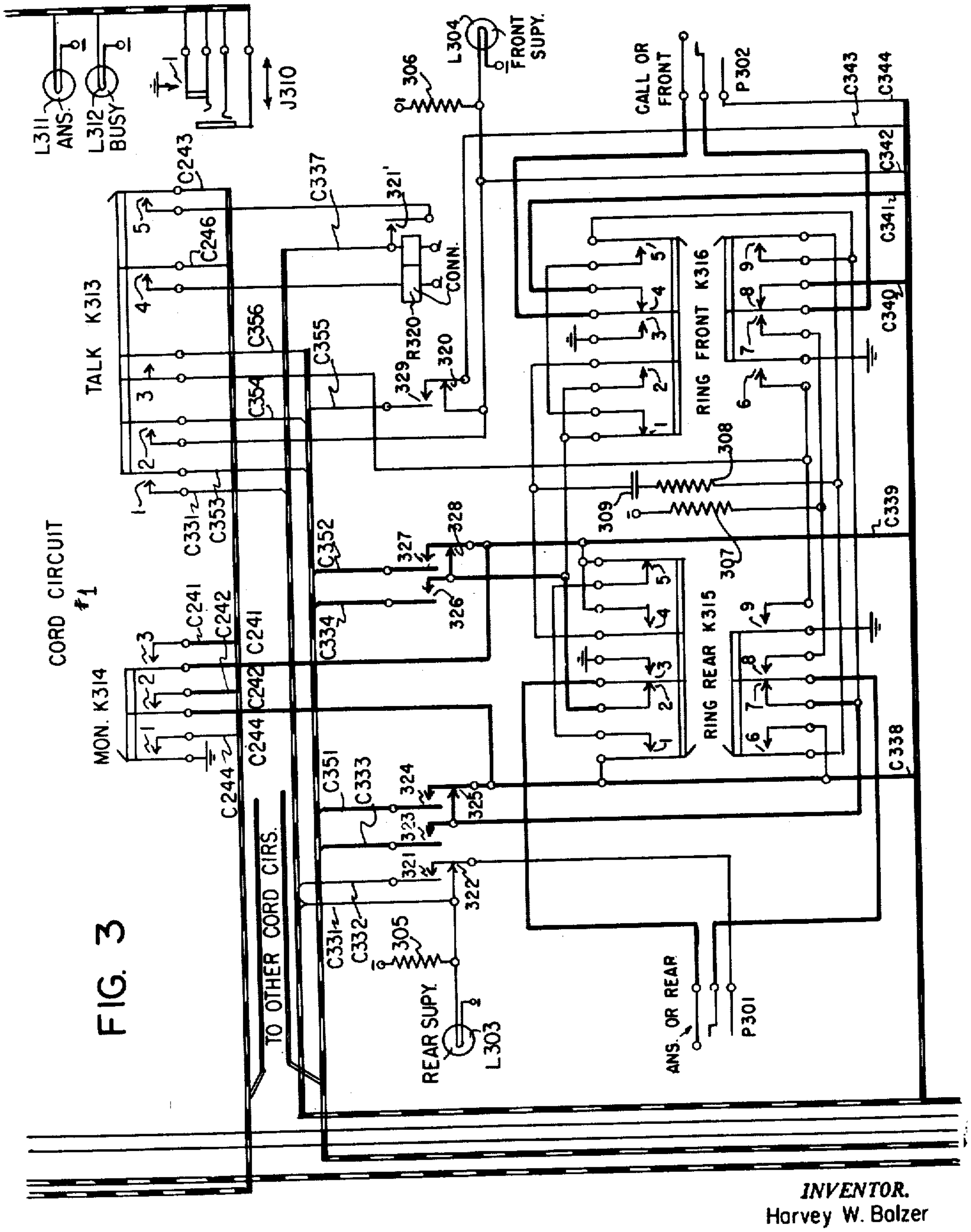
Figure 4:
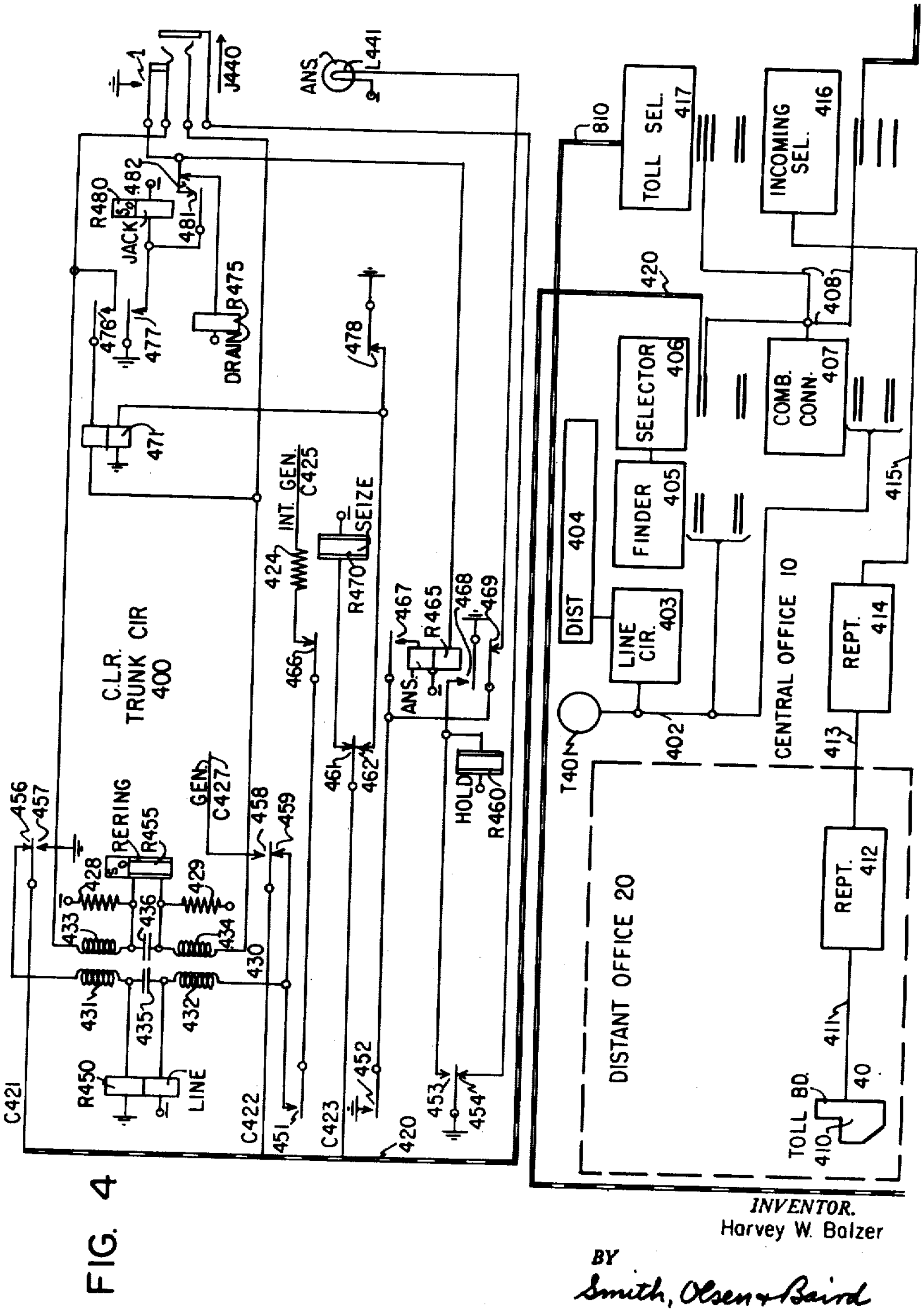
Figure 5:
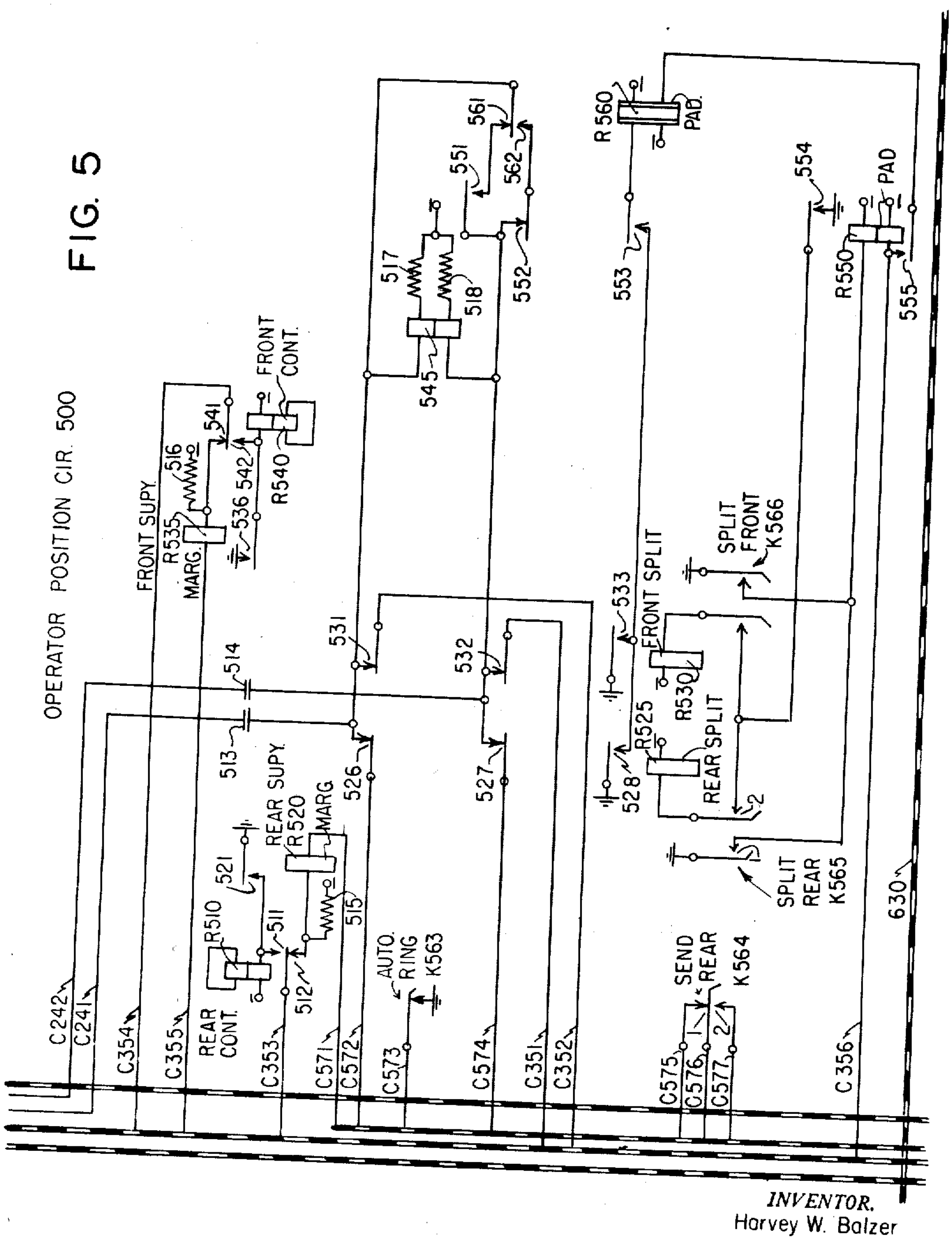
Figure 6:
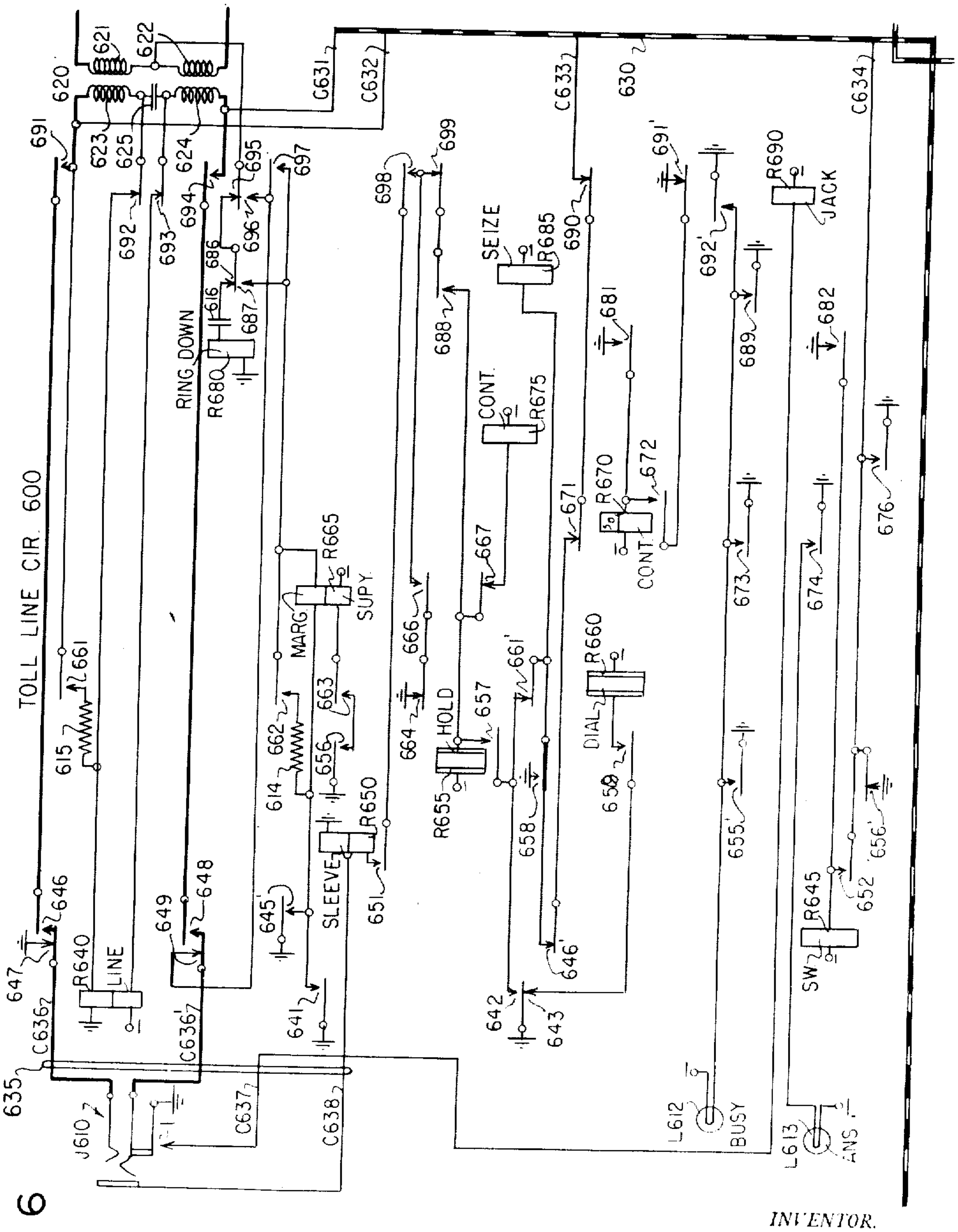
Figure 7:
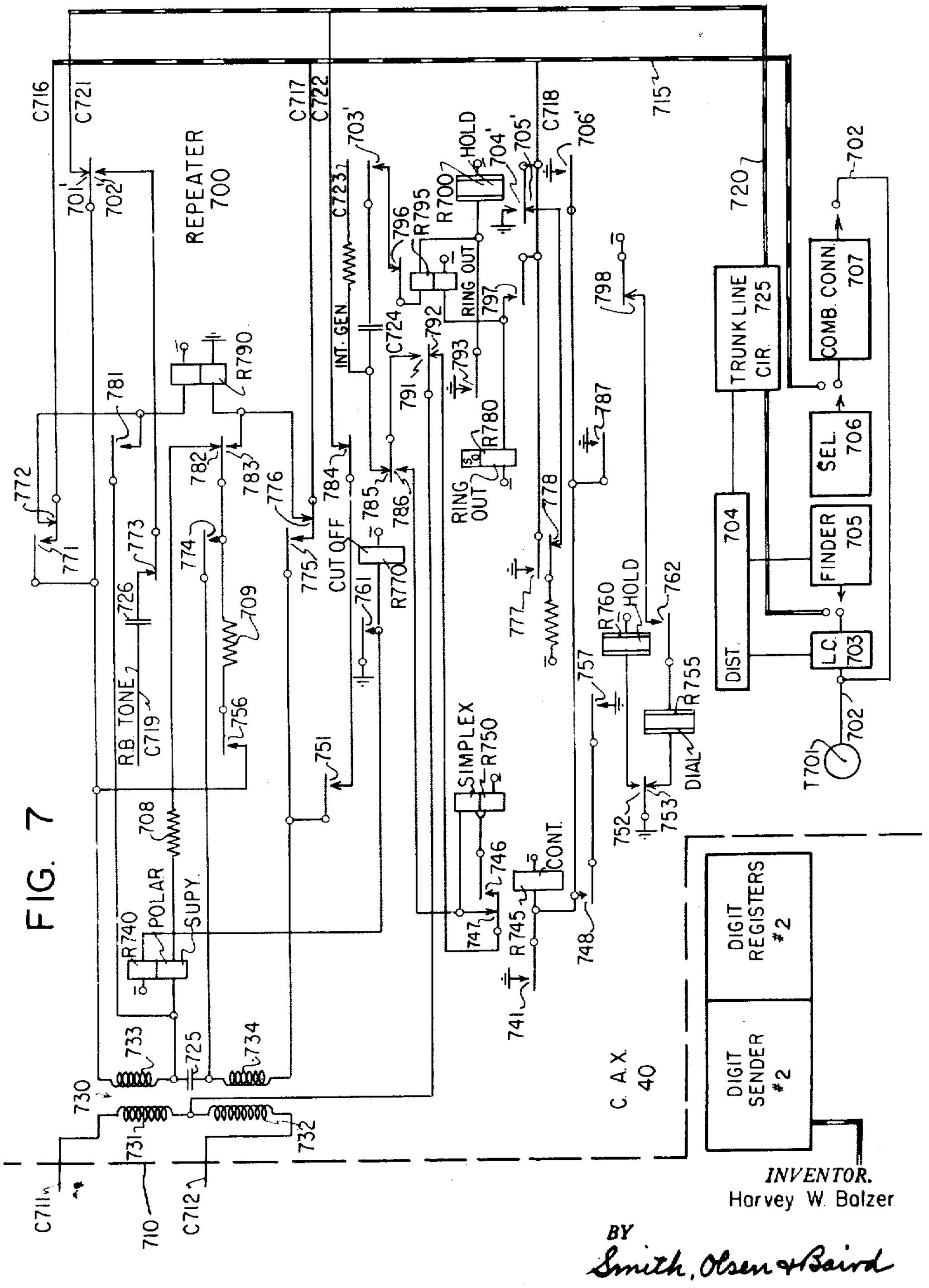
Figure 8:
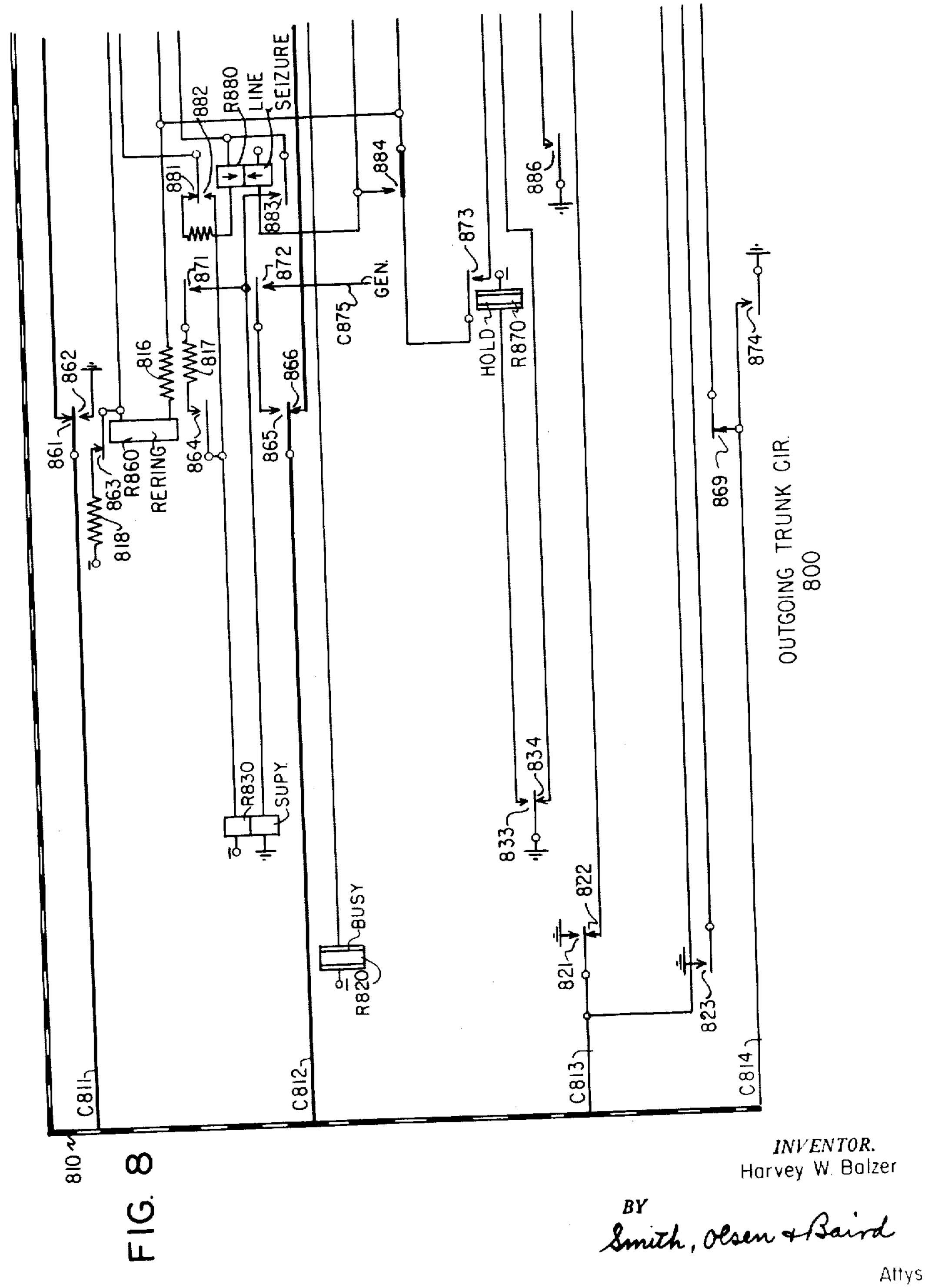
Figure 9:
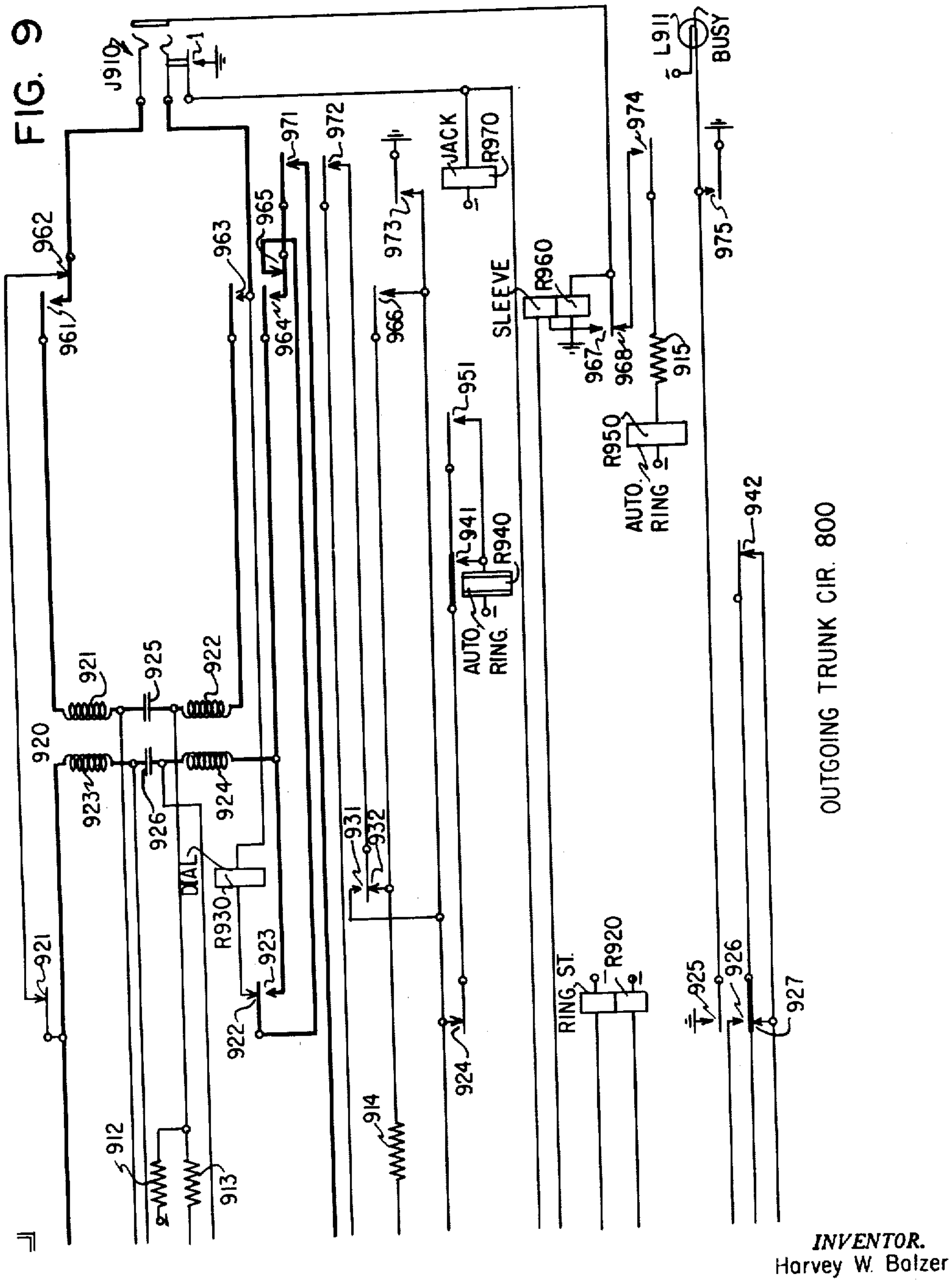
Figure 10:
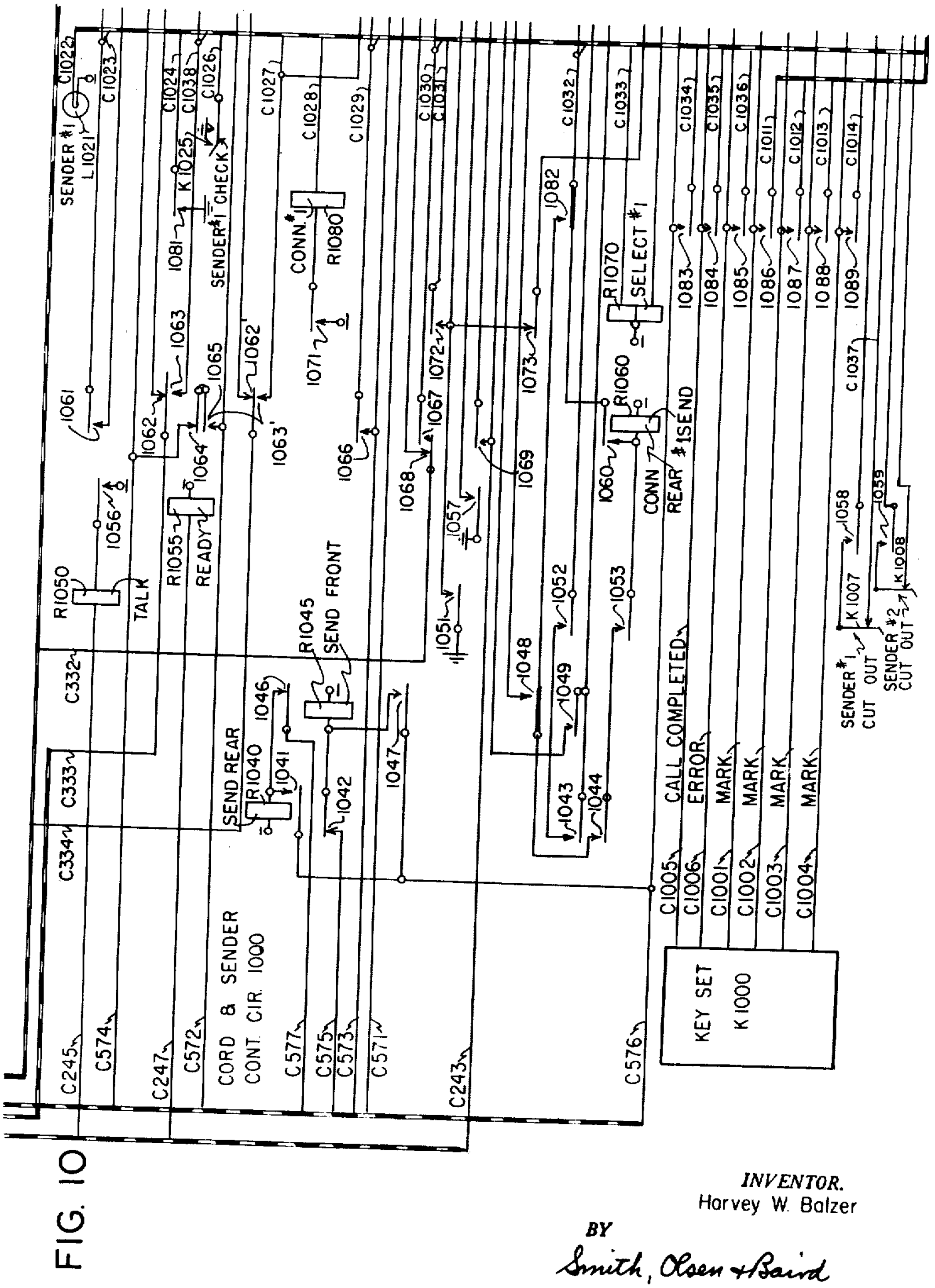
Figure 11:
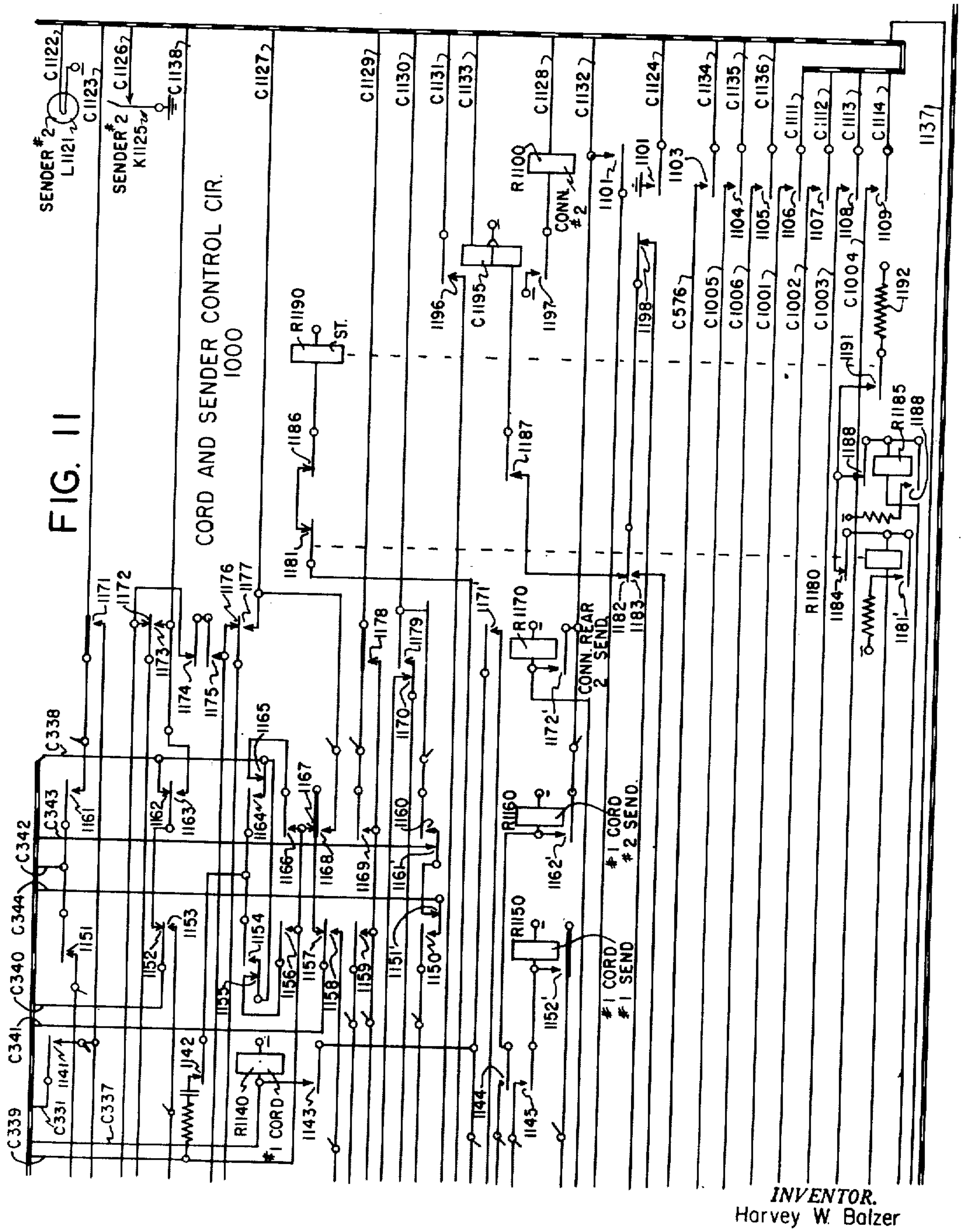
Figure 12:
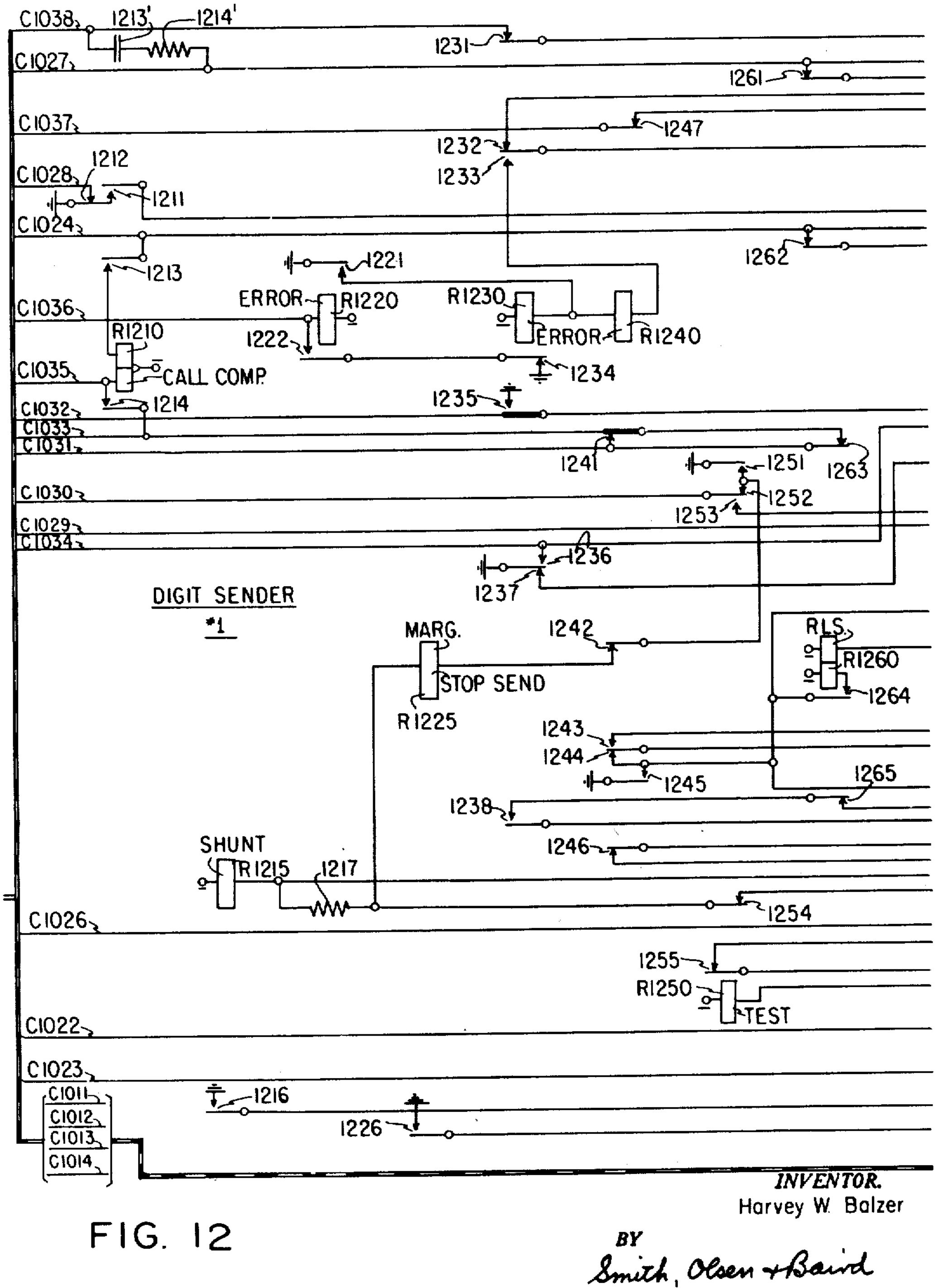
Figure 13:
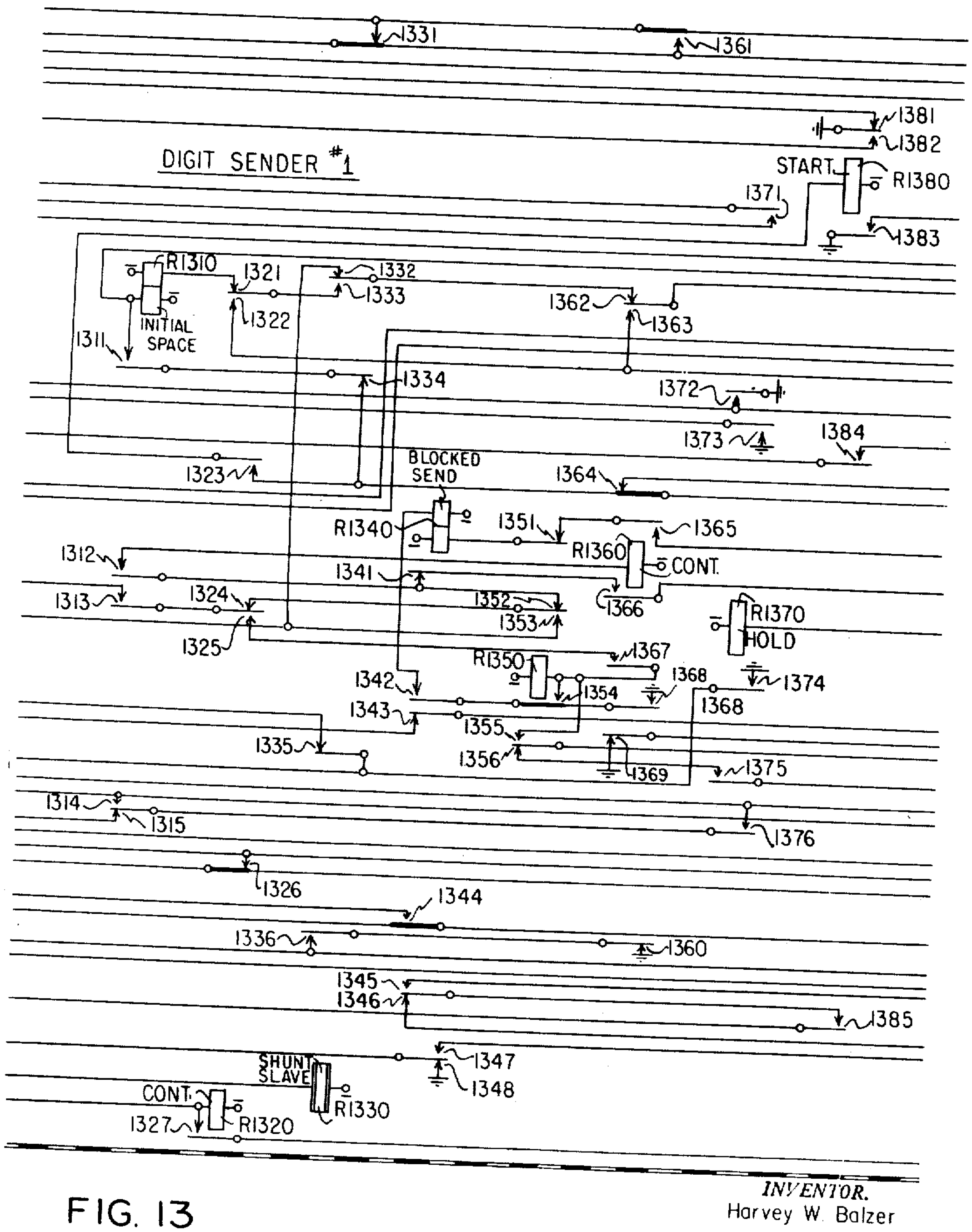
Figure 14:
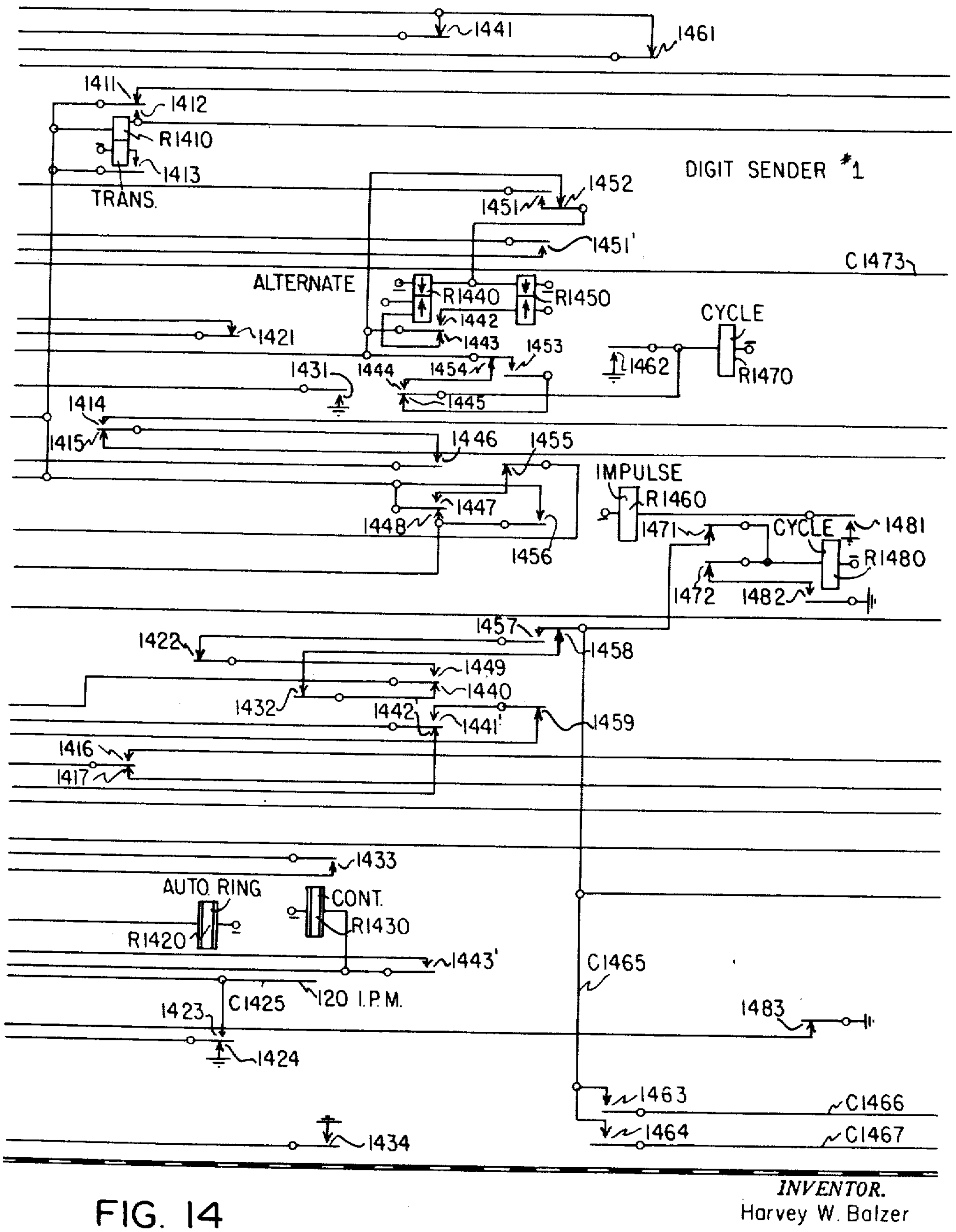
Figure 15:
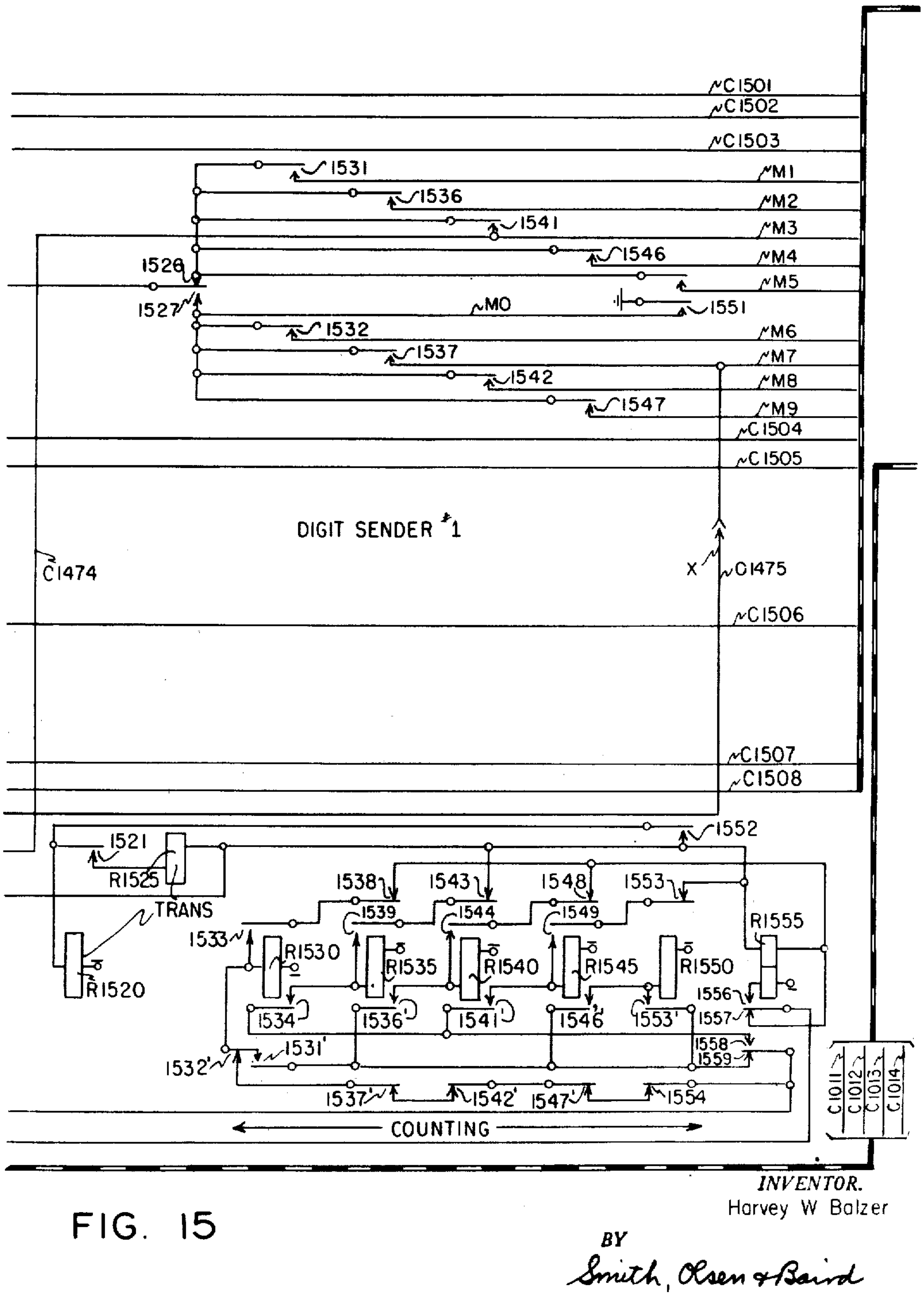

More particularly, Fig. 2 illustrates the details of the telephone circuit arranged at the first operator position disposed at the toll board in the central office; Fig. 3 illustrates the details of one of the cord circuits arranged at the first operator position disposed at the toll board in the central office; Fig. 4 illustrates the details of one of the C. L. R. trunk circuits disposed in the central office; Fig. 5 illustrates the details of the first operator position disposed at the toll board in the central office; Fig. 6 illustrates the details of one of the toll line circuits disposed in the central office; Fig. 7 illustrates the details of one of the repeaters disposed in the C. A. X; Figs. 8 and 9, taken together, illustrate the details of one of the outgoing trunk circuits disposed in the central office; Figs. 10 and 11, taken together, illustrate the details of the cord and sender control circuit associated with the first operator position disposed at the toll board in the central office; Figs. 12 to 15, inclusive, illustrate the details of one of the digit senders associated with the first operator position disposed at the toll board in the central office; and Figs. 16 and 17, taken together, illustrate the details of one of the digit registers associated with the first operator position disposed at the toll board in the central office.

Referring now more particularly to Fig. 1, the telephone system there illustrated serves an area comprising a central office 10, a distant office 20, a remote office 30 and a C. A. X 40. The central office 10 is of the automatic type serving substations of any suitable type, including the subscriber substation T401; the distant office 20 is of any suitable type serving substations, not shown; the remote office 30 is of any suitable type serving substations, not shown; and the C. A. X 40 is of the automatic type serving substations of any suitable type, including the subscriber substation T701. The central office 10 comprises a manual toll board 50 of the key sending type; the distant office 20 comprises a manual toll board 410 of any suitable type; and the remote office 30 comprises a manual toll board 201 of any suitable type. The central office 10 and the distant office 20 are interconnected by a group of toll lines, including the toll line 413; the central office 10 and the remote office 30 are interconnected by a group of toll lines, including the toll line 203; and the central office 10 and the C. A. X 40 are interconnected by a group of trunk lines, including the trunk line 710.

In the central office 10 the subscriber substations T401, etc., have subscriber lines 402, etc., extending thereto that are provided with individually associated line circuits 403, etc. Also the central office 10 comprises a local switch train including groups of finder-selector links and groups of connectors, not shown. One of the groups of finder-selector links includes the link illustrated comprising the finder 405 and the selector 406 and is provided with an associated distributor 404, also connected to the line circuits 403, etc., in the group associated with the group of subscriber lines, including the subscriber line 402 extending to the subscriber substation T401. Accordingly, the finder-selector link illustrated is allotted by the distributor 404; and the finder 405 thereof has access to the group of subscriber lines including the subscriber line 402. Also the central office 10 comprises a toll switch train including groups of combination connectors, one of the groups including the combination connector 407 having access to the group of subscriber lines, including the subscriber line 402. Further the toll switch train includes a group of incoming selectors, including the incoming selector 416, and a group of toll selectors, including the toll selectors 417. The combination connectors 407, etc., are accessible to the selectors 406, etc., of the group of finder-selector links mentioned, to the group of incoming selectors 416, etc., and to the group of toll selectors 417, etc.

The toll lines 413, etc., extending between the central office 10 and the distant office 20 are terminated in repeaters at the opposite ends thereof; the toll line 413 being terminated in the repeaters 412 and 414 respectively disposed in the distant office 20 and in the central office 10. The repeater 412 is accessible to the toll board 410 via a trunk 411; and the repeater 414 is connected by a trunk 415 to the incoming selector 416 individual thereto. The toll lines 203, etc., extending between the central office 10 and the remote office 30 are terminated in ring-down toll line circuits at the opposite ends thereof; the toll line 203 being terminated in the ring-down toll line circuits 204 and 202 respectively disposed in the central office 10 and in the remote office 30. The ring-down toll line circuit 202 is accessible to the toll board 201 via a trunk individual thereto; while the ring-down toll line circuit 204 is accessible to the toll board 50 via a trunk 205 individual thereto, the trunk 205 being terminated in a jack J310 disposed at the first operator position at the toll board 50. The trunk lines 710, etc., extending between the central office 10 and the C. A. X 40 are terminated in toll line circuits 600, etc., disposed in the central office 10 and in repeaters 700, etc., disposed in the C. A. X 40. The toll line circuit 600 is accessible to the toll board 50 via a first trunk 635 individual thereto, the first trunk 635 being terminated in a jack J610 disposed at the first operator position at the toll board 50. Also the toll line circuit 600 is accessible to the incoming selectors 416, etc., via a second trunk 630 individual thereto. Further the central office 10 comprises a group of outgoing trunk circuits, including the outgoing trunk circuit 800, respectively associated with the group of toll selectors, including the toll selector 417. More particularly, the outgoing trunk circuit 800 is individually connected to the toll selector 417 by a trunk 810 and is accessible to the toll board 50 via a trunk individual thereto, the trunk mentioned being terminated in a jack J910 disposed at the first operator position at the toll board 50. Also the central office 10 comprises a group of C. L. R. trunk circuits, including the C. L. R. trunk circuit 400. The C. L. R. trunk circuit 400 is accessible via a C. L. R. trunk 420 to the selectors 406, etc., of the group of finder-selector links mentioned; and is also accessible to the toll board 50 via a trunk individual thereto, the trunk mentioned being terminated by a jack J440 disposed at the first operator position at the toll board 50.

In the central office 10, the toll board 50 comprises a number of operator positions, including the first operator position indicated that is provided with the operator position circuit 500, the operator telephone circuit 200, the cord and sender control circuit 1000 and the group of cord circuits, including the cord circuit #1. At the first operator position at the toll board 50, the position circuit 500 and the telephone circuit 200 are interconnected with each other and are commonly connected to the group of cord circuits, including the cord circuit #1. Also the position circuit 500 and the telephone circuit 200 are respectively connected to the cord and sender control circuit 1000; and the control circuit 1000 is respectively connected to each of the cord circuits in the group, including the cord circuit #1. Further the cord and sender control circuit 1000 is individually provided with the digit sender #1 and the digit sender #2, which, in turn, are individually connected to the digit register #1 and the digit register #2. In view of the foregoing, it will be appreciated that each operator position at the toll board 50 comprises a position circuit, a telephone circuit, a cord and sender control circuit, a group of cord circuits, two digit senders and two digit registers. Moreover, it will be understood that the answering of calls, the initiation of calls and the extension of calls from each position at the toll board 50 is identical to the corresponding operations at the first operator position illustrated; and in the interest of brevity only the operations performed at the first position at the toll board 50 will be discussed.

In the C. A. X 40, the subscriber substations T701, etc., have subscriber lines 702, etc., extending thereto that are provided with individually associated line circuits 703, etc. Also the C. A. X 40 comprises a local switch train including groups of finder-selector links and groups of connectors, not shown. One of the groups of finder-selector links includes the link illustrated comprising the finder 705 and the selector 706, and is provided with an associated distributor 704, also connected to the line circuits 703, etc., in the group associated with the group of subscriber lines, including the subscriber line 702 extending to the subscriber substation T701. Accordingly, the finder-selector link illustrated is allotted by the distributor 704; and the finder 705 thereof has access to the group of subscriber lines, including the subscriber line 702. Also the C. A. X 40 comprises a toll switch train including groups of combination connectors, one of the groups including the combination connector 707 having access to the group of subscriber lines, including the subscriber line 702. The combination connectors 707, etc., are accessible to the selectors 706, etc., of the group of finder-selector links mentioned. Also in the C. A. X 40 the repeaters 700, etc., are provided with trunk line circuits 725, etc., the repeater 700 being individually connected to the trunk line circuit 725. Also the repeaters 700, etc., are accessible to the selectors 706, etc. of the group of finder-selector links mentioned via trunks 715, etc., individual thereto; while the trunk line circuits 725, etc., are accessible to the finders 705, etc., of the group of finder-selector links mentioned. Finally, the trunk line circuits 725, etc., are also connected to the distributor 704.

*Sect. 2.—The apparatus incorporated in the telephone system*

In the central office 10, the operator telephone circuit 200 comprises, as shown in Fig. 2, a repeating coil 235, a transmitter T205, a receiver R206, two jacks J209 and J210, two plugs P207 and P208, and a relay circuit including a talk relay R210, a monitor relay R220 and a battery supply relay R230.

The operator position circuit 500 comprises, as shown in Fig. 5, a key group including a split rear key K565, a split front key K566, an automatic ring key K563 and a send rear key K564; and also a relay group including a rear control relay R510, a rear supervisory relay R520, a rear split relay R525, a front split relay R530, a front supervisory relay R535, a front control relay R540 and two pad relays R550 and R560; as well as a pad including the elements 545, 517 and 518. Further the operator position circuit 500 comprises a key set K1000 of conventional type, indicated in Fig. 10, that includes ten individual digit keys, an error key, and a call completed key or button.

The cord circuit #1 comprises, as shown in Fig. 3, a rear or normal answer plug P301, a front or normal call plug P302, a rear supervisory lamp L303, and a front supervisory lamp L304; and a key group including a talk key K313, a monitor key K314, a ring rear key K315 and a ring front key K316; as well as a connect relay R320.

The cord and sender control circuit 1000 comprises, as shown in Figs. 10 and 11, a sender #1 lamp L1021, a sender #2 lamp L1121, a sender #1 check key K1025, a sender #2 check key K1125, a sender #1 cut-out key K1007, and a sender #2 cut-out key K1008. Also the cord and sender control circuit 1000 comprises a plurality of relay groups individual to the cord circuits in the associated group; the group individual to the cord circuit #1 including the #1 cord relay R1140, the #1 cord #1 send relay R1150 and the #1 cord #2 send relay R1160. Also the cord and sender control circuit 1000 comprises a group of relays individual to the digit sender #1 and including the connect rear #1 send relay R1060, the select #1 relay R1070 and the connect #1 relay R1080; and a group of relays individual to the digit sender #2 and including a connect rear #2 send relay R1170, a select #2 relay R1195 and a connect #2 relay R1100. Finally, the cord and sender control circuit 1000 comprises a common group of relays including a send rear relay R1040, a send front relay R1045, a talk relay R1050, a ready relay R1055, two sequence relays R1180 and R1185 and a start relay R1190.

Figure 16:
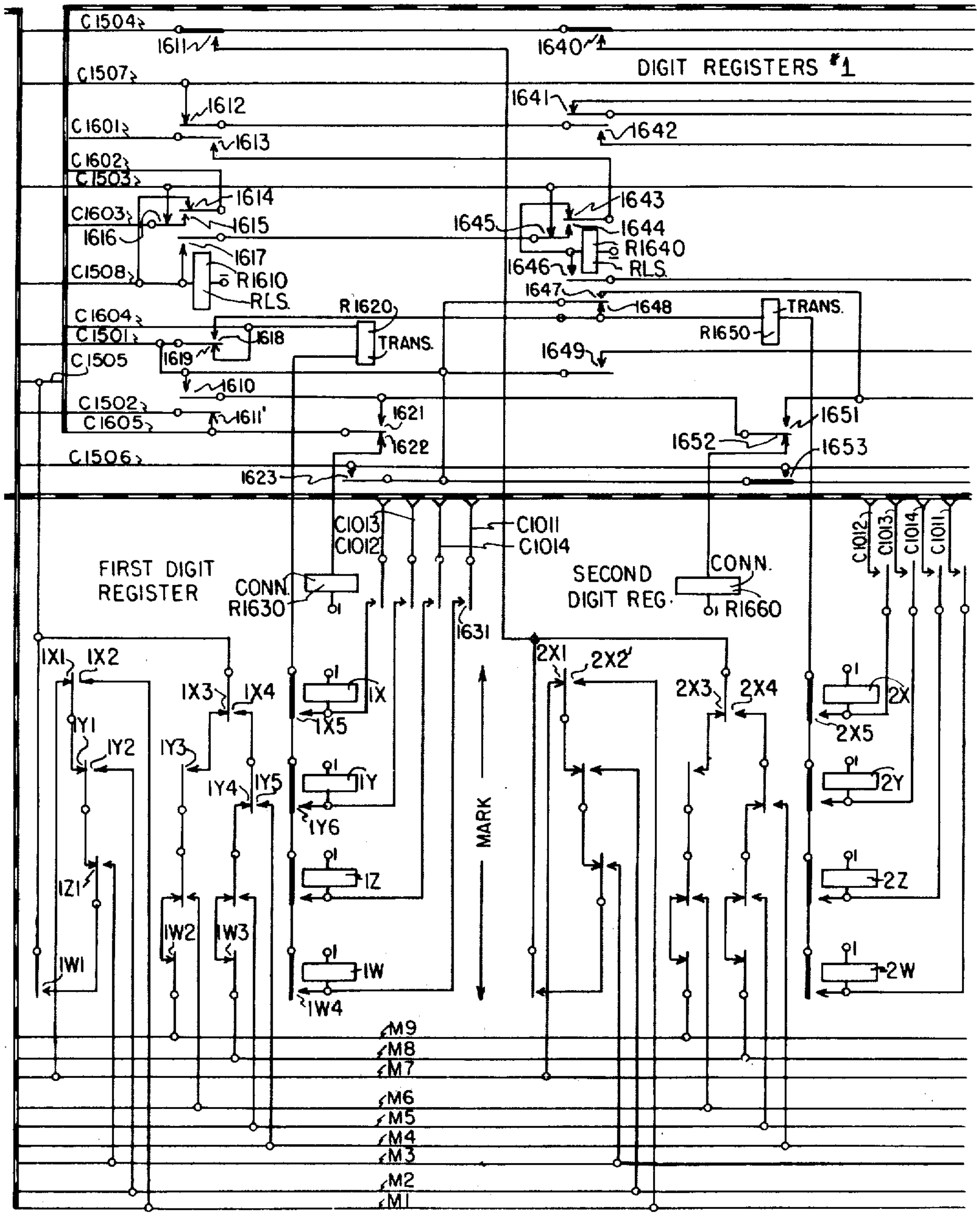
Figure 17:
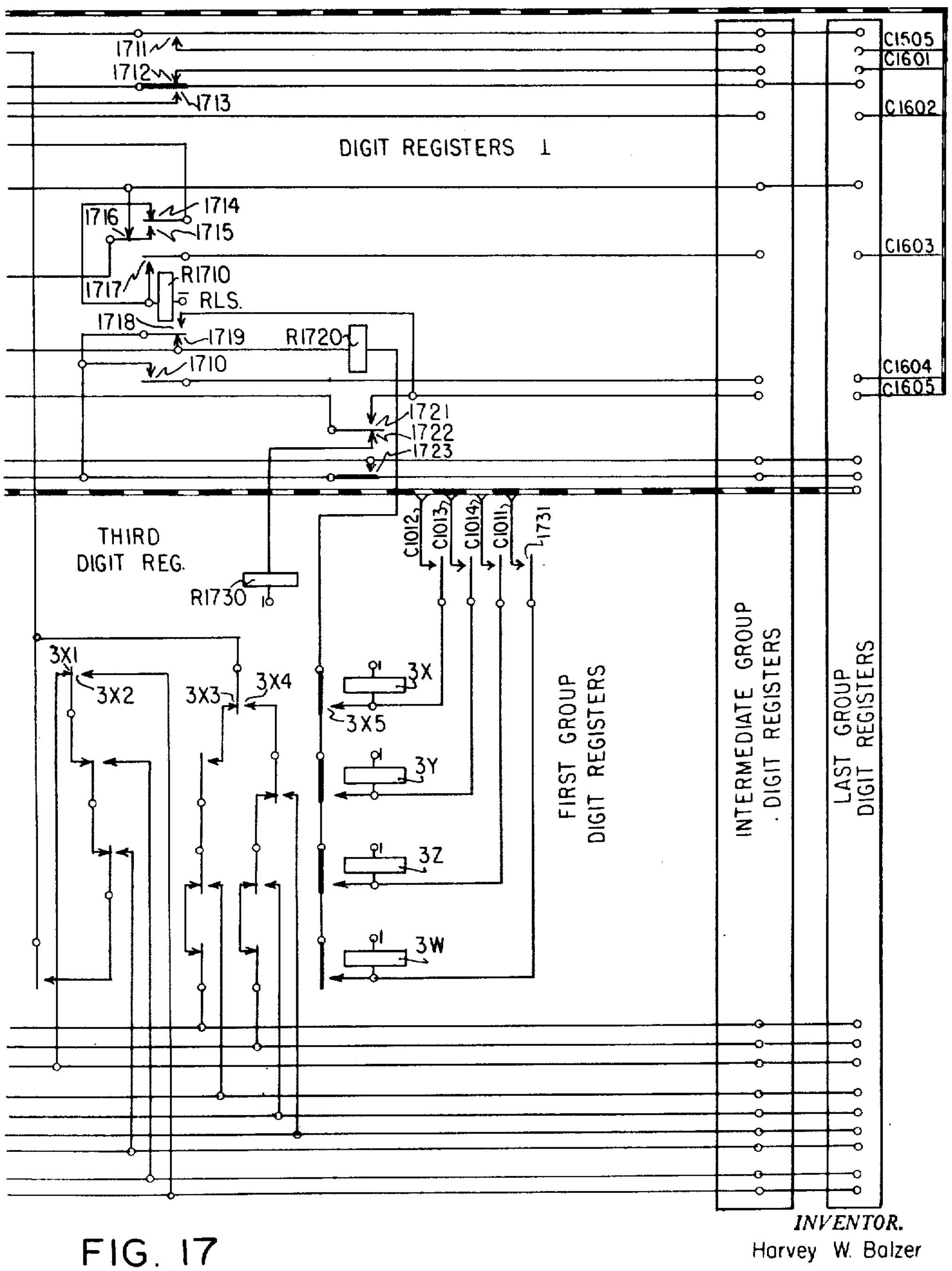

The digit sender #2 and the digit registers #2, diagrammatically illustrated in Fig. 7, are respectively identical to the digit sender #1 and the digit registers #1. The digit sender #1 comprises, as shown in Figs. 12 to 15, inclusive, a relay group including a call complete relay R1210, a shunt relay R1215, an error relay R1220, a stop send relay R1225, two error relays R1230 and R1240, a test relay R1250, a release relay R1260, an initial space relay R1310, a control relay R1320, a shunt slave relay R1330, a blocked send relay R1340, two control relays R1350 and R1360, a hold relay R1370, a start relay R1380, a transfer relay R1410, an automatic ring relay R1420, a control relay R1430, two alternate relays R1440 and R1450, an impulse relay R1460, two cycle relays R1470 and R1480, two transfer relays R1520 and R1525, five counting relays R1530, R1535, R1540, R1545 and R1550, and a control relay R1555. The digit registers #1 comprise, as shown in Figs. 16 and 17, a first group of three individual digit registers, an intermediate group of three individual digit registers, and a last group of three individual digit registers. The groups of individual digit registers are identical; and only the first group of three individual digit registers have been illustrated. The first digit register comprises four mark relays 1X, 1Y, 1Z and 1W, a release relay R1610, a transfer relay R1620 and a connect relay R1630; similarly, the second digit register comprises four mark relays 2X, 2Y, 2Z and 2W, a release relay R1640, a transfer relay R1650, and a connect relay R1660; and similarly the third digit register comprises four mark relays 3X, 3Y, 3Z and 3W, a release relay R1710, a transfer relay R1720 and a connect relay R1730.

The C. L. R. trunk circuits are identical to the C. L. R. trunk circuit 400, shown in Fig. 4, that comprises the terminating jack J440 disposed at the first operator position at the toll board 50 and an associated answer lamp L441. Also the C. L. R. trunk circuit 410 comprises a repeating coil 430 and a relay group including a line relay R450, a re-ring relay R455, a hold relay R460, an answer relay R465, a seize relay R470, a drain relay R475 and a jack relay R480.

The toll line circuits are identical to the toll line circuit 600, shown in Fig. 6, that comprises the terminating jack J610 disposed at the first operator position at the toll board 50 and associated answer and busy lamps L613 and L612, respectively. Also the toll line circuit 600 comprises a repeating coil 620 and a relay group including a line relay R640, a switch relay R645, a sleeve relay R650, a hold relay R655, a dial relay R660, a supervisory relay R665, two control relays R670 and R675, a ring-down relay R680, a seize relay R685 and a jack relay R690.

The outgoing trunk circuits are identical to the outgoing trunk circuit 800, shown in Figs. 8 and 9 that comprise the terminating jack J910 disposed at the first operator position at the toll board 50 and an associated busy lamp L911. Also the outgoing trunk circuit 800 comprises a repeating coil 920, pad elements 810 and 912, and a relay group including a busy relay R820, a supervisory relay R830, a re-ring relay R860, a hold relay R870, a line seizure relay R880, a ring start relay R920, a dial relay R930, two automatic ring relays R940 and R950, a sleeve relay R960 and a jack relay R970.

In the C. A. X 40, the repeaters are identical to the repeater 700, shown in Fig. 7, that comprises a repeating coil 730 and a relay group including a supervisory relay R740 a control relay R745, a simplex relay R750, a dial relay R755, a hold relay R760, a cut-off relay R770, a ring-out relay R780, a line relay R790, a ring-out relay R795 and a hold relay R700.

In the central office 10, the line circuits 403, etc., the distributor 404, the ring-down toll line circuits 204, etc., and the repeaters 414, etc., are of any suitable types; while the finders 405, etc., the selectors 406, etc., the combination connectors 407, etc., the incoming selectors 416, etc., and the toll selectors 417, etc., are of the conventional Strowger types. Moreover, the repeaters 412, etc., in the distant office 20 and the ring-down toll line circuits 202, etc., in the remote office 30 are of any suitable types. As previously noted, the ring-down toll line circuit 204 terminates upon the jack J310 disposed at the first operator position at the toll board 50 and is provided with associated answer and busy lamps L311 and L312, respectively.

Finally in the C. A. X 40, the line circuits 703, etc., the distributor 704, and the trunk line circuits 725, etc., are of any suitable types; while the finders 705, etc., the selectors 706, etc., and the combination connectors 707, etc., are of the conventional Strowger types.

A better understanding of the connection and arrangement of the apparatus incorporated in the telephone system will be facilitated from a consideration of the answering, initiating and completing of calls at first operator position at the toll board 50 in the central office 10 appearing hereinafter.

*Sect. 3.—Preparing the toll board 50 in the central office 10*

In order to prepare the first operator position at the toll board 50 in the central office 10 for use, the occupying operator inserts the plugs P207 and P208 terminating the transmitter T205 and the receiver R206 into the respective jacks J209 and J210; whereby the transmitter T205 is supplied with battery from the battery supply relay R230 causing the latter relay to operate. At this time the transmitter T205 is operatively connected via the condenser 226 to the winding 239 of the repeating coil 235; and the receiver 206 is operatively connected via the contacts 222 and 223 to the winding 237 of the repeating coil 235. Upon operating the battery supply relay R230 completes, at the contacts 231, a path for applying ground potential to the conductor C247, thereby to complete a circuit for operating the ready relay R1055 in the cord and sender control circuit 1000. Upon operating the ready relay R1055 completes, at the contacts 1057, a circuit, including the contacts 1181 and 1186, for operating the start relay R1190. Upon operating the start relay R1190 completes, at the contacts 1191, multiple circuits for operating the sequence relays R1180 and R1185. The circuit for operating the sequence relay R1180, corresponding to the digit sender #1, extends from battery via the resistor 1192, the contacts 1191 and 1184, the winding of the sequence relay R1180, the contacts 1058, the sender #1 cut-out key K1007, the conductor C1037, and the contacts 1247 and 1381, to ground potential in the digit sender #1. Likewise, the circuit for operating the sequence relay R1185, corresponding to the digit sender #2, extends from battery via the resistor 1192, the contacts 1191 and 1188, the winding of the sequence relay R1185, the contacts 1059, the sender #2 cut-out key K1008, the conductors C1137, etc., to ground potential in the digit sender #2. Accordingly, the sequence relay R1180 operates completing, at the contacts 1181′ a substantially identical holding circuit, including the conductor C1037, for energizing the winding, thereof; and interrupting, at the contacts 1184, the original operating circuit therefor. Likewise the sequence relay R1185 operates completing, at the contacts 1189, a substantially identical holding circuit, including the conductor C1137, for energizing the winding thereof; and interrupting, at the contacts 1188, the original operating circuit therefor. Also upon operating the sequence relays R1180 and R1185 interrupt, at the contacts 1181 and 1186, respective points in the circuit for retaining operated the start relay R1190. When the sequence relay R1180 is thus operated, there is prepared, at the contacts 1183 a circuit traced hereinafter for energizing the lower winding of the select #1 relay R1070; and there is interrupted, at the contacts 1182, a similar path traced hereinafter for energizing the lower winding of the select #2 relay R1195. Accordingly, at this time the operated sequence relay R1180 conditions the select #1 relay R1070 for operation; whereby the digit sender #1 is elected for use in preference to the digit sender #2.

At this time the operator may select for subsequent use an idle cord circuit, such for example, as the cord circuit #1 by operating the talk key K313 thereof. When the talk key K313 is thus operated, there is completed, at the fourth contacts thereof, a circuit, including the conductor C246 and the contacts 217, for energizing the left-hand winding of the connect relay R320; whereby the latter relay operates to complete, at the contacts 321′, a holding circuit, including the fifth contacts of the talk key K313 and the conductor C243 for energizing the right-hand winding thereof in series with the winding of the talk relay R210; whereby the connect relay R320 is retained in its operated position and the talk relay R210 operates. Upon operating the talk relay R210 interrupts, at the contacts 217, the path for applying ground potential to the conductor C246 thereby positively to prevent operation of the connect relay in any other cord circuit at the first operator position should the associated talk key thereof be accidentally operated at this time. Also the talk relay R210 interrupts, at the contacts 211 and 214, a normally completed path for bridging the two impedance elements 218 and 219 in series circuit relation across the talk conductors C241 and C242; and completes, at the contacts 212 and 213, a path for bridging the condenser 225 and the windings 238, 237 and 236 of the repeating coil 235 in series circuit relation across the talk conductors C241 and C242. Further the talk relay R210 interrupts, at the contacts 215, a further point in a circuit traced hereinafter for operating the monitor relay R220; and completes, at the contacts 216, a path for applying ground potential to the conductor C245. At this time the talk conductors C241 and C242 are directly connected via the respective condensers 513 and 514, the upper and lower windings of the impedance element 545 and the pad elements 517 and 518 to battery potential. Further the upper and lower winding of the impedance element 545 are connected by way of the contacts 526, 527, the conductors C572, C574, the contacts 1176, 1172 and 1062', 1062, the conductors C334, C333, the contacts 326, 323 and the second and seventh contacts of the ring rear key K315 to the tip and the ring, respectively, of the rear plug P301. Similarly, the upper and lower winding of the impedance element 545 are connected by way of the contacts 531, 532, the conductors C352, C351, the contacts 327, 324, the conductors C339, C338, the contacts 1167, 1162 and 1157, 1152, the conductors C341, C340 and the fourth and eighth contacts of the ring front key K316 to the tip and ring, respectively, of the front plug P302.

The application of ground potential to the conductor C245 completes a circuit, including the contacts 1056, for operating the talk relay R1050 in the cord and sender control circuit 1000. Upon operating the talk relay R1050 completes, at the contacts 1051, a circuit, including the contacts 1073, 1183 and 1198 for energizing the lower winding of the select #1 relay R1070 in order to cause the latter relay to operate. Upon operating the select #1 relay R1070 completes, at the contacts 1072, a path, including the contacts 1051, for applying ground potential to the conductor C1031 extending to the digit sender #1; the conductor C1031 being connected via the contacts 1241 and 1263 in multiple to the conductor C1033 and thence through the upper winding of the select #1 relay R1070 to battery potential, thereby completing a holding circuit for energizing the upper winding of the select #1 relay R1070. Further the select #1 relay R1070 interrupts, at the contacts 1073, the original operating circuit for energizing the lower winding thereof; and completes, at the contacts 1071, a circuit including the conductor C1028 and the contacts 1212 for operating the connect #1 relay R1080. Upon operating the connect #1 relay R1080 completes, at the contacts 1084 and 1085, connections between the conductors C1005 and C1006 extending from the key set K1000 and the respective conductors C1035 and C1036 extending to the digit sender #1; completes, at the contacts 1086, 1087, 1088 and 1089, connections between the mark conductors C1001, C1002, C1003 and C1004 extending from the key set K1000 and the respective conductors C1011, C1012, C1013 and C1014 extending to the digit registers #1. Also the connect #1 relay R1080 completes, at the contacts 1081, a path for applying ground potential to the conductor C1024 extending to the digit sender #1 in order to complete a circuit for operating the start relay R1380. Upon operating the start relay R1380 interrupts, at the contacts 1381, the path for applying ground potential to the conductor C1037, thereby to interrupt the previously traced holding circuit for retaining operated the sequence relay R1180. Upon restoring the sequence relay R1180 interrupts, at the contacts 1183, a further point in the operating circuit for energizing the lower winding of the select #1 relay R1070; and prepares, at the contacts 1182, a point in an operating circuit traced hereinafter for energizing the lower winding of the select #2 relay R1195. Also the start relay R1380 completes, at the contacts 1382, a path, including the contacts 1232, for applying ground potential to the release conductor C1501 extending to the digit registers #1, thereby to condition the transfer relay R1620 in the first digit register for subsequent operation. Also the start relay R1380 completes, at the contacts 1385, a path, including the contacts 1483 and 1346, for applying ground potential to the conductor C1022, thereby to complete a circuit for illuminating the sender #1 lamp L1021 indicating to the operator at the first position at the toll board 50 that the sender #1 will be utilized in conjunction with the cord circuit #1 in extending a connection thereby in the event digit sending is necessary. Also the start relay R1380 completes, at the contacts 1384, a path, including the contacts 1237 and 1411, for applying ground potential to the conductor C1502, thereby to complete a circuit, also including the contacts 1611' and 1622, for operating the connect relay R1630 in the first digit register. Upon operating the connect relay R1630 completes, at the contacts 1631, etc., connections between the four mark relays 1W, 1Z, 1Y and 1X in the first digit register and the respective conductors C1011, C1012, C1013 and C1014 extending back to the key set K1000. Accordingly, the key set K1000 is operatively connected to the first digit register in the digit registers #1 at this time.

Also upon operating, the connect relay R320 completes, at the contacts 321', a circuit, including the fifth contacts of the talk key K313 and the conductors C243 and C337 for energizing in series the winding of the talk relay R210 and the winding of the #1 cord relay R1140; whereby the talk relay R210 is retained in its operated position and the #1 cord relay R1140 is operated. Upon operating the #1 cord relay R1140 prepares, at the contacts 1144 and 1145, circuits traced hereinafter for operating the respective #1 cord #2 send relay R1160 and the #1 cord #1 send relay R1150.

At this time the first operator position at the toll board 50 has been occupied; the telephone circuit 200 has been operatively connected to the position circuit 500; the position circuit 500 has been operatively connected to the cord and sender control circuit 1000; the cord circuit #1 has been operatively connected to the position circuit 500 and to the cord and sender control circuit 1000; and the control circuit 1000 has been operatively connected to the sender #1 and to the digit registers #1.

*Sect. 4.—C. L. R. calls in the central office 10*

Considering now the extension of a C. L. R. call from a subscriber substation, such for example, as the subscriber substation T401 in the central office 10, the subscriber at the calling subscriber substation T401 first initiates the call; whereby the line circuit 403 is controlled over the associated subscriber line 402 governing the distributor 404 in order to cause an idle finder-selector link, such for example, as that illustrated to be allotted for use at this time. The distributor 404 governs the finder 405 of the link illustrated; whereby the finder 405 operates to find the subscriber line 402 extending to the calling subscriber substation T401, whereupon the line circuit 403 is governed to mark the subscriber line 402 as busy to the combination connectors 407, etc., having access thereto. At this time the distributor 404 is dismissed, the link illustrated being marked as busy thereto. Further a loop circuit is completed between the calling subscriber substation T401 and the selector 406 via the finder 405 and the subscriber line 402; whereby dial tone current in the selector 406 is returned over the loop circuit mentioned to the calling subscriber substation T401 indicating to the subscriber thereat that he may proceed to dial the directory number. The subscriber at the calling subscriber substation T401 dials the single digit 0; whereby the selector 406 is operated to select the group of C. L. R. trunks, including the C. L. R. trunk 420, and then to select an idle C. L. R. trunk in the group mentioned. For example, the selector 406 may select the particular C. L. R. trunk 420; whereby it switches through completing a direct loop circuit between the calling subscriber substation T401 and the upper and lower windings of the line relay R450 in the C. L. R. trunk circuit 400; the loop circuit mentioned including the line conductors C421 and C422 of the C. L. R. trunk 420, the contacts 456 and 459 and the windings 431 and 432 of the repeating coil 430. When this loop circuit is thus completed, the line relay R450 operates to complete, at the contacts 453, a circuit for operating the hold relay R460. The C. L. R. trunk 420 is marked as idle to the selector 406 by the application of battery potential via the contacts 461 and the winding of the seize relay R470 to the control conductor C423 thereof; whereby ground potential in the selector 406 is applied to the control conductor C423 of the C. L. R. trunk 420 incident to seizure thereof, completing a circuit for operating the seizure relay R470. Upon operating the hold relay R460 interrupts, at the contacts 461, the circuit for energizing the winding of the seize relay R470 in order to cause the latter relay to restore shortly thereafter, it being of the slow-to-release type. Also the hold relay R460 completes, at the contacts 462, a direct path, including the contacts 478, for applying ground potential to the control conductor C423 of the C. L. R. trunk 420, thereby to retain operated the finder 405 and the selector 406. Also upon operating the line relay R450 completes, at the contacts 452, a circuit, including the contacts 469, for illuminating the answer lamp L441 associated with the jack J440 in order to indicate to the operator at the first position at the toll board 50 that a call is waiting to be answered on the C. L. R. trunk circuit 400. Finally, the line relay R450 completes, at the contacts 451, a connection, including the contacts 459 and 466 and the resistor 424, between the interrupter generator conductor C425 and the line conductor C422 of the C. L. R. trunk 420; whereby ring-back tone current is returned over the connection to the calling subscriber substation T401 indicating to the subscriber thereat that the toll board 50 is being rung.

Assuming that the operator at the first position at the toll board 50 has occupied the position and has connected the cord circuit #1 to the associated position circuit 500, in the manner explained in Sect. 3, she answers the call by inserting the rear plug P301 of cord circuit #1 into the jack J440, thereby closing the first contacts thereof in order to complete a circuit for energizing the lower winding of the answer relay R465 causing the latter relay to operate. Upon operating the answer relay R465 completes, at the contacts 467, a holding circuit, including the contacts 452, for energizing the upper winding thereof; completes, at the contacts 468, a multiple holding circuit for energizing the winding of the hold relay R460; interrupts, at the contacts 469, the circuit for illuminating the answer lamp L441; and interrupts, at the contacts 466, the circuit for returning ring-back tone current over the loop circuit to the calling subscriber substation T401. Also when the first contacts of the jack J440 are thus closed, a circuit, including the contacts 482, is completed for operating the drain relay R475; whereupon the latter relay upon operating completes, at the contacts 477, a circuit for energizing the winding of the jack relay R480 in order to cause the latter relay to operate shortly thereafter, the jack relay R480 being of the slow-to-operate type. Upon operating the jack relay R480 completes, at the contacts 481, a holding circuit, including the first contacts of the jack J440, for energizing the winding thereof; and interrupts, at the contacts 482, the circuit for retaining operated the drain relay R475. Accordingly, the drain relay R475 is first operated and then restored after a short time interval. Also upon operating the drain relay R475 completes, at the contacts 476, a path for bridging the upper winding of the impedance element 471 across the tip and the ring of the jack J440; and interrupts, at the contacts 478, the path for applying direct ground potential to the control conductor C423 of the C. L. R. trunk 420 in order that an alternative path, including the contacts 462 and the lower winding of the impedance element 471, for applying ground potential to the control conductor C423 of the C. L. R. trunk 420 is completed. Upon restoring the drain relay R475 interrupts, at the contacts 476, the path for bridging the upper winding of the impedance element 471 across the tip and the ring of the jack J440; and recompletes, at the contacts 478, the path for applying direct ground potential to the control conductor C423 of the C. L. R. trunk 420 in order again to short-circuit the lower winding of the impedance element 471. This arrangement drains from the C. L. R. trunk circuit 400 any electrostatic charge thereon in order to prevent undesirable clicks in the receiver R206 at the first operator position at the toll board 50 incident to answering the present call.

At this time the tip and the ring of the rear plug P301 of cord circuit #1 are connected via the previously traced paths to the talk conductors C241 and C242; that are, in turn, connected by way of the repeating coil 235 to the transmitter T205 and the receiver R206 at the first operator position at the toll board 50. Also the tip and the ring of the rear plug P301 of cord circuit #1 are connected via the tip and the ring of the jack J440, and the windings 433 and 434 of the repeating coil 430 to the two terminals of the winding of the re-ring relay R455; which terminals of the winding of the re-ring relay R455 are respectively connected via the pad elements 428 and 429 to battery potential. Accordingly, at this time, an operative connection is completed for two-way communication between the calling subscriber substation T401 and the called first operator position at the toll board 50; whereupon the subscriber at the calling subscriber substation T401 advises the operator at the first position at the toll board 50 concerning the extension of the present toll call.

*Sect. 5.—Calls from the toll board 50 in the central office 10 to subscriber substations in the C. A. X 40*

Now assuming that the present call initiated at the calling subscriber substation T401 and answered at the first operator position at the toll board 50 in the central office 10 is to be extended to a called subscriber substation, such for example, as the subscriber substation T701 in the C. A. X 40, the operator first selects an idle toll line circuit, such for example, as the toll line circuit 600 and inserts the front plug P302 of the cord circuit #1 thereinto. The toll line circuit 600 is indicated as being idle at this time by the extinguished busy lamp L612 associated with the terminating jack J610. When the front plug P302 of cord circuit #1 is thus inserted into the jack J610, the first contacts thereof are closed completing a circuit, including the conductor C637 of the trunk 635 for operating the jack relay R690. Upon operating, the jack relay R690 completes, at the contacts 692', a circuit for illuminating the busy lamp L612 in order to indicate the busy condition of the toll line circuit 600 at this time; and interrupts, at the contacts 690, a normally completed path, including the contacts 671 and 646', for applying battery potential by way of the winding of the seize relay R685 to the control conductor C633 of the trunk 630 in order to mark the toll line circuit 600 as busy at this time to the incoming selectors 416, etc. Also the jack relay R690 interrupts, at the contacts 692 and 693, the normal connections between the upper and lower windings of the line relay R640 and the windings 623 and 624 of the repeating coil 620; interrupts, at the contacts 695, the normal connection between the winding of the ring-down relay R680 and the simplex of the trunk line 710; prepares, at the contacts 691 and 694, a connection between the jack J610 and the windings 623 and 624 of the repeating coil 620; and prepares, at the contacts 696, a path to the simplex of the trunk line 710. Also when the front plug P302 is inserted into the jack J610, a circuit including the conductor C638 of the trunk 635, the sleeve of the jack J610, the sleeve of the plug P302, the conductor C344, the contacts 1151' and 1161', the conductor C343, the contacts 329, the conductor C355 and the resistor 516, is completed for energizing in series circuit relation the upper winding of the sleeve relay R650 in the toll line circuit 600 and the winding of the front supervisory relay R535 in the operator position circuit; whereby the sleeve relay R650 operates, whereas the front supervisory relay R535 does not operate as it is of the marginal type.

Upon operating the sleeve relay R650 completes, at the contacts 652, a circuit, including the contacts 656', for operating the switch relay R645. Upon operating the switch relay R645 completes, at the contacts 645', a path, including the contacts 697 and 696, for applying ground potential through the upper winding of the supervisory relay R665 to the simplex of the trunk line 710. At this time the simplex of the trunk line 710 is further connected by way of the contacts 792 and 747 and the upper and lower windings of the simplex relay R750 in the repeater 700 to battery potential. Accordingly, a series circuit is completed for energizing the upper winding of the supervisory relay R665 and the upper and lower windings of the simplex relay R750; whereby the simplex relay R750 operates, whereas the supervisory relay R665 does not operate as it is of the marginal type. Also upon operating the switch relay R645 completes, at the contacts 646 and 648, connections including the contacts 691 and 694, between the tip and the ring of the jack J610 and the windings 623 and 624 of the repeating coil 620. Upon operating the simplex relay R750 completes, at the contacts 752, a circuit for operating the hold relay R760. Upon operating the hold relay R760 completes, at the contacts 761, a circuit for operating the cut-off relay R770, and a multiple circuit for energizing the upper winding of the supervisory relay R740 in order to render the latter relay responsive to the direction of current flow in the lower winding thereof as it is of the polarized type. Upon operating the cut-off relay R770 interrupts, at the contacts 778 a normally completed path, including the contacts 705', for applying battery potential by way of the associated resistor to the control conductor C718 of the trunk 715, thereby to mark the trunk 715 and consequently the repeater 700 as busy to the selectors 706, etc., having access thereto. Further the cut-off relay R770 completes, at the contacts 777, a direct path for applying ground potential to the control conductor C718 in order further to guard the trunk 715 at this time. Also the cut-off relay R770 interrupts, at the contacts 772 and 776, the normal connections between the upper and lower windings of the line relay R790 and the line conductors C716 and C717 of the trunk 715; and completes, at the contacts 771, 774 and 775, a path for bridging the lower winding of the supervisory relay R740 across the line conductors C716 and C717 of the trunk 715. Accordingly, at this time, the lower winding of the supervisory relay R740 is bridged by way of the resistor 708, the contacts 782, 774, 751, 784 and 701' and the windings 733 and 734 of the repeating coil 730 across the line conductors C721 and C722 of the trunk 720 extending from the repeater 703 to the trunk line circuit 725. At this time a loop circuit is completed between the lower winding of the supervisory relay R740 in the repeater 700 and a line relay in the trunk circuit 725; whereby the line relay in the trunk line circuit 725 is operated, whereas the supervisory relay R740 is not poled to operate. Accordingly, the trunk line circuit 725 governs the distributor 704 in order to cause the assignment of an idle one of the finder-selector links, such for example, as the link illustrated. The finder 705 of the link illustrated is then governed by the distributor 704 to find the trunk 720 extending to the trunk line circuit 725; whereby the trunk line circuit 725 is switched through completing a direct loop circuit between the lower winding of the supervisory relay R740 in the repeater 700 and the line relay in the selector 706. In this loop circuit the polarity of the current supplied over the trunk 720 is reversed; whereby the lower winding of the supervisory relay R740 is poled to operate. Also at this time the distributor 704 is dimissed; and the link illustrated is marked as busy thereto.

Upon operating the supervisory relay R740 completes, at the contacts 741, a circuit for operating the control relay R745. Upon operating the control relay R745 completes, at the contacts 746, a direct path, including the contacts 792, for connecting the lower winding of the simplex relay R750 directly to the simplex of the trunk line 710; and interrupts, at the contacts 747, the original path for connecting the upper and lower windings of the simplex relay R750 in series circuit relation to the simplex of the trunk line 710. Accordingly, the resistance of connection from the simplex of the trunk line 710 is materially reduced; whereby a holding circuit is completed for energizing in series the lower winding of the simplex relay R750 in the repeater 700 and the upper winding of the supervisory relay R665 in the toll line circuit 600, retaining operated the simplex relay R750 and effecting operation of the supervisory relay R665 since the latter relay is of the marginal type. Upon operating the supervisory relay R665 completes, at the contacts 666, a path, including the contacts 664, 668 and 651, for applying ground potential by way of the lower winding of the sleeve relay R650 to the sleeve conductor C638 of the trunk 635; whereby the upper and lower windings of the sleeve relay R650 are energized in multiple and in series with the winding of the front supervisory relay R535 in the operator position circuit 500 causing the latter relay to operate at this time since it is of the marginal type. Upon operating the front supervisory relay R535 completes, at the contacts 536, a circuit for energizing the upper winding of the front control relay R540 in order to cause the latter relay to operate shortly thereafter, it being rendered slightly slow-to-operate by virtue of the completed path for short-circuiting the lower winding thereof. Upon operating the front control relay R540 completes, at the contacts 542, a circuit, including the contacts 538, the conductor C354, the second contacts of the talk key K312 and the conductor C342 for illuminating the front supervisory lamp L304. The illumination of the front supervisory lamp L304 shortly following the insertion of the front plug P302 into the jack J610 indicates to the operator at the first position at the toll board 50 that the switch train in the C. A. X 40 is conditioned to receive the first digit; and it is noted that this illumination of the front supervisory lamp L304 takes place in the manner described above only in the event that the operator at the first position mentioned does not begin keying up on the key set K1000, the digits comprising the directory number of the called subscriber substation T701 in the C. A. X 40, immediately after inserting the front plug P302 into the jack J610. In passing it is noted that the original application of high resistance ground potential from the repeater 700 to the toll line circuit 600 over the trunk line 710 consitutes a delay in send signal which is utilized in the digit sender #1 to prevent immediate sending of a digit therefrom registered in the associated digit registers #1 in the alternative event that the operator at the first position at the toll board 50 should begin keying up the digits on the key set K1000, comprising the directory number of the called subscriber substation T701 in the C. A. X 40, immediately following insertion of the front plug P302 into the jack J610.

Continuing now with the extension of the present call and assuming that the operator at the first position at the toll board 50 awaits illumination of the front supervisory lamp L304 prior to keying up on the key set K1000 the digits, comprising the directory number of the called subscriber substation T701 in the C. A. X 40, when the operator mentioned keys the first digit of the directory number on the key set K1000, ground potential is applied to one or two of the mark conductors C1001, C1002, C1003 and C1004 in accordance with the usual WXYZ code marking arrangement. More specifically the mark conductors C1001, C1002, C1003 and C1004 respectively comprise W, X, Y and Z conductors; and the W and X conductors are grounded to register the digit 1; the W and Y conductors are grounded to register the digit 2; the W and Z conductors are grounded to register the digit 3; the X and Y conductors are grounded to register the digit 4; the X and Z conductors are grounded to register the digit 5; the Y and Z conductors are grounded to register the digit 6; and the single conductors W, X, Y and Z are respectively grounded to register the respective digits 7, 8, 9, and 0.

The mark conductors C1001, etc., are at this time connected via the contacts 1006, etc., to the corresponding conductors C1011, etc., extending to the digit registers #1; and are further extended via the contacts 1031, etc., through the windings of the 1W, etc., mark relays in the first digit register to battery potential. Accordingly, at this time, in the event the first digit keyed up on the key set K1000 is the digit 4, the corresponding mark relays 1X and 1Y in the first digit register in the digit registers #1 are operated. At this time ground potential is applied by way of the contacts 1302 and 1232 to the release conductor C1501; and thence via the contacts 1019 and the winding of the transfer relay R1020 to the contacts 1X5 and 1Y5 on the respective mark relays 1X and 1Y; which mark relays occupying their operated positions closing the contacts mentioned, complete paths for short-circuiting the winding of the transfer relay R1020. When the #4 digit key on the key set K1000 is then released, ground potential is removed from the mark conductors C1002 and C1003 (the X and Y conductors) interrupting the previously traced original circuits for operating the 1X and 1Y mark relays in the first digit register in the digit registers #1 and the path for short-circuiting the winding of the transfer relay R1020. Accordingly, at this time a substantially identical holding circuit is completed for energizing the winding of the transfer relay R1020 in series with the multiple connected mark relays 1X and 1Y in the first digit register retaining operated the mark relays 1X and 1Y and effecting operation of the transfer relay R1020. Upon operating the transfer relay R1020 interrupts, at the contacts 1022, the previously traced circuit for retaining operated the connect relay R1030; whereby the latter relay restores interrupting, at the contacts 1031, etc., the connections between the mark relays 1W, 1X, 1Y and 1Z in the first digit register and the corresponding mark conductors C1011, etc.; whereby the first digit register is effectively disconnected from the mark conductors C1011, etc. Also the transfer relay R1020 completes, at the contacts 1021, a path, including the contacts 1011' and 1052 and the grounded conductor C1502 for operating the connect relay R1060; whereby the latter relay completes, at the contacts 1061, etc., connections between the 2W, 2X, 2Y and 2Z mark relays in the second digit register and the mark conductors C1011, etc. Accordingly, at this time, the first digit 4 has been registered in the first digit register; the first digit register has been disconnected from the key set K1000; and the second digit register has been connected to the key set K1000. In view of the foregoing, it will be appreciated that the second digit keyed up on the key set K1000 is registered in an identical manner in the second digit register; the second digit register will then be disconnected from the key set K1000 and the third digit register will be connected thereto. Accordingly, the digits keyed up on the key set K1000 are sequentially registered in the digit registers in the digit registers #1. Specifically, the first three digits are registered in the first group of digit registers; the next three digits are registered in the intermediate group of digit registers and the last three digits are registered in the last group of digit registers.

Of course, the directory number of the called subscriber substation T701 in the C. A. X 40 comprises only three digits: however, should a call be extended from the first operator position at the toll board 50 requiring the utilization of as many as nine digits, the individual digits would be registered in the three groups of three individual digit registers in the manner explained above. Moreover, the digit registers #1 comprise facility for reflexing the last individual digit register in the last group of digit registers back into the first digit registers in the first group of digits registered: whereby in the event a directory number should comprise ten, eleven, etc., digits, the tenth, eleventh, etc., digits would be registered in the first second, etc., digit registers after the first, second, etc., digit registers have been cleared of the respective first, second, etc., digits originally registered therein: all in the manner explained more fully hereinafter. This reflexing between the ninth individual digit register and the first individual digit register is brought about by the connections therebetween including the conductors C1505 and C1601 to C1605, inclusive. The operated 1X and 1Y mark relays in the first digit register bring about registration therein of the digit 4 and complete, at the contacts 1X4 and 1Y5, respectively, a marking circuit between the conductor C1505 and the fourth mark conductor M4. In fact, it is the marking connection between the conductor C1505 and the fourth mark conductor M4 that brings about the registration of the first digit 4 in the first digit register as a consequence of the operation of the 1X and 1Y relays therein.

Also when the first digit 4 is registered in the first digit register, the transfer relay R1620 upon operating as previously noted, completes, at the contacts 1623, a connection between the grounded release conductor C1501 and the hold conductor C1506, thereby to complete a circuit for operating the hold relay R1370 in the digit sender #1. Upon operating the hold relay R1370 completes, at the contacts 1373, a path for applying ground potential to the conductor C1034, thereby to complete a circuit, including the contacts 1083, the conductor C576, the first contacts of the send rear key K564, the conductor C575 and the contacts 1042, for operating the send front relay R1045 in the cord and sender control circuit 1000. Upon operating the send front relay R1045 completes, at the contacts 1047, a holding circuit, including the conductor C576 and the contacts 1083 and the grounded conductor C1034, for energizing the winding thereof; and interrupts, at the contacts 1046, a point in a circuit traced hereinafter for operating the send rear relay R1040. Accordingly, the operated send front relay R1045 indicates that the digits registered in the digit registers #1 are to be sent over the front plug P302 of the cord circuit #1; and also locks out the send rear relay R1040. Also upon operating the send front relay R1045 completes, at the contacts 1048, a circuit including the contacts 1149 and 1082, the hold conductor C1032 and the contacts 1372, for operating the #1 cord #1 send relay R1150. Upon operating the #1 cord #1 send relay R1150 completes, at the contacts 1152', a direct holding circuit, including the grounded hold conductor C1032, for energizing the winding thereof; and interrupts, at the contacts 1151', the previously traced circuit for retaining operated the front supervisory relay R535 in the operator position circuit 500. Upon restoring the front supervisory relay R535 interrupts, at the contacts 536, the circuit for energizing the upper winding of the front control relay R540 and a multiple circuit for illuminating the front supervisory lamp L304; whereby the front control relay R540 restores shortly thereafter, it being rendered slightly slow-to-release by virtue of the completed path for short-circuiting the lower winding thereof.

Also the #1 cord, #1 send relay R1150 completes, at the contacts 1150, a connection between the conductor C344 and the conductor C1030; the conductor C344 being included in the previously traced connection extending to the sleeve of the front plug P302 and consequently to the sleeve of the jack J610 terminating the sleeve conductor C638 of the trunk 635 having low resistance ground potential thereon at this time. The conductor C1030 extends to the digit sender #1 and specifically via the contacts 1252 and 1242, the winding of the stop send relay R1225, the contacts 1254 and 1326 and the winding of the shunt relay R1215 to battery potential. Accordingly, at this time, the upper and lower windings of the sleeve relay R650 in the toll line circuit 600 are energized in multiple and in series with the winding of the stop send relay R1225 and the winding of the shunt relay R1215 in the digit sender #1; whereby the sleeve relay R650 is retained in its operated position and the stop send relay R1225 and the shunt relay R1215 operate. In passing, it is noted that the stop send relay R1225 operates at this time by virtue of the presence of low resistance ground potential upon the conductor C1030 since the stop send relay R1225 is of the marginal type. Upon operating the shunt relay R1215 completes, at the contacts 1216, a circuit for operating the shunt slave relay R1330; and upon operating the stop send relay R1225 completes, at the contacts 1226, a circuit for operating the control relay R1320. Upon operating the control relay R1320 interrupts, at the contacts 1326, a normally completed path including the contacts 1254 for short-circuiting the resistor 1217; whereby the resistor 1217 is inserted in series circuit relation with the winding of the shunt relay R1215 and the winding of the stop send relay R1225. When the resistor 1217 is thus inserted in series circuit relation with the windings of the shunt relay R1215 and the stop send relay R1225, the relays mentioned are retained in their operated positions. Upon operating the shunt slave relay R1330 interrupts, at the contacts 1331, a normally completed shunt including the contacts 1231 between the dial conductors C1038 and C1027 extending from the digit sender #1; however, the dial conductors C1038 and C1027 are still shunted together via one path including the contacts 1441 and also via another path including the contacts 1261 and 1461. Also upon operating the shunt slave relay R1330 completes, at the contacts 1336, a circuit, including the contacts 1360 and 1255, for operating the automatic ring relay R1420.

Also upon operating the hold relay R1370 completes, at the contacts 1374, a path, including the contacts 1244, 1343, 1440, 1432 and 1458 for applying ground potential to the conductor C1465; thereby completing a circuit, including the contacts 1471, for operating the cycle relay R1480. Upon operating the cycle relay R1480 completes, at the contacts 1482, a holding circuit, including the contacts 1472, for energizing the winding thereof; and completes, at the contacts 1481, a circuit for operating the impulse relay R1460. Upon operating the impulse relay R1460 completes, at the contacts 1462, a circuit for operating the cycle relay R1470. Upon operating the cycle relay R1470 interrupts, at the contacts 1471, the initial circuit for operating the cycle relay R1480; and interrupts, at the contacts 1472, the holding circuit for retaining operated the cycle relay R1480. Upon restoring the cycle relay R1480 interrupts, at the contacts 1481, the circuit for retaining operated the impulse relay R1460; and upon restoring the impulse relay R1460 interrupts, at the contacts 1462, the circuit for retaining operated the cycle relay R1470. Upon restoring the cycle relay R1470 recompletes, at the contacts 1471, the initial circuit for operating the cycle relay R1480. Accordingly, the cycle relay R1480, the impulse relay R1460, and the cycle relay R1470 are operated through a plurality of cycles in the manner described above for a purpose more fully explained hereinafter. Each time the cycle relay R1480 operates and then restores, it interrupts and then recompletes, at the contacts 1483, the previously traced circuit, including the conductor C1022, for illuminating the sender #1 lamp L1021 in the cord and sender control circuit 1000; whereby the sender #1 lamp L1021 flashes in accordance with the cycles of the relays R1460, R1470 and R1480; which cycles normally correspond to the impulses of digits being transmitted from the digit sender #1 over the connection as explained more fully hereinafter. Also each time the impulse relay R1460 operates and then restores, it interrupts, and then recompletes, at the contacts 1461, the impulse path between the dial conductors C1038 and C1027; however, without effect at this time by virtue of the completed shunt, at the contacts 1441 of the restored alternate relay R1440, between the dial conductors C1038 and C1027. Accordingly, the impulses produced at the contacts 1461 by the impulse relay R1460 are ineffective during preliminary operation of the impulse relay R1460 and the cycle relays R1470 and R1480 in order to produce an initial space preceding the sending of the first digit.

The first time the impulse relay R1460 operates, it completes, at the contacts 1463 and 1464, paths for connecting the grounded conductor C1465 respectively to the conductors C1466 and C1467. The application of ground potential to the conductor C1466 completes a circuit, including the contacts 1554, 1547′, 1542′, 1537′ and 1532′, for operating the first counting relay R1530. Upon operating the first counting relay R1530 completes, at the contacts 1531′, a holding circuit, including the contacts 1559 and the grounded conductor C1466, for energizing the winding thereof; and interrupts, at the contacts 1532′, the initial operating circuit therefor. Also the first counting relay R1530 completes, at the contacts 1533, an alternative holding circuit, including the contacts 1538 and 1557 and the grounded conductor C1467, for energizing the winding thereof; and completes, at the contacts 1533, a path, including the conductor C1466, the contacts 1559, 1531′ and 1538, the conductor C1465 and the contacts 1463, for short-circuiting the upper winding of the control relay R1555. Finally, the first counting relay R1530 prepares, at the contacts 1534, a circuit traced hereinafter for operating the second counting relay R1535. The first time the impulse relay R1460 restores, it interrupts, at the contacts 1463, the path for short-circuiting the upper winding of the control relay R1555 and one of the holding circuits for energizing the winding of the first counting relay R1530; and interrupts, at the contacts 1464, the other holding circuit for energizing the winding of the first counting relay R1530. At this time an alternative holding circuit for energizing the winding of the first counting relay R1530 in series with the upper winding of the control relay R1555 is completed that includes the contacts 1533, 1538 and the grounded conductor C1465; whereby the first counting relay R1530 is retained in its operated position and the control relay R1555 operates. Upon operating the control relay R1555 prepares, at the contacts 1558, a further point in the circuit for operating the second counting relay R1535; and prepares, at the contacts 1556, a holding circuit traced hereinafter for energizing the lower winding thereof.

The second time the impulse relay R1460 operates, it completes, at the contacts 1463, the circuit including the contacts 1558 and 1534, as well as the conductors C1465 and C1466, for operating the second counting relay R1535; and completes, at the contacts 1464, the holding circuit including the contacts 1556, as well as the conductors C1465 and C1467, for energizing the lower winding of the control relay R1555. Accordingly, the second counting relay R1535 is operated and the control relay R1555 is retained in its operated position. Upon operating the second counting relay R1535 interrupts, at the contacts 1538, the holding circuit for energizing the winding of the first counting relay R1530 in series with the upper winding of the control relay R1555 in order to effect the restoration of the first counting relay R1530. Also the second counting relay R1535 prepares, at the contacts 1536′, a circuit for operating the third counting relay R1540; and completes, at the contacts 1539, a holding circuit, including the contacts 1543 and the grounded conductor C1465, for energizing the winding thereof. The second time the impulse relay R1460 restores, it interrupts, at the contacts 1463, the initial operating circuit for the second counting relay R1535; and interrupts, at the contacts 1464, the holding circuit for retaining operated the control relay R1555. Upon restoring the control relay R1555 prepares, at the contacts 1559, a further point in the circuit for operating the third counting relay R1540.

In view of the foregoing, it will be understood that normally at the beginning of the first impulse, the first counting relay R1530 is operated; at the conclusion of the first impulse, the control relay R1555 is operated; at the beginning of the second impulse the second counting relay R1535 is operated and the first counting relay R1530 is restored; at the conclusion of the second impulse the control relay R1555 is restored; at the beginning of the third impulse the third counting relay R1540 is operated and the second counting relay R1535 is restored; at the end of the third impulse, the control relay R1555 is reoperated; at the beginning of the fourth impulse, the fourth counting relay R1545 is operated and the third counting relay R1540 is restored; at the conclusion of the fourth impulse the control relay R1555 is restored; and at the beginning of the fifth impulse, the fifth counting relay R1550 is operated and the fourth counting relay R1545 is restored.

Also upon operating the fifth counting relay R1550 completes, at the contacts 1552, a circuit including the grounded conductor C1465 for operating the transfer relay R1520. Upon operating the transfer relay R1520 completes, at the contacts 1521, a path, including the contacts 1552, for short-circuiting the winding of the transfer relay R1525. At the conclusion of the fifth impulse, when the impulse relay R1460 restores, it interrupts, at the contacts 1463, the holding circuit including the conductor C1466, the contacts 1559 and 1553', for retaining operated the fifth counting relay R1550; whereby the latter relay restores interrupting, at the contacts 1552, the path for short-circuiting the winding of the transfer relay R1525. At this time a holding circuit, including the grounded conductor C1465 and the contacts 1521, is completed for energizing in series the windings of the transfer relays R1520 and R1525; whereby the transfer relay R1520 is retained in its operated position and the transfer relay R1525 operates. Upon operating the transfer relay R1525 interrupts, at the contacts 1526, a point in a test connection between the conductor C1473 and any one of the first five mark conductors M1 to M5, inclusive; and completes, at the contacts 1527, a point in a test connection between the conductor C1473 and any one of the second five mark conductors M6 to M0, inclusive.

Thereafter, at the beginning of the sixth impulse, the first counting relay R1530 operates; at the conclusion of the sixth impulse, the control relay R1555 operates; at the beginning of the seventh impulse, the second counting relay R1535 operates and the first counting relay R1530 restores; at the conclusion of the seventh impulse, the control relay R1555 restores; at the beginning of the eighth impulse the third counting relay R1540 operates and the second counting relay R1535 restores; at the conclusion of the eighth impulse the control relay R1555 operates; at the beginning of the ninth impulse the fourth counting relay R1545 operates and the third counting relay R1540 restores; at the conclusion of the ninth impulse the control relay R1555 restores; and at the beginning of the tenth impulse, the fifth counting relay R1550 operates and the fourth counting relay R1445 restores.

Also upon operating the fifth counting relay R1550 recompletes, at the contacts 1552, the path, including the contacts 1521, for short-circuiting the winding of the transfer relay R1525; however, before the transfer relay R1525 can restore, it being rendered slow-to-release by virtue of the short-circuit around the winding thereof, ground potential is applied at the contacts 1551 of the operated fifth counting relay R1550 via the contacts 1527 to the conductor C1473.

In the present example, the impulse relay R1460 and the cycle relays R1470 and R1480 are operated only through three cycles of operation in order to produce the initial space preceding the sending of the first digit by virtue of the connection of the spacer conductor C1474 to the third mark conductor M3; however, it will be understood that the initial space may be appropriately varied in length by connecting the spacer conductor C1474 to other of the mark conductors M2, M4, etc. Accordingly, in the present example, after three cycles of operation of the impulse relay R1460 and the cycle relays R1470 and R1480, when the third counting relay R1540 operates, it completes, at the contacts 1541, a path including the contacts 1369, 1442', 1376, 1315, 1246 and 1526 and the initial space conductor C1474, for applying ground potential to the conductor C1473; which path extends via the contacts 1362 and 1333 to the contact 1322; which path extends from the contact 1322 via the contacts 1452 and the upper windings of the alternate relays R1440 and R1450 to battery potential, and from the contacts 1322 via the contacts 1443 and the lower winding of the alternate relay R1440 to battery potential. Accordingly, at this time, the upper and lower windings of the alternate relay R1440 are energized, while only the upper winding of the alternate relay R1450 is energized; whereby the alternate relay R1440 does not operate and the alternate relay R1450 does operate, since the alternate relays R1440 and R1450 are of the differential type. Upon operating the alternate relay R1450 completes, at the contacts 1451, a holding circuit for energizing in multiple the upper windings of the alternate relays R1440 and R1450; and interrupts, at the contacts 1452, the original circuit for energizing in multiple the upper windings of the alternate relays R1440 and R1450. Also the alternate relay R1450 completes, at the contacts 1453, a holding circuit, including the contacts 1445, 1322, 1333 and 1362 and the grounded conductor C1473, for retaining operated the cycle relay R1470. The operated cycle relay R1470 prevents further cyclic operation thereof in conjunction with the cycle relay R1480 and the impulse relay R1460 and the consequent further operation of the fourth, etc., counting relays R1545, etc., at this time.

Also the alternate relay R1450 interrupts, at the contacts 1458, the previously traced path for applying ground potential to the conductor C1465, thereby to effect the restoration of the third counting relay R1540 at this time. Upon restoring the third counting relay R1540 interrupts, at the contacts 1541, the connection between the grounded initial space conductor C1474 and the conductor C1473. Also the alternate relay R1450 completes, at the contacts 1451', a circuit, including the contacts 1323, 1384 and 1237, for energizing the lower winding of the initial space relay R1310 in order to cause the latter relay to operate. Upon operating the initial space relay R1310 completes, at the contacts 1311, a holding circuit, including the contacts 1334, 1384 and 1237, for energizing the lower winding thereof; interrupts, at the contacts 1315, the path for applying ground potential to the initial space conductor C1474; and completes, at the contacts 1314, a path, including the contacts 1376, 1442', and 1369, for applying ground potential to the inter-digit space conductor C1475; which will be utilized for a purpose more fully explained hereinafter. When ground potential is removed from the conductor C1473, the circuit for energizing the lower winding of the alternate relay R1440 is interrupted; whereby the latter relay operates since only the upper winding thereof is energized at this time. Upon operating the alternate relay R1440 prepares, at the contacts 1449, a path traced hereinafter for returning ground potential upon the conductor C1465; interrupts, at the contacts 1441, the previously mentioned shunt connection between the dialing conductors C1038 and C1027; and interrupts, at the contacts 1445, the previously traced holding circuit for retaining operated the cycle relay R1470. Upon restoring the cycle relay R1470 conditions the cycle relay R1480 and the impulse relay R1460 for further operation. Also upon operating the alternate relay R1440 completes, at the contacts 1443', a multiple circuit, including the contacts 1336 and 1360, for operating the control relay R1430 and the test relay R1250. Upon operating the control relay R1430 completes, at the contacts 1431, a multiple path for applying ground potential to the hold conductor C1032; and completes, at the contacts 1434, a multiple holding circuit, including the contacts 1327, for retaining operated the control relay R1320.

Upon operating the test relay R1250 completes, at the contacts 1251, an alternative holding circuit, including the contacts 1242 and the resistor 1217, for retaining operated the stop send relay R1225 and the shunt relay R1215; and interrupts, at the contacts 1252, the previously traced original circuit for energizing the multiple connected upper and lower winding of the sleeve relay R650 in the toll line circuit 600 in series with the windings of the stop send relay R1225 and the shunt relay R1215 in the digit sender #1. Also the test relay R1250 interrupts, at the contacts 1255, the circuit for retaining operated the automatic ring relay R1420 in order to cause the latter relay to restore shortly thereafter, it being of the slow-to-release type. Upon restoring the automatic ring relay R1420 completes, at the contacts 1421, a path, including the contacts 1253, between the conductors C1030 and C1029; the conductor C1029 being extended via the contacts 1159, the conductor C573 and the contacts of the automatic ring key K563 to ground potential. Accordingly, at this time ground potential is applied to the conductor C1030 and consequently via the previously traced path to the sleeve of the front plug P302, thereby short-circuiting in multiple the upper and lower windings of the sleeve relay R650 in the toll line circuit 600 causing the latter relay to restore.

Upon restoring the sleeve relay R650 interrupts, at the contacts 652, the circuit for retaining operated the switch relay R645. Upon restoring the switch relay R645 interrupts, at the contacts 646 and 648, the previously traced connections between the tip and the ring of the jack J610 and the windings 623 and 624 of the repeating coil 620; completes, at the contacts 647, a path for applying ground potential via the line conductor C636 of the trunk 635 to the tip of the jack J610; and completes, at the contacts 649, a connection, including the line conductor C636' of the trunk 635 and the contacts 696, between the simplex of the trunk line 710 and the ring of the jack J610. At this time the tip of the jack J610 is connected through the cord circuit #1 and the digit register #1 to the ring thereof; whereby ground potential is forwarded over the simplex of the trunk line 710 retaining operated the simplex relay R750 in the repeater 700. Finally, the switch relay R645 interrupts, at the contacts 645', the original path for applying ground potential by way of the upper winding of the supervisory relay R665 to the simplex of the trunk line 710 causing the supervisory relay R665 to restore, without effect at this time.

Also upon restoring the automatic ring relay R1420 completes, at the contacts 1422, an alternative path, including the contacts 1374, 1244, 1343, 1449, and 1457, for returning ground potential upon the conductor C1465, thereby to initiate further operation of the cycle relays R1480 and R1470 and the impulse relay R1460. At this time a shunt connection between the dial conductor C1038 and C1027 is completed only at the contacts 1461 of the restored impulse relay R1460. Accordingly each time the impulse relay R1460 operates and then restores, it interrupts and then recompletes, at the contacts 1461, the connection between the dial conductors C1038 and C1027, thereby to transmit the impulses of the first digit thereover. In passing it is noted that the dial conductors C1038 and C1027 are connected together via the condenser 1213 and the series resistor 1214 in order to prevent sparking at the contacts 1461 incident to the transmission of impulses over the dial conductors C1038 and C1027 by the impulse relay R1460. In the present example, it has been assumed that the first digit 4 is registered in the first digit register in the digit registers #1; whereby the impulse relay R1460 is operated four times before further operation thereof is arrested as explained more fully below. As the impulse relay R1460 operates and restores, in accordance with the impulses of the first digit 4, the counting relays R1530, etc., are sequentially operated in the manner previously explained; and in accordance with the present example, when the fourth counting relay R1545 is operated, it completes, at the contacts 1546, a connection including the contacts 1526 between the grounded fourth mark conductor M4 and the conductor C1473; whereby a circuit, including the contacts 1362, 1333, 1322 and 1442, is completed for energizing the lower winding of the alternate relay R1450. When the upper and lower windings of the alternate relay R1450 are thus energized, the latter relay restores to complete, at the contacts 1454, an alternative holding circuit, including the contacts 1444, 1322, 1333 and 1362, and the grounded conductor C1473, for retaining operated the cycle relay R1470 in order to bring about the restoration of the cycle relay R1480 and the impulse relay R1460 at this time. Also upon restoring, the alternate relay R1450 recompletes, at the contacts 1452, the previously traced original circuit for energizing in multiple the upper windings of the alternate relays R1440 and R1450; and interrupts, at the contacts 1451, the previously traced holding circuit for energizing in multiple the upper windings of the alternate relays R1440 and R1450. Also upon restoring the alternate relay R1450 completes, at the contacts 1459, a path, including the contacts 1369, 1441', 1356, 1375 and 1417, for applying ground potential to the conductor C1508, thereby to complete a circuit for operating the release relay R1610 in the digit registers #1. Upon operating the release relay R1610 completes, at the contacts 1617, a path, including the grounded conductor C1508, the contacts 1645, the conductor C1503 and the contacts 1384 and 1237, for short-circuiting the upper winding of the transfer relay R1410. Also the release relay R1610 interrupts, at the contacts 1619, the previously traced holding circuit for energizing the winding of the transfer relay R1620 in series with the multiple connected windings of the mark relays 1X and 1Y in the first digit register; whereby the transfer relay R1620 and the mark relays 1X and 1Y restore. Upon restoring the transfer relay R1620 completes, at the contacts 1622, a connection between the winding of the connect relay R1630 and the conductor C1605 extending to the ninth individual digit register in the last group of digit registers in order to prepare the first digit register for re-use in the registration of a tenth digit, if necessary; this arrangement comprising a portion of that for reflexing the registers in the digit register #1 as previously explained. Also the release relay R1610 prepares, at the contacts 1611, a connection between the conductor C1504 and the contacts governed by the mark relays 2W, etc., in the second digit register; thereby to condition the second digit register to govern subsequent operation of the digit sender #1 in accordance with the second digit registered in the second digit register. Further the release relay R1610 completes, at the contacts 1618, a multiple holding circuit, including the grounded release conductor C1501, for retaining operated the transfer relay R1650 and the mark relays 2W, etc., in the second digit register.

Also upon restoring the alternate relay R1450 interrupts, at the contacts 1457, the path for applying ground potential to the conductor C1465 in order to effect the restoration of the fourth counting relay R1545. Upon restoring the fourth counting relay R1545 interrupts, at the contacts 1546, the previously traced path for applying ground potential to the conductor C1473 thereby to interrupt the multiple circuits for energizing the upper windings of the alternate relays R1440 and R1450 and the lower winding of the alternate relay R1450, thereby to cause the alternate relay R1440 to restore and to retain the alternate relay R1450 in its restored position. Upon restoring the alternate relay R1440 interrupts, at the contacts 1441′, the previously traced path for applying ground potential to the conductor C1508, whereby a series holding circuit is completed for energizing the upper winding of the transfer relay R1410 in the digit sender #1 and the winding of the release relay R1610 in the digit registers #1; which circuit includes the contacts 1237 and 1384, the upper winding of the transfer relay R1410, the conductor C1503, the contacts 1645 and 1617 and the winding of the release relay R1610. When this series holding circuit is completed the release relay R1610 is retained in its operated position and the transfer relay R1410 operates. Upon operating the transfer relay R1410 completes, at the contacts 1413, a holding circuit, including the contacts 1384 and 1237, for energizing the lower winding thereof; and completes, at the contacts 1412, a path for short-circuiting the upper winding thereof. Also the transfer relay R1410 transfers, at the contacts 1415 and 1414, the marking circuit from the conductor C1505 to the conductor C1504; and transfers, at the contacts 1417 and 1416, the release circuit from the conductor C1508 to the conductor C1507; which circuit transfers will be utilized in order to govern the release of the second digit register in the digit registers #1 following the subsequent transmission of the second digit registered therein by the digit sender #1 as explained more fully hereinafter. Also the alternate relay R1440 interrupts, at the contacts 1444, the holding circuit for retaining operated the cycle relay R1470; whereby further operation of the cycle relays R1480 and R1470 and the impulse relay R1460 is initiated when ground potential is again returned upon the conductor C1465.

Further the alternate relay R1440 interrupts, at the contacts 1443′, the multiple circuit for energizing the windings of the control relay R1430 and the test relay R1250; whereby the test relay R1250 restores immediately and the control relay R1430 restores shortly thereafter, it being of the slow-to-release type. Upon restoring the control relay R1430 recompletes, at the contacts 1432, the path for returning ground potential upon the conductor C1465; whereby further operations of the cycle relays R1480 and R1470 and the impulse relay R1460 takes place. The impulse relay R1460 again effects sequential operation of the counting relays R1530, etc. Specifically, the cycle relays R1480 and R1470 and the impulse relay R1460 are operated through seven cycles constituting an inter-digit space between the transmission of the first digit 4 and the second digit by the digit sender #1; whereby the second counting relay R1535 is reoperated incident to the seventh operation of the impulse relay R1460 in the manner previously explained. In other words when the seventh impulse is counted, the second counting relay R1535 reoperates for a purpose more fully explained hereinafter. Also, upon restoring the alternate relay R1440 completes, at the contacts 1441, the previously traced shunt around the contacts 1461 across the dialing conductors C1038 and C1027, thereby rendering ineffective the contacts 1461 of the impulse relay R1460 during operation of the impulse relay R1460 while the inter-digit space is being produced as explained more fully hereinafter.

In view of the foregoing, it will be understood that the digit sender #1 has operated to send the first digit 4 registered in the first digit register in the digit registers #1; which first digit 4 is sent over the dial conductors C1038 and C1027. More particularly, the first digit 4 is sent from the digit sender #1 via the cord and sender control circuit 1000, the front plug P302 of the cord circuit #1 to the simplex of the trunk line 710. Specifically, the dial conductors C1038 and C1027 are extended via the contacts 1153, 1158, the conductors C340 and C341, the eighth and fourth contacts of the ring front key K316 and the ring and the tip of the front plug P302 to the ring and the tip of the jack J610. Accordingly, ground potential at the contacts 647 of the switch relay R645 is repeated as impulses at the contacts 1461 of the impulse relay R1460 over the simplex of the trunk line 710 and thence to the lower winding of the simplex relay R750 in the repeater 700; whereby the latter relay follows. Each time the simplex relay R750 restores and then reoperates, it interrupts and then recompletes, at the contacts 752, the circuit for energizing the winding of the hold relay R760; whereby the latter relay, being of the slow-to-release type, is retained in its operated position during impulsing. Also each time the simplex relay R750 restores and then reoperates, it completes and then interrupts, at the contacts 753, a circuit, including the contacts 762 and 798, for energizing the winding of the dial relay R755; whereby the latter relay operates and remains operated during impulsing. Upon operating the dial relay R755 completes, at the contacts 757, a holding circuit, including the contacts 748, for energizing the winding of the control relay R745; and completes, at the contacts 756, a path, including the contacts 782, the resistors 708 and 700 and the lower winding of the supervisory relay R740 for short-circuiting the winding 733 of the repeating coil 730 over the line conductors C721 and C722 of the trunk 720 at this time. Moreover, the supervisory relay R740 restores; however, without effect at this time. Further, each time the simplex relay R750 restores and then reoperates, it interrupts and then recompletes, at the contacts 751, the loop circuit extending via the trunk 720 and the finder 705 to the line relay in the selector 706; whereby the first digit 4 is repeated by the simplex relay R750 to the selector 706 in order to effect corresponding operation thereof. More particularly, the selector 706 responds to the first digit 4 to select the group of combination connectors, including the combination connectors 707, etc., and then to select an idle combination connector in the group mentioned. For example, the selector 706 may select the particular combination connector 707; whereupon it switches through completing a loop circuit between the repeater 700 and the line relay in the combination connector 707.

At the conclusion of the first digit 4, the simplex relay R750 is retained in its operated position and shortly thereafter, the dial relay R755 restores as it is of the slow-to-release type. Upon restoring the dial relay R755 interrupts, at the contacts 756, the previously traced path for short-circuiting the lower winding of the supervisory relay R740; whereby it is energized in the previously mentioned loop circuit extending to the line relay in the combination connector 707 causing the supervisory relay R740 to reoperate. Also the dial relay R755 interrupts, at the contacts 757, the holding circuit for energizing the winding of the control relay R745; however, without effect since the operated supervisory relay R740 retains the control relay R745 in its operated position. Accordingly, low resistance battery potential via the lower winding of the simplex relay R750 is again returned over the simplex of the trunk line 710, constituting a ready signal.

Returning now to the operation of the digit sender #1 at the conclusion of the sending of the first digit 4, the alternate relay R1440 restores as previously noted, effecting immediate restoration of the test relay R1250 and restoration shortly thereafter of the control relay R1430, it being of the slow-to-release type. Upon restoring the test relay R1250 interrupts, at the contacts 1251, the holding circuit for retaining operated the stop send relay R1225 and the shunt relay R1215; and interrupts, at the contacts 1253, the previously traced path for applying ground potential to the conductor C1030. When ground potential is thus removed from the conductor C1030, the previously traced path for short-circuiting the upper winding of the sleeve relay R650 in the toll line circuit 600 is interrupted. Also, at the contacts 1252, the test relay R1250 recompletes the previously traced series circuit for energizing the windings of the shunt relay R1215 and the stop send relay R1225 in the digit sender #1 and the upper winding of the sleeve relay R650 in the toll line circuit 600; which circuit includes the contacts 1254 and 1433 at this time. When this series circuit is thus completed, the sleeve relay R650 and the shunt relay R1215 reoperate; however, the stop send relay R1225 does not immediately reoperate as it is of the marginal type. Upon reoperating, the sleeve relay R650 recompletes, at the contacts 652, the circuit for operating the switch relay R645. Upon reoperating the switch relay R645 recompletes, at the contacts 645', the previously traced path for applying ground potential through the upper winding of the supervisory relay R665 to the simplex of the trunk line 710; whereby the supervisory relay R665 is reoperated at this time by virtue of the return of low resistance battery potential via the lower winding of the simplex relay R750 in the repeater 700 over the simplex of the trunk line 710, the supervisory relay R665 being of the marginal type as previously noted. Accordingly, at this time the series circuit mentioned retains operated the simplex relay R750 in the repeater 700 and effects reoperation of the supervisory relay R665 in the toll line circuit 600. Upon reoperating the supervisory relay R665 recompletes, at the contacts 666, the previously traced circuit for energizing in multiple the upper and lower windings of the sleeve relay R650; whereby low resistance ground potential is returned over the conductor C1030 via the previously traced path effecting reoperation of the stop send relay R1225. Upon reoperating the stop send relay R1225 recompletes, at the contacts 1226, the original operating circuit for the control relay R1320. Upon restoring the control relay R1430 interrupts, at the contacts 1433, the path for short-circuiting the resistor 1217; whereby the resistor 1217 is inserted in the series circuit for energizing the winding of the stop send relay R1225; however, without effect since the stop send relay R1225 already occupies its operated position at this time. Also upon restoring the test relay R1250 recompletes, at the contacts 1255, the previously traced circuit for operating the automatic ring relay R1420.

At the conclusion of the inter-digit space, the second counting relay R1535 operates to complete, at the contacts 1537, a path, including the contacts 1527 between the inter-digit space conductor C1475 and the conductor C1473. At this time the inter-digit space conductor C1475 has ground potential applied thereto via the contacts 1314, 1376, 1442' and 1369; whereby ground potential is again applied to the conductor C1473 again energizing the upper winding of the alternate relay R1450 and the upper and lower windings of the alternate relay R1440; whereby only the alternate relay R1450 is reoperated as previously explained. Upon reoperating the alternate relay R1450 recompletes, at the contacts 1453, the holding circuit for retaining operated the cycle relay R1470 in order to arrest further operation thereof; whereby the cycle relay R1480 and the impulse relay R1460 restore. Also the alternate relay R1450 interrupts, at the contacts 1456, the path for applying ground potential to the conductor C1465 in order to effect the restoration of the second counting relay R1535, the control relay R1555 and the transfer relays R1520 and R1525. Upon restoring the second counting relay R1535 interrupts, at the contacts 1537, the connection between the grounded inter-digit space conductor C1475 and the conductor C1473; whereby the upper windings of the alternate relays R1440 and R1450 are energized in multiple retaining the alternate relay R1450 in its operated position and effecting operation of the alternate relay R1440. Upon operating the alternate relay R1440 interrupts, at the contacts 1441, the shunt in multiple to the contacts 1461 across the dial conductors C1038 and C1027; whereby further operation of the sender #1 to send the second digit is dependent upon reoperation of the stop send relay R1225 as explained more fully hereinafter.

Again assuming that the selector 700 has responded to the first digit 4 to select the combination connector 707, the combination connector 707 is ready to receive the second digit; and accordingly, the repeater 700 and the toll line circuit 600 have been governed in the manner previously explained to effect reoperation of the stop send relay R1225 in the digit sender #1 in the manner explained above. Accordingly, when the alternate relay R1440 reoperates, at the conclusion of the inter-digit space, it also effects reoperation of the control relay R1430 and the test relay R1250; the test relay R1250 effecting restoration of the automatic ring relay R1420 shortly thereafter, the latter relay being of the slow-to-release type. Upon restoring the automatic ring relay R1420 recompletes, at the contacts 1422, the previously traced path for applying ground potential to the conductor C1465 in order to initiate reoperation of the cycle relays R1480 and R1470 and the impulse relay R1460; and recompletes, at the contacts 1421 the previously traced path for applying ground potential to the conductor C1030 in order again to short-circuit the upper and lower windings of the sleeve relay R650 in the toll line circuit 600 causing the latter relay to restore. Also the test relay R1250 again completes, at the contacts 1251, the holding circuit for retaining operated the stop send relay R1225 and the shunt relay R1215. The sleeve relay R650 in the toll line circuit 600 restores effecting restoration of the switch relay R645; whereby the latter relay recompletes, at the contacts 647 and 649, the loop circuit including the contacts 1461 of the impulse relay R1460 in the digit sender #1 and the simplex of the trunk line 710 for energizing the lower winding of the simplex relay R750 in the repeater 700.

At this time when ground potential is returned upon the conductor C1465, the cycle relays R1480 and R1470 and the impulse relay R1460 are reoperated, the impulse relay R1460 repeating, at the contacts 1461, over the trunk line 710 to the lower winding of the simplex relay R750 in the repeater 700. More particularly the impulses of the second digit registered in the second digit register in the digit register #1 are transmitted causing the simplex relay R750 in the repeater 700 to follow effecting operation of the dial relay R755 during impulsing. At the conclusion of the sending of the second digit registered in the second digit register, when the corresponding counting relay R1530, etc., operates, a connection is completed between the conductor C1473 and the corresponding grounded mark conductors M1, etc.; which connection also includes the grounded conductor C1504. More particularly, ground potential is applied by way of the contacts 1237, 1384, 1364, 1446 and 1414 to the conductor C1504; which conductor C1504 is connected via the contacts 1611 and the contact or contacts of the mark relays 2W, etc., in the second digit register to one of the mark conductors M1, etc. Accordingly, when the second digit has been transmitted, the corresponding counting relay R1530, etc., operates applying ground potential to the conductor C1473 as noted above; whereby the alternate relay R1450 is restored in the manner previously explained interrupting, at the contacts 1457, the path for applying ground potential to the conductor C1465; and completing, at the contacts 1454, the holding circuit for retaining operated the cycle relay R1470. Accordingly, the cycle relay R1480 and the impulse relay R1460 restore; and likewise, the operated counting relay R1530, etc., restores, as well as the control relay R1555 and the transfer relays R1520 and R1525 if they too are operated. When the operated counting relay R1530, etc., restores, ground potential is removed from the conductor C1473 bringing about the restoration of the alternate relay R1440. Upon restoring the alternate relay R1440 recompletes, at the contacts 1441, the shunt across the dialing conductors C1030 and C1027; interrupts, at the contacts 1444, the holding circuit for retaining operated the cycle relay R1470; and interrupts, at the contacts 1443', the circuit for energizing in multiple the windings of the test relay R1250 and the control relay R1430; whereby the test relay R1250 restores immediately and the control relay R1430 restores shortly thereafter, it being of the slow-to-release type. Upon restoring the test relay R1250 recompletes, at the contacts 1255, the circuit for operating the automatic ring relay R1420; whereby the latter relay upon reoperating interrupts, at the contacts 1421 the path for applying ground potential to the conductor C1030.

The simplex relay R750 in the repeater 700 follows the impulses of the second digit in the manner previously explained repeating, at the contacts 751, to the combination connector 707 in order to control operation thereof; and at the conclusion of the second digit the simplex relay R750 is retained in its operated position effecting restoration of the dial relay R755 shortly thereafter, the latter relay being of the slow-to-release type. At this time the supervisory relay R740 is reoperated retaining operated the control relay R745. When ground potential is removed from the conductor C1030 and the conductor C1030 is reconnected to the windings of the stop send relay R1225 and the shunt relay R1215 and the digit sender #1, the sleeve relay R650 in the toll line circuit 600 reoperates. The sleeve relay R650 effects reoperation of the switch relay R645; and the latter relay effects reoperation of the supervisory relay R665. The supervisory relay R665 again energizes in multiple the upper and lower windings of the sleeve relay R650; whereby the stop send relay R1225 in the digit sender #1 is reoperated in series with the shunt relay R1215.

Also, at the conclusion of the sending of the second digit by the digit sender #1, when the alternate relay R1450 is restored and prior to the restoration of the alternate relay R1440, the alternate relay R1450 completes, at the contacts 1459, a path including the contacts 1369, 1441', 1356, 1375 and 1416, for applying ground potential to the conductor C1507 extending to the digit registers #1; which circuit is extended via the contacts 1712 and a chain circuit through the intermediate group of digit registers and the last group of digit registers to the conductor C1601; which circuit is further extended by way of the contacts 1613 and 1643 and the winding of the release relay R1640 to battery potential. Accordingly, the release relay R1640 is operated interrupting, at the contacts 1648, the holding circuit for retaining operated the transfer relay R1650 and the operated one of the mark relays 2W, etc., in the second digit register; whereby the second digit register is released. Also the release relay R1640 completes, at the contacts 1646, a holding circuit for energizing the winding thereof via the grounded conductor C1503; which circuit includes the contacts 1716. Also the release relay R1640 interrupts, at the contacts 1645, the holding circuit for retaining operated the release relay R1610 via the grounded conductor C1503. Further the release relay R1640 completes, at the contacts 1649, a holding circuit including the grounded release conductor C1501 for energizing the winding of the transfer relay R1720 in series with the operated mark relay 3W, etc., in the third digit register. Further the release relay R1640 completes, at the contacts 1648, a connection between the conductor C1504 and one of the mark conductors M1, etc., via the contacts of the operated mark relay 3W, etc., in the third digit register. Upon restoring, the release relay R1610 interrupts, at the contacts 1611, the connection between the conductor C1504 and the contacts of the mark relays 2W, etc., in the second digit register. Accordingly, at this time, the second digit register has been disconnected to control the mark conductors M1, etc., and the third digit register has been connected to control the mark conductors M1, etc.

At the conclusion of the second digit, when the alternate relay R1440 restores, the cycle relay R1470 is restored and the control relay R1430 is restored shortly thereafter, as previously noted. Upon restoring the control relay R1430 recompletes, at the contacts 1432, the path for returning ground potential upon the conductor C1465, thereby to initiate further operation of the cycle relays R1480 and R1470 and the impulse relay R1460 to produce the inter-digit space between the second and third digits.

In view of the foregoing description of the operation of the sender #1 in conjunction with the digit registers #1 to send the first and second digits, it will be understood that the digit sender #1 operates sequentially to transmit the third, etc., digits registered in the digit registers #1. In the present example, only three digits are registered in the digit registers #1; and when the third digit is sent by the digit sender #1 the combination connector 707 is operated to select the subscriber line 702 extending to the called subscriber substation T701 in the C. A. X 40.

After the operator at the first position at the toll board 50 has keyed up on the key set K1000, all of the digits comprising the directory number of the called substation T701 in the C. A. X 40, she operates the call completed key or button causing ground potential to be connected to the call completed conductor C1005; whereby ground potential is forwarded via the contacts 1084 and the conductor C1035 completing a circuit for energizing the lower winding of the call complete relay R1210 in the digit sender #1 causing the latter relay to operate. Upon operating the call complete relay R1210 completes, at the contacts 1214, a holding circuit, including the conductor C1033, the contacts 1241, the conductor C1031, and the contacts 1072 and 1051, for energizing the lower winding thereof. Also upon operating the call complete relay R1210 interrupts, at the contacts 1212, the path for applying ground potential to the conductor C1020, thereby to effect the restoration of the connect #1 relay R1080 in the cord and sender control circuit 1000. Upon restoring the connect #1 relay R1080 interrupts, at the contact 1086, etc., the connections between the mark conductor C1001, etc., and the conductor C1011, etc., extending to the digit sender #1, thereby to disconnect the key set K1000 from the digit register #1. Further the call complete relay R1210 completes, at the contacts 1213, and 1211, a holding circuit including the contacts 1371, for energizing the upper winding thereof. Also upon restoring the connect #1 relay R1080 interrupts, at the contacts 1083, the previously traced holding circuit for retaining operated the send front relay R1045.

After all of the digits registered in the digit registers #1 have been sent by the digit sender #1, the last operated one of the transfer relays R1620, etc., is restored, interrupting, at the contacts 1623, etc., the last connection between the grounded release conductor C1501 and the hold conductor C1506, thereby effecting the restoration of the hold relay R1370 in the digit sender #1. Upon restoring the hold relay R1370 interrupts, at the contacts 1372, with the path for applying ground potential to the hold conductor C1032, thereby to interrupt the holding circuit for retaining operated the #1 cord #1 send relay R1150 in the cord sender control circuit 1000. Upon restoring the #1 cord #1 send relay R1150 interrupts, at the contacts 1153 and 1158, the connection between the front plug 302 of the cord #1 and the dial conductors C1038 and C1027 extending to the digit sender #1; and recompletes, at the contacts 1152 and 1157, the connections between the front plug P302 and the upper and lower windings of the impedance element 545. Also the #1 cord #1 send relay interrupts, at the contacts 1150, the connection between the conductor C1030 extending to the digit sender #1 and the conductor C344 extending to the sleeve of the front plug P302; and completes, at the contacts 1151′, the connection between the conductor C344 and the conductor C343 extending through the winding of the front supervisory relay R535 in the operator position circuit 500 and the resistor 1510 to battery potential. Accordingly, at this time, the upper winding of the sleeve relay R650 in the toll line circuit 600 is energized in series with the winding of the front supervisory relay R535 causing the sleeve relay R650 to operate, whereas the front supervisory relay R535 does not immediately operate as it is of the marginal type. Upon operating the sleeve relay R650 effects reoperation of the switch relay R645; whereby the latter relay completes, at the contacts 646 and 647, the previously traced connection between the tip and the ring of the jack J610 and the windings 623 and 624 of the repeating coil 620. Also the switch relay R645 completes, at the contacts 645′, the previously traced circuit for energizing the upper winding of the supervisory relay R665 over the simplex of the trunk line 710; whereby the supervisory relay R665 is operated in the event low resistance battery potential is connected in the repeater 700 to the simplex of the trunk line 710.

At this time the combination connector 707 has operated to select the subscriber line 702 extending to the called subscriber substation T701 in the C. A. X 40; and the subsequent operation of the combination connector 707 depends upon the idle or busy condition of the called subscriber substation T701. First assuming that the called subscriber substation T701 is idle at this time, the combination connector 707 operates to project ringing current over the subscriber line 702 and also to retain the lower winding of the supervisory relay R740 poled to operate, which occurs incident to restoration of the dial relay R755 at the conclusion of the third digit. Upon operating the supervisory relay R740 retains operated the control relay R745; whereby battery potential is connected by way of the lower winding of the simplex relay R750 to the simplex of the trunk line 710. Accordingly, the lower winding of the simplex relay 750 in the repeater 700 is energized in series with the upper winding of the supervisory relay R665 in the toll line circuit 600 retaining the simplex relay R750 in its operated position and effecting operation of the supervisory relay R665, the latter relay being of the marginal type. Upon operating the supervisory relay R665 completes, at the contacts 666, the circuit for energizing in multiple the upper and lower windings of the sleeve relay R650 and in series with the winding of the front supervisory relay R535 in the operator position circuit 500 causing the latter relay to operate, it being of the marginal type. Upon operating the front supervisory relay R535 effects operation of the front control relay R540; whereby the latter relay completes, at the contacts 542, the circuit for illuminating the front supervisory lamp L304 in order to indicate to the operator at the first position at the toll board 50 that the call has been extended to the called subscriber substation T701 in the C. A. X 40 and that ringing current is being projected thereto at this time.

Continuing now with the release of the digit sender #1, the hold relay R1370 also interrupts, at the contacts 1371, the path for applying ground potential to the conductor C1024, thereby to interrupt the holding circuit for energizing the upper winding of the call complete relay R1210 and the holding circuit for energizing the winding of the start relay R1380 in order to cause these relays to restore. Upon restoring the start relay R1380 interrupts, at the contacts 1384, the holding circuit for energizing the lower winding of the transfer relay R1410 in order to cause the latter relay to restore. Also the start relay R1380 interrupts, at the contacts 1384, the path for applying ground potential to the conductor C1503. When ground potential is removed from the conductor C1503, the last operated one of the release relays R1610, etc., is restored; whereby the digit registers #1 are completely released at this time. Also when the digit sender #1 is disconnected from the cord and sender control circuit 1000, the stop send relay R1225 and the shunt relay R1215 are restored effecting the immediate restoration of the control relay R1320 and the restoration shortly thereafter of the shunt slave relay R1330, the latter relay being of the slow-to-release type. At this time the digit sender #1 is completely released except for the operated call complete relay R1210 that is retained operated together with the select #1 relay R1070 in the cord and sender control circuit 1000, assuming that the talk key K313 of the cord circuit #1 is retained in its operated position maintaining operated the talk relay R1050. However, the restored start relay R1380 recompletes, at the contacts 1381, the path for applying ground potential to the conductor C1037, thereby again to prepare the sequence relay R1180 in the cord and sender control circuit 1000 for subsequent operation.

When the subscriber at the called subscriber substation T701 in the C. A. X 40 answers the call, the combination connector 707 operates to reverse the polarity over the trunk 720, thereby to pole the lower winding of the supervisory relay R740 to restore. Upon restoring the supervisory relay R740 interrupts, at the contacts 741, the circuit for retaining operated the control relay R745. Upon restoring the control relay R745 interrupts, at the contacts 746, the path for connecting the lower winding of the simplex relay R750 to the simplex of the trunk line 710; and completes, at the contacts 747, the path for connecting the upper and lower windings of the simplex relay R750 in series to the simplex of the trunk line 710. At this time the upper and lower windings of the simplex relay R750 in the repeater 700 are energized in series with the upper winding of the supervisory relay R665 in the toll line circuit 600 causing the supervisory relay R665 to restore, the latter relay being of the marginal type. Upon restoring the supervisory relay R665 interrupts, at the contacts 666, the circuit for energizing the lower winding of the sleeve relay R650 in multiple with the upper winding thereof; whereby the upper winding of the sleeve relay R650 is energized in series with the winding of the front supervisory relay R535 causing the latter relay to restore, it being of the marginal type. Upon restoring the front supervisory relay R535 effects the restoration of the front control relay R540; whereby the latter relay extinguishes the front supervisory lamp L304 indicating to the operator at the first position at the toll board 50 that the subscriber at the called subscriber substation T701 in the C. A. X 40 has answered the call.

At this time an established connection is completed between the calling subscriber substation T401 in the central office 10 and the called subscriber substation T701 in the C. A. X 40; which connection also includes the telephone circuit 200 at the first operator position at the toll board 50. At this time the operator at the first position at the toll board 50 may retire from the established connection by restoring the talk key K313; whereby there is interrupted, at the fifth contacts thereof, the holding circuit for energizing in series the right-hand winding of the connect relay R320 and the winding of the talk relay R210 causing the relays mentioned to restore. Upon restoring the talk relay R210 interrupts, at the contacts 212 and 213, the connection between the talk conductors C241 and C242 and the windings 236, 237 and 238 of the repeating coil 235; and completes, at the contacts 211 and 214, a path for bridging the reactors 218 and 219 in series across the talk conductors C241 and C242. Also the talk relay R210 interrupts, at the contacts 216, the circuit for retaining operated the talk relay R1050 in the cord and sender control circuit 1000. Upon restoring the talk relay R1050 interrupts, at the contacts 1051, the holding circuit for energizing the upper winding of the select #1 relay, thereby to cause the latter relay to restore and to prepare, at the contacts 1073, a circuit traced hereinafter for energizing the lower winding of the select #2 relay R1195; which circuit is completed incident to reoperation of the talk relay R1050 when a cord circuit is next connected to the position circuit 500 as explained more fully hereinafter. Also the talk relay R1050 interrupts, at the contacts 1051, the path for applying ground potential to the conductor C1031 extending to the sender #1 in order to interrupt the holding circuit for energizing the lower winding of the call complete relay R1210. The call complete relay R1210 then restores effecting the complete release of the sender #1. Also when the talk key K313 is restored, there is interrupted, at the fifth contacts thereof the circuit for retaining operated the #1 cord relay R1140 in the cord and sender control circuit 1000.

Upon restoring the connect relay R320 in the cord circuit #1 interrupts, at the contacts 323, etc., the connections between the cord circuit #1 and the operator position circuit 500; and completes, at the contacts 325, 328, etc., direct connections between the rear and front plugs P301 and P302. At this time the tip and the ring of the rear plug P301 are connected by way of the second and seventh contacts of the ring rear key K315, the contacts 328, 325, the conductors C339, C338, the contacts 1167, 1162 and 1157, 1152, the conductors C341, C340, and the fourth and eighth contacts of the ring front key K316 to the tip and the ring of the front plug P302. Also the sleeve of the rear plug P301 is connected by way of the contacts 322 to the rear lamp L303; and the sleeve of the front plug P302 is connected by way of the conductor C344, the contacts 1151' and 1161', the conductor C343 and the contacts 320 to the front supervisory lamp L304. At this time the rear supervisory lamp L303 is extinguished indicating that the calling subscriber substation T401 in the central office 10 is connected; and the front supervisory lamp L304 is extinguished indicating that the called subscriber substation T701 in the C. A. X 40 is connected.

At the conclusion of the established connection when the subscriber at the calling subscriber substation T401 in the central office 10 disconnects, the loop circuit extending therefrom to the upper and lower windings of the line relay R450 in the C. L. R. trunk circuit 400 is interrupted, causing the latter relay to restore. Upon restoring the line relay R450 completes, at the contacts 454, a path for applying ground potential to the sleeve of the jack J440, thereby completing the previously traced circuit for illuminating the rear supervisory lamp L303 in order to indicate to the operator at the first position at the toll board 50 that the subscriber at the calling subscriber substation T401 has disconnected. At this time, the operator may release the connection extending to the calling subscriber substation T401 by withdrawing the rear plug P301 from the jack J440, thereby extinguishing the rear supervisory lamp L303. The first contacts of the jack J440 are then opened interrupting the multiple holding circuits for energizing the winding of the jack relay R480 and the lower winding of the answer relay R465 causing these relays to restore. Upon restoring, the answer relay R465 interrupts, at the contacts 468, the circuit for energizing the winding of the hold relay R460 in order to cause the latter relay to restore shortly thereafter, it being of the slow-to-release type. Upon restoring the hold relay R460 interrupts, at the contacts 462, the path for applying ground potential to the control conductor C423 of the C. L. R. trunk 420; and completes, at the contacts 461, the path for returning battery potential by way of the winding of the seize relay R470 to the control conductor C423. When ground potential is thus removed from the control conductor C423 of the C. L. R. trunk 420, the selector 406 and the finder 405 are released; and the application of battery potential upon the control conductor C423 of the C. L. R. trunk 420 again marks the C. L. R. trunk 420 as idle to the selectors 406, etc., having access thereto. When the finder 405 is thus released, the line circuit 403 is controlled in order again to mark the subscriber line 402 extending to the subscriber substation T401 as idle to the combination connectors 405, etc., having access thereto.

Also, at the conclusion of the established connection when the subscriber at the called subscriber substation T701 disconnects, the combination connector 707 operates in order to pole the lower winding of the supervisor relay R740 in the repeater 700 to reoperate. Upon reoperating, the supervisory relay R740 effects reoperation of the control relay R745; whereby the resistance of the simplex circuit is decreased, effecting reoperation of the supervisory relay R665; whereby the upper and lower windings of the sleeve relay R650 are energized in multiple effecting illumination of the front supervisory lamp L304 indicating to the operator at the first position at the toll board 50 that the subscriber at the caller subscriber substation T701 in the C. A. X 40 has disconnected. At this time the operator may release the connection extending to the called subscriber substation T701 by withdrawing the front plug P302 from the jack J610, thereby extinguishing the front supervisory lamp L304. The first contacts of the jack J610 are opened interrupting the circuit for retaining operated the jack relay R690. Upon restoring the jack relay R690 interrupts, at the contacts 696 and 697, the circuit for energizing the upper winding of the supervisory relay R665 in series with the lower winding of the simplex relay R750; whereby the relays mentioned restore. Also when the front plug P302 is withdrawn from the jack J610, the multiple circuits for energizing the upper and lower windings of the sleeve relay R650 are interrupted, causing the latter relay to restore and effect the restoration of the switch relay R645. Upon restoring the simplex relay R750 in the repeater 700 interrupts, at the contacts 752, the circuit for energizing the winding of the hold relay R760 in order to cause the latter relay to restore shortly thereafter, it being of the slow-to-release type. Upon restoring the hold relay R760 interrupts, at the contacts 761, the circuit for retaining operated the cut-off relay R770 and the multiple circuit for energizing the upper winding of the supervisory relay R740. Also upon restoring the simplex relay R750 interrupts, at the contacts 751, the loop circuit extending from the repeater 700 to the combination connector 707 in order to bring about the release of the combination connector 707, the selector 706 and the finder 705. When the combination connector 707 is thus released, the line circuit 703 is controlled to mark the subscriber line 702 extending to the subscriber substation T701 as idle to the combination connector 707, etc., extending thereto. At this time, the established connection between the calling subscriber substation T401 in the central office 10 and the called subscriber substation T701 in the C. A. X 40 to released and all of the apparatus involved therein is completely released and available for further use.

Reconsidering the established connection between the calling subscriber substation T401 in the central office 10 and the called subscriber substation T701 in the C. A. X 40, the operator at the first position at the toll board 50 may re-enter the established connection merely by reoperating the talk key K313 effecting reoperation of the connect relay R320, the talk relays R210 and R1050 and the #1 cord relay R1140. Upon reoperating the connect relay R320 recompletes, at the contacts 323, etc., the connections between the cord circuit #1 and the telephone circuit 200. Also the connect relay R320 completes, at the contacts 321, a connection including the conductor C332, the contacts 1068 and 1170 and the conductor C571 between the sleeve of the fear plug P301 and the winding of the rear supervisory relay R520; and completes, at the contacts 329, a connection including the conductor C344, the contacts 1151' and 1161', the conductor C343, and the conductor C355 between the sleeve of the front plug P302 and the winding of the front supervisory relay R535. Accordingly, at this time, should the subscriber at the calling subscriber substation T401 disconnect, ground potential would be applied to the sleeve of the jack J440 effecting operation of the rear supervisory relay R520. Upon operating the rear supervisory relay R520 completes, at the contacts 521, a circuit for energizing the lower winding of the rear control relay R510 in order to cause the latter relay to operate shortly thereafter and to complete, at the contacts 511, a circuit, including the contacts 521, the conductor C353, the first contacts of the talk key K313 and the conductor C331, for illuminating the rear supervisory lamp L303. Similarly, in the event the subscriber at the called subscriber substation T701 disconnects, ground potential would be applied to the sleeve of the front plug P302 effecting operation of the front supervisory relay R535. Upon operating the front supervisory relay R535 completes, at the contacts 536, a circuit for energizing the upper winding of the front control relay R540 in order to cause the latter relay to operate shortly thereafter and to complete, at the contacts 542, a circuit, including the contacts 536, the conductor C354, and the second contacts of the talk key K315, for illuminating the front supervisory lamp L304. Accordingly, it will be understood that the control of the supervisory lamps L303 and L304 is the same regardless of whether the cord circuit #1 is connected or disconnected from the telephone circuit 200 and the position equipment 500 at the first operator position at the toll board 50 when the corresponding disconnections occur.

Should the operator at the first position at the toll board 50 desire to monitor the established connection this may be accomplished by operating the monitor key K314, the talk key K313 being restored at this time, since the monitor key K314 and the talk key K313 are normally provided with a common operating lever. When the monitor key K314 is thus operated there is completed, at the first contacts thereof, a circuit, including the conductor C244 and the contacts 215, for operating the monitor relay R220. Upon operating the monitor relay R220 interrupts, at the contacts 222 and 223, the connections between the receiver R206 and the winding 237 of the repeating coil 235; and completes, at the contacts 221 and 224, a substantially identical circuit for bridging the receiver R206 across the reactor 219. At this time the reactor 219 is connected via the reactor 218 and the contacts 211 and 214 across the talk conductors C241 and C242; while the talk conductors C241 and C242 are connected via the third and second contacts of the monitor key K314 across the line conductors of the cord circuit #1. Thereafter, the operator may interrupt the monitor connection by restoring the monitor key K314 effecting the restoration of the monitor relay R220.

When the talk key K313 occupies its operated position the operator at the first position at the toll board 50 may split off the rear connection extending to the calling subscriber substation T401 and talk on the front connection extending to the called subscriber substation T701 by operating the split rear key K565. When the split rear key K565 is thus operated, there is completed, at the first contacts thereof, a circuit for energizing the upper winding of the pad relay R550 in order to cause the latter relay to operate and to complete, at the contacts 554, a circuit, including the second contacts of the split rear key K565, for operating the rear split relay R525. Upon operating the rear split relay R525 completes, at the contacts 528, a circuit, including the contacts 553, for energizing the upper winding of the pad relay R560 in order to cause the latter relay to operate. Also upon operating the rear split relay R525 interrupts, at the contacts 526 and 527, the connections between the position circuit 500 and the rear plug P301 of the cord circuit #1. After the operator has talked to the subscriber at the called subscriber substation T701, to the exclusion of the subscriber at the calling subscriber substation T401, the split rear key K565 is restored interrupting, at the first contacts thereof, the circuit for energizing the upper winding of the pad relay R550 in order to cause the latter relay to restore. Upon restoring the pad relay R550 completes, at the contacts 552, a path, including the contacts 562, bridged across the upper and lower windings of the impedance element 545. Also when the split rear key K565 is restored, there is interrupted, at the second contacts thereof, the circuit for energizing the winding of the rear split relay R525 in order to cause the latter relay to restore shortly thereafter, it being of the slow-to-release type. Upon restoring the rear split relay R525 reconnects, at the contacts 526 and 527, the rear plug P301 to the position circuit 500. Also upon restoring the pad relay R550 interrupts, at the contacts 553, the circuit for energizing the upper winding of the pad relay R560 in order to cause the latter relay to restore shortly thereafter, it being of the slow-to-release type. Upon restoring the pad relay R560 interrupts, at the contacts 562, the path bridged across the upper and lower windings of the impedance element 545. The arrangement of the pad relays R550 and R560 prevents clicks from being transmitted over the established connection incident to the switching operations described.

In a similar manner the operator may talk to the subscriber at the calling subscriber substation T401 to the exclusion of the subscriber at the called subscriber substation T701 by operating the split front key K566; whereby the front split relay R530 and the pad relays R550 and R560 are controlled in a similar manner. When the front split relay R530 is thus operated, it interrupts, at the contacts 531 and 532, the connections between the front plug P302 and the position circuit 500.

Should the operator at the first position at the toll board 50 have occasion to recall the subscriber at the calling subscriber substation T401 after a disconnection as explained above, this may be accomplished by operating the ring rear key K315, thereby completing, at the third and eighth contacts thereof, paths for applying ground and battery potentials via the resistor 307 to the tip and the ring of the rear plug P301, thereby completing a circuit including the windings 433 and 434 of the repeating coil 430 for energizing the winding of the re-ring relay R455. Shortly thereafter, the re-ring relay R445 operates as it is of the combination slow-to-operate and slow-to-release type, completing, at the contacts 457 and 458, paths for applying ground and generator potential via the generator conductor C427 to the line conductors C421 and C422 of the C. L. R. trunk 420; whereby the ringer at the calling subscriber substation T401 is operated. Also at the fourth and sixth contacts of the ring key K315, the resistor 308 and the condenser 309 are bridged across the upper and lower windings of the impedance element 545; and at the ninth contacts of the ring gear key K315, a circuit including the third contacts of the talk key K313 and the conductor C356 is completed for energizing the lower winding of the pad relay R550. Upon operating the pad relay R550 completes, at the contacts 555, a circuit including the grounded conductor C356 for energizing the lower winding of the pad relay R360 in order to cause the latter relay to operate.

Subsequently, when the ring rear key K315 is restored, the pad relays R550 and R560 restore in the manner previously explained and shortly thereafter, the re-ring relay R455 restores, it being of the combination slow-to-operate and slow-to-release type. Upon restoring the re-ring relay R455 interrupts, at the contacts 457 and 458, the path for projecting ringing current over the C. L. R. trunk 420; and recompletes, at the contacts 456 and 459, the connection between the C. L. R. trunk 420 and the upper and lower windings of the line relay R450.

*Sect. 6.—Same—Further operations of digit sender #1*

Reconsidering the extension of the call from the calling first operator position at the toll board 50 in the central office 10 to the called subscriber substation T701 in the C. A. X 40, should the operator after answering the call from the calling subscriber substation T401 in the central office 10 begin setting up the digits on the key set K1000 comprising the directory number of the called subscriber substation T701 without first inserting the front plug P302 into the jack J610, the shunt relay R1215 and the stop send relay R1225 in the digit sender #1 would occupy their restored positions; whereby the control relay R1320 and the shunt slave relay R1330 occupy their restored positions. At this time when the first digit is registered in the first digit register in the connected digit registers #1, the hold relay R1370 is operated in the manner previously explained in order to initiate operation of the cycle relays R1480 and R1470 and the impulse relay R1460 in order to produce the initial space corresponding to three cycles of operation of these relays; all in the manner previously explained. However, when the impulse relay R1460 operates the third time, the third counting relay R1540 cperates to complete, at the contacts 1541, the connection between the grounded initial space conductor C1474 and the conductor C1473; whereby the upper winding of the release relay R1260 is energized instead of the upper winding of the initial space relay R1310. This result follows as a consequence of the shunt slave relay R1330 occupying its restored position completing, at the contacts 1332, the circuit for energizing the upper winding of the release relay R1260; and interrupting, at the contacts 1333, the circuit for energizing the upper winding of the initial space relay R1310. More particularly, the circuit for energizing the upper winding of the release relay R1260 includes the grounded conductor C1473, the contacts 1362 and the contacts 1332. When the upper winding of the release relay R1260 is thus energized, it operates to complete, at the contacts 1264, a holding circuit, including the contacts 1374, for energizing the lower winding thereof. Upon operating the release relay R1260 interrupts, at the contacts 1262, the circuit for retaining operate the start relay R1380; and upon restoring, the start relay R1380 interrupts, at the contacts 1382, the path for applying ground potential to the release conductor C1501, thereby to interrupt the holding circuit for retaining operated the transfer relays R1620, etc., and the operated one of the mark relays W1, etc., in the respective operated digit registers. Accordingly, the digit registers #1 are released and the digit or digits registered therein are cleared out without being sent by the digit sender #1. Thus it will be understood that should the operator manipulate the key set K1000 prior to inserting the front plug P302 of the cord circuit #1 into the jack J610, the digits registered in the digit registers #1 are cleared therefrom without being sent by the digit sender #1.

Also it is noted that during actual sending by the digit sender #1 of the digits registered in the digit registers #1, should the operator at the first position at the toll board 50 withdraw the front plug P302 of the cord circuit #1 from the jack J610, that following the transmission of a digit the shunt relay R1215 and the stop send relay R1225 are restored incident to the restoration of the test relay R1250. Accordingly, during the next cycle of operation of the cycle relays R1480 and R1470, and the impulse relay R1460 corresponding to the inter-digit space, when the grounded inter-digit space conductor C1475 is connected to the conductor C1473 at the contacts 1537 of the second counting relay R1535 incident to the seventh operation of the impulse relay R1460, the previously traced circuit for energizing the upper winding of the release relay R1260 is completed since the shunt slave relay R1330 restores shortly following the restoration of the shunt relay R1215, the shunt slave relay R1330 being of the slow-to-release type. Accordingly, the release relay R1260 is again operated effecting the restoration of the start relay R1380 and the consequent release of the digit registers #1 in the manner previously explained.

Should the operator at the first position at the toll board 50 make an error in keying up on the key set K1000 the digits comprising the directory number of the called subscriber substation T701 in the C. A. X 40, she operates the error key on the key set K1000 causing ground potential to be applied momentarily to the error conductor C1006; whereby ground potential is forwarded via the contacts 1085 to the conductor C1036 effecting operation of the error relay R1220 in the digit sender #1. Upon operating the error relay R1220 completes, at the contacts 1222, a holding circuit, including the contacts 1234, for energizing the winding thereof; and completes, at the contacts 1221, a circuit for operating the error relay R1230. Upon operating the error relay R1230 completes, at the contacts 1233, a path, including the contacts 1221 and 1382, for short-circuiting the winding of the error relay R1240; completes, at the contacts 1235, a multiple path for applying ground potential to the holding conductor C1032; and completes, at the contacts 1236, a multiple path for applying ground potential to the conductor C1034. Also the error relay R1230 interrupts, at the contacts 1234, the holding circuit for retaining operated the error relay R1220. Upon restoring the error relay R1220 interrupts, at the contacts 1221, the path for short-circuiting the winding of the error relay R1240; whereby a series holding circuit, including the contacts 1233 and 1382, is completed for energizing the windings of the error relays R1230 and R1240 in order to retain operated the error relay R1230 and to effect operation of the error relay R1240. Upon operating the error relay R1240 interrupts, at the contacts 1242, the series circuit for energizing the windings of the stop send relay A12-5 and the shunt relay R1215 in order to insure restoration of the latter relays. Upon restoring the shunt relay R1215 effects the restoration shortly thereafter of the shunt slave relay R1330, the latter relay being of the slow-to-release type; and upon restoring the shunt slave relay R1330 interrupts, at the contacts 1336, the holding circuit for energizing the winding of the automatic ring relay R1420 in order to cause the latter relay to restore shortly thereafter, it being of the slow-to-release type. At this time, ground potential is applied via the contacts 1369, 1442', 1265 and 1238 to the inter-digit space conductor C1475; whereby the previously traced circuit for energizing the upper winding of the release relay R1260 is completed incident to operation of the second counting relay R1535 when the impulse relay R1460 operates the seventh time to produce the inter-digit space.

Also upon operating the error relay R1230 interrupts, at the contacts 1231, the sending circuit including the dial conductors C1038 and C1027 in order to interrupt the application of ground potential upon the simplex of the trunk line 710; whereby the repeater 700 is governed in order to effect the release of the finder 705, the selector 706, etc., in the switch train in the C. A. X 40. Also the error relay R1230 interrupts, at the contacts 1232, the path for applying ground potential to the release conductor C1501, thereby to effect the release of the digits register #1. Upon operating the release relay R1260 interrupts, at the contacts 1262, the circuit for retaining operated the start relay R1380; and interrupts, at the contacts 1263, the last connection between the conductors C1033 and C1031, since the error relay R1240 has previously interrupted, at the contacts 1241, the initial connection between the conductors C1033 and C1031.

When the connection between the conductors C1033 and C1031 is thus interrupted, the holding circuit for energizing the upper winding of the select #1 relay R1070 in the cord and sender control circuit 1000 is interrupted, in order to cause the latter relay to restore, effecting the restoration of the connect #1 relay R1080. Upon restoring the connect #1 relay R1080 disconnects the key set K1000 and the cord and sender control circuit 1000 from the digit sender #1. Upon restoring the start relay R1380 interrupts, at the contacts 1382, the holding circuit for retaining operated the error relays R1230 and R1240; whereby the digit sender #1 is completely released. At this time the send front relay R1045 and the #1 cord #1 send relay R1150 are restored. However, since the talk relay R1050 occupies its operated position, together with the sequence relay R1185, a circuit, including the contacts 1051, 1073, 1198, 1182 and 1187 is completed for energizing the lower winding of the select #2 relay R1195 in order to cause the latter relay to operate. Upon operating the select #2 relay R1195 completes, at the contacts 1196, a holding circuit, including the contacts 1051 and the conductors C1131 and C1133 extending to the digit sender #2, for energizing the upper winding thereof. Also the select #2 relay R1195 completes, at the contacts 1197, a circuit, including the conductor C1128, for operating the connect #2 relay R1100. Upon operating the connect #2 relay R1100 completes, at the contacts 1104, etc., the connections between the key set K1000 and the digit sender #2. Also the connect #2 relay R1100 completes, at the contacts 1103, a circuit including the conductors C1134 and C576 for reoperating the send front relay R1045; whereby the latter relay completes, at the contacts 1047, the holding circuit for energizing the winding thereof. Further, the connect #2 relay completes, at the contacts 1101, a circuit, including the hold conductor C1132 and the contacts 1049 and 1144, for operating the #1 cord #2 send relay R1160. Upon operating the #1 cord #2 send relay R1160 completes, at the contacts 1162', a holding circuit, including the hold conductor C1132, for energizing the winding thereof. Also the #1 cord #2 send relay R1160 completes, at the contacts 1163, 1168, etc., the connections between the front plug P302 of the cord circuit #1 and the digit sender #2. Accordingly, at this time when the operator at the first position at the toll board 50 sets up the digits on the key set K1000 comprising the directory number of the called subscriber substation T701 in the C. A. X 40, the digits are registered in the digit registers #2 connected to the digit sender #2; whereby the digit sender #2 operates in conjunction with digit registers #2 to send the digits over the front plug P302. The operation of the digit sender #2 in conjunction with the digit registers #2 is the same as that of the digit sender #1 in conjunction with the digit register #1.

Recapitulating, it will be understood that when the first operator position at the toll board 50 is connected to the digit sender #1 and the error key on the key set K1000 is operated, the cycle relays R1480 and R1470 and the impulse relay R1460 must operate through seven cycles in order to govern the counting relays R1530, etc., and bring about the actual release of the digit sender #1 and the digit registers #1. At this time the digit sender #1 and the digit registers #1 are disconnected from the cord and sender control circuit 1000 and the digit sender #2 and the digit registers #2 are connected to the cord and sender control circuit 1000. This arrangement positively prevents immediate disconnection of the digit sender #1 from the cord circuit #1 incident to operation of the error key on the key set K1000 and the immediate connection of the digit sender #2 to the cord circuit #1; thus there is ample opportunity for the outgoing switch train to be completely released incident to operation of the error key on the key set K1000 before the connection thereto of the digit sender #2.

In view of the foregoing, it will be understood that the digit sender #1 and the digit sender #2 are utilized alternatively in setting up connections from the first position at the toll board 50. More particularly, in the present example, when the connect #2 relay R1100 is operated to connect the digit sender #2 to the cord and sender control circuit 1000 ground potential in the digit sender #2 is removed from the conductor C1137 interrupting the holding circuit for retaining operated the sequence relay R1185. Upon restoring the sequence relay R1185 completes, at the contacts 1186, the previously traced circuit for operating the start relay R1190; whereby the start relay R1190 completes, at the contacts 1191, the previously traced circuit for operating the sequence relay R1180 since ground potential is now present in the digit sender #1 upon the conductor C1037. However, the sequence relay R1185 is not operated since ground potential in the digit sender #2 is removed from the corresponding conductor C1137. Thus the operated sequence relay R1180 prepares, at the contacts 1183, a point in the previously traced circuit for energizing the lower winding of the select #1 relay R1070; whereby the digit sender #1 will be next utilized after the present utilization of the digit sender #2.

Moreover, it will be understood that each time one of the cord circuits is connected to the position circuit 500 by operation of the associated talk key, the talk relay R1050 is operated in order to complete, at the contacts 1051, a circuit for energizing either the lower winding of the select #1 relay R1070 or the select #2 relay R1195 depending upon the positions of the sequence relays R1180 and R1185; whereby the digit sender #1 and the digit sender #2 are utilized alternatively as explained above. In this regard, it is noted that the digit sender #1 may be cut out by operating the sender #1 cut-out key K1007; and likewise, the digit sender #2 may cut out by operating the sender #2 cut-out key K1008. For example, when the sender #1 cut-out key K1007 is operated, the conductor C1037 extending to the digit sender #1 is disconnected from the sequence relay R1180; whereby only the sequence relay R1185 may be operated via the conductor C1137 extending to the digit sender #2. As previously explained, ground potential is applied to the conductor C1137 only when the digit sender #2 is idle. Accordingly, when the sender #1 cut-out key K1007 is thus operated, the digit sender #2 after use in conjunction with one of the cord circuits may not be reconnected for use in conjunction with the same or another cord circuit until the digit sender #2 is completely released causing ground potential to be re-applied to the conductor C1137. Thus when the sender #1 cut-out key K1007 is operated the digit sender #2 is utilized repeatedly in setting up connections from the first position at the toll board 50.

Again reconsidering the extension of the connection from the calling first operator position at the toll board 50 to the called subscriber substation T701 in the C. A. X 40, it is noted that after the operator inserts the plug P302 of the cord circuit #1 into the jack J610, she may immediately begin keying up on the key set K1000 the digits comprising the directory number of the called subscriber substation T701 before the front supervisory lamp L304 is illuminated indicating that the finder 705 has operated to find the trunk 720 extending from the repeater 700. In this case, prior to the operation of the finder 705 to find the trunk 720 extending to the repeater 700 the supervisory relay R740 occupies its restored position; whereby the restored control relay R745 causes the two windings of the simplex relay R750 to be connected to the simplex of the trunk line 710; constituting a delay-in-send signal. Accordingly, the supervisory relay R665 in the toll line circuit 600 occupies its restored position; whereby the high resistance upper winding of the sleeve relay R650 is connected to the sleeve conductor C630 of the trunk 635 and consequently to the sleeve of the front plug P302. At this time when the key set K1000 is operated, the digits are registered in the digit registers #1 bringing about operation of the hold relay R1370 in the digit sender #1; whereby operation of the cycle relays R1480 and R1470 and the impulse relay R1460 is initiated to produce the initial space. At this time the high resistance ground potential is applied to the conductor C1030 effecting operation of the shunt relay R1215 but preventing operation of the stop send relay R1225 since the latter relay is of the marginal type. Upon the third operation of the impulse relay R1460, when the third counting relay R1540 is operated to connect the grounded initial space conductor C1474 to the conductor C1473, the upper winding of the initial space relay R1310 is energized causing the latter relay to operate. Upon operating the initial space relay R1310 completes, at the contacts 1312 and 1313, a circuit including the contacts 1352, 1324 and 1374, for operating the control relay R1360. Upon operating the control relay R1360 completes, at the contacts 1363, the circuit, including the grounded conductor C1473, for operating the alternate relay R1450 and for preventing operation of the alternate relay R1440 in the manner previously explained. Upon operating the alternate relay R1450 completes, at the contacts 1453, the holding circuit for retaining operated the cycle relay R1470; and interrupts, at the contacts 1458, the path for applying ground potential to the conductor C1465; whereby the third counting relay R1540 is restored interrupting the application of ground potential upon the conductor C1473, whereupon the alternate relay R1440 is operated; all in the manner previously explained. Also the control relay R1360 completes, at the contacts 1366, a holding circuit, including the contacts 1312, 1341, 1456, 1384 and 1237, for energizing the winding thereof. Also the control relay R1360 prepares, at the contacts 1367, a circuit traced hereinafter for operating the control relay R1350; and interrupts, at the contacts 1360, the circuit for energizing the winding of the automatic ring relay R1420 in order to cause the latter relay to restore shortly thereafter, it being of the slow-to-release type. Also the control relay R1360 interrupts, at the contacts 1369, a further point in the path for applying ground potential upon the conductor C1506 extending to the digit registers #1; whereby the release relay R1610 may not be operated to release the first digit register at this time. Further, the control relay R1360 interrupts, at the contacts 1364, the path for applying ground potential to the conductor C1505 extending to the digit registers #1; whereby no ground potential is applied to the selected mark conductor M1, etc., by the operated mark relay 1W, etc., in the first digit register. Upon restoring the automatic ring relay R1420 completes, at the contacts 1422, the previously traced path for applying ground potential to the conductor C1465, thereby to initiate further operation of the cycle relays R1480 and R1470 and the impulse relay R1460. Finally, the control relay R1360 completes, at the contacts 1361, an additional shunt across the dial conductors C1038 and C1027; thereby positively to prevent operation of the impulse relay R1460 from sending impulses via the dial conductors C1038 and C1027 at this time.

During the present cycle when the impulse relay R1460 operates the tenth time, the fifth counting relay R1550 is operated to complete, at the contacts 1551, the previously traced path for applying ground potential to the tenth mark conductor M0 and consequently to the conductor C1473 effecting restoration of the alternate relay R1450. Upon restoring the alternate relay R1450 completes, at the contacts 1454, the holding circuit for energizing the winding of the cycle relay R1470; and completes, at the contacts 1455, a circuit, including the contacts 1351, 1365, 1447, 1384 and 1237, for energizing the lower winding of the blocked send relay R1340 in order to cause the latter relay to operate. Upon operating the blocked send relay R1340 completes, at the contacts 1342, a holding circuit, including the contacts 1366, for energizing the upper winding thereof. Also upon operating the blocked send relay R1340 interrupts, at the contacts 1348, the previously traced circuit for illuminating the front supervisory lamp L304; and interrupts, at the contacts 1346, the circuit for illuminating the sender #1 lamp L1021. Also the blocked send relay R1340 completes, at the contacts 1345, a connection, including the contacts 1385, between the 120 impulse per minute conductor C1425 and the conductor C1022; whereby the sender #1 lamp L1021 is flashed 120 times per minute indicating to the operator at the first position at the toll board 50 that the sender #1 is blocked.

After the operator at the first position at the toll board 50 has keyed up on the key set K1000 all of the digits comprising the directory number of the called subscriber substation T701 in the C. A. X 40 and operated the call completed key on the key set K1000, she may restore the talk key K313 of the cord circuit #1 effecting the restoration of the connect relay R320 in the cord circuit #1, the talk relay R210 in the telephone circuit 200 and the talk relay R1050 and the #1 cord relay R1140 in the cord and sender control circuit 1000 in the manner previously explained. Upon restoring the talk relay R1050 effects the restoration of the select #1 relay R1070; and the latter relay effects the restoration of the connect #1 relay R1080; all in the manner previously explained. However, at this time, the #1 cord, #1 send relay R1150 is retained in its operated position via the hold conductor C1032 having ground potential thereon in the digit sender #1. After the operator at the first position at the toll board 50 restores the talk key K313 of the cord circuit #1, the operated #1 cord #1 send relay R1150 retains the digit sender #1 operatively connected to the cord and sender control circuit 1000 and consequently to the cord circuit #1; whereby the digit or digits registered in the digit registers #1 may be sent by the digit sender #1 over the cord circuit #1 and consequently over the toll line circuit 600 in the present example. Since this sending by the digit sender #1 does not require the attention of the operator at the first position at the toll board 50, she may be engaged in other work; whereby in the present example, when the sender #1 lamp L1021 begins flashing indicating that the sender #1 is blocked, she may not be able to recall to which cord circuit the digit sender #1 is operatively connected at this time.

In order to ascertain the particular cord to which the digit sender #1 is connected, the operator operates the sender #1 check key K1025 applying ground potential to the conductor C1026, thereby completing the previously mentioned circuit, including the contacts 1344, for operating the automatic ring relay R1420 in the digit sender #1. Upon operating the automatic ring relay R1420 interrupts, at the contacts 1424, the previously mentioned path for applying ground potential to the conductor C1023, thereby to interrupt the previously traced circuit for illuminating the front supervisory lamp L304. Also the automatic ring relay R1420 completes, at the contacts 1423, a connection, including the contacts 1347, between the 120 impulse per minute conductor C1425 and the conductor C1023; whereby the front supervisory lamp L304 is flashed 120 times per minute, thereby identifying the associated cord circuit #1 and indicating that the present connection that is blocked is extended via the front plug P302 of the cord circuit #1. This flashing of the front supervisory lamp L304 is controlled in accordance with the operation and restoration of the sender #1 check key K1025, since the automatic ring relay R1420 operates and restores therewith connecting and disconnecting the 120 impulse per minute conductor C1425 and the conductor C1023.

Upon learning that the connection routed via the front plug P302 of the cord circuit #1 and the toll line circuit 600 is blocked, the operator withdraws the front plug P302 from the associated jack J610; whereby the toll line circuit 600 and the connection thus far extended is released in the manner previously explained. Likewise, the digit sender #1 and the digit registers #1 are released as a consequence of the withdrawal of the front plug P302 of the cord circuit #1 from the associated jack J610; whereupon the #1 cord #1 send relay R1150 in the cord and sender control circuit 1000 is restored disconnecting the digit sender #1 from the cord circuit #1; all in the manner previously explained.

Again reconsidering the extension of the connection from the calling first operator position at the toll board 50 to the called subscriber substation T701 in the C. A. X 40, the finder 705 may consume some time in finding the trunk 720 extending from the repeater 700; whereby operation of the digit sender #1 is initiated in the manner described above. However, prior to complete timing out in the digit sender #1 and the consequent operation of the blocked send relay R1340 therein in the manner explained above, the finder 705 may find the trunk 720 extending from the repeater 700. In this case, the supervisory relay R740 in the repeater 700 is operated effecting operation of the control relay R745 and the consequent connection of the lower winding of the simplex relay R750 to the simplex of the trunk line 710; whereby the supervisory relay R665 in the toll line circuit 600 is operated. Upon operating the supervisory relay R665 completes, at the contacts 666, the path for connecting the lower winding of the sleeve relay R650 in multiple with the upper winding thereof; whereby the low resistance circuit is completed for energizing the winding of the stop send relay R1225 in series with the winding of the shunt relay R1215 in the digit sender #1; whereby the stop send relay R1225 operates, it being of the marginal type. Upon operating the stop send relay R1225 completes, at the contacts 1226, the circuit for operating the control relay R1320. Upon operating the control relay R1320 completes, at the contacts 1325, a circuit, including the contacts 1367, 1313, and 1374, for operating the control relay R1350. Upon operating the control relay R1350 completes, at the contacts 1354, a holding circuit including the contacts 1368, for energizing the winding thereof; and interrupts, at the contacts 1351, a further point in the previously traced circuit for energizing the lower winding of the blocked send relay R1340, thereby positively to prevent operation of the latter relay.

At the conclusion of the present timing cycle of the cycle relays R1480 and R1470 and the impulse relay R1460, when the fifth counting relay R1550 is operated incident to the tenth operation of the impulse relay R1460, ground potential is applied to the conductor C1473 effecting the restoration of the alternate relay R1450 in the manner previously explained. Upon restoring the alternate relay R1450 interrupts, at the contacts 1456, the previously traced holding circuit for retaining operated the control relay R1360. Upon restoring the control relay R1360 interrupts, at the contacts 1368, the holding circuit for retaining operated the control relay R1350. At this time with both of the control relays R1350 and R1360 in their restored positions and with the stop send relay R1225 and the control relay R1320 in their operated positions, the digit sender #1 is returned to its normal sending condition; whereby the digit sender #1 proceeds to send the first digit registered in the first digit register; all in the manner previously explained.

In view of the foregoing, it will be understood that during operation of the digit sender #1 after any digit has been sent therefrom, a delay may be produced in the operation thereof prior to sending of the next digit by the return over the connection of a delay-in-send signal effecting restoration during a short-time interval of the stop send relay R1225. Subsequently, after the termination of the short-time interval when the stop send relay R1225 reoperates, the digit sender #1 resumes sending in the manner explained above. However, should the delay-in-send signal persist for the predetermined time interval, the stop send relay R1225 remains in its restored position for the time interval mentioned in order to bring about operation of the blocked send relay R1340 in the manner explained above. In other words, in the event the delay-in-send signal persists for the predetermined time interval mentioned, the blocked send relay R1340 is operated indicating that the digit sender #1 has been blocked; all in the manner previously explained. However, in this case, when the delay-in-send signal is returned over the connection following the sending of a digit from the digit sender #1, the initial space relay R1310 already occupies its operated position interrupting, at the contacts 1315, the path for applying ground potential to the initial space conductor C1474. Thus, in this case, the cycle relays R1480 and R1470 and the impulse relay R1460 must operate through ten cycles in order to govern the counting relays R1530, etc., in order to bring about the operation of the alternate relay R1450, and the subsequent operation of the alternate relay R1440. Then the cycle relays R1480 and R1470 and the impulse relay R1460 must operate through ten additional cycles in order to govern the counting relays R1530, etc., in order to bring about restoration of the alternate relay R1450 and the subsequent restoration of the alternate relay R1440. When the alternate relay R1450 is thus restored, prior to the restoration of the alternate relay R1440, it completes, at the contacts 1455, the previously traced circuit for energizing the lower winding of the blocked send relay R1340.

Recapitulating, in the event the digit sender #1 receives the delay-in-send signal immediately and before sending any digits therefrom, the cycle relays R1480 and R1470 and the impulse relay R1460 are operated first through three cycles and then through ten cycles in order to effect operation of the blocked send relay R1340. On the other hand, in the event the digit sender #1 receives the delay-in-send signal subsequently after sending one or more digits therefrom, the cycle relays R1480 and R1470 and the impulse relay R1460 are operated first through ten cycles and then through ten cycles in order to effect operation of the blocked send relay R1340. Moreover, it will be understood that after receiving the delay-in-send signal, in the event the digit sender #1 receives the ready signal, it completes the present cycle of operation of the cycle relays R1480 and R1470 and the impulse relay R1460, regardless of whether the present cycle comprises the first mentioned cycle or the second mentioned cycle thereof noted above; and then effects the restoration of the control relays R1360 and R1350; whereby the digit sender #1 is returned to its normal sending operation.

Again reconsidering the extension of the call from the calling first operator position at the toll board 50 to the called subscriber substation T701 in the C. A. X 40, the selector 706 may, after responding to the first digit sent from the digit sender #1, encounter an all-trunks-busy condition as a consequence of all of the combination connectors in the group including the combination connector 707 being busy at this time. In this event, the selector 706 operates to effect the reversal of polarity 60 times per minute over the trunk 720; whereby the supervisory relay R740 follows causing the control relay R745 to follow. Accordingly, the upper and lower windings of the simplex relay R750 are first connected to the simplex of the trunk line 710 and then disconnected therefrom alternately with connection and disconnection of the lower winding of the simplex relay R750 to the simplex of the trunk line 710; whereby high resistance and low resistance battery potentials are returned 60 times per minute over the simplex of the trunk line 710 causing the supervisory relay R665 in the toll line circuit 600 to follow. The supervisory relay R665 operating and restoring causes low resistance and high resistance ground potentials to be returned 60 times per minute over the sleeve conductor C638 of the trunk 635; whereby the stop send relay R1225 in the digit sender #1 follows.

Upon the first operation of the stop send relay R1225, the control relay R1320 is operated effecting operation of the control relay R1350, since the control relay R1360 occupies its operated position in the manner previously explained. However, immediately thereafter, the stop send relay R1225 restores effecting the restoration of the control relay R1320 before the completion of the present timing cycle. Upon restoring the control relay R1320 completes, at the contacts 1324, a circuit, including the contacts 1353, 1313, and 1374, for energizing the upper winding of the release relay R1260. Upon operating the release relay R1260 completes, at the contacts 1264, the previously traced holding circuit for energizing the lower winding thereof. Also the release relay R1260 effects the restoration of the start relay R1380 and the consequent release of the digit registers, #1; whereby the hold relay R1370 is restored effecting the restoration of the #1 cord #1 send relay R1150 in the cord and sender control circuit 1000. Upon restoring the #1 cord #1 send relay R1150 completes, at the contacts 1151', the previously traced connection between the sleeve of the front plug P302 and the front supervisory lamp L304. Accordingly, at this time the 60 low resistance ground impulses per minute transmitted over the sleeve conductor C638 of the trunk 635 effect corresponding flashing of the front supervisory lamp L304 in order to indicate to the operator at the first position at the toll board 50 that the connection extended via the front plug P302 of the cord circuit #1 has progressed to a point wherein a selector has encountered an all-trunks-busy condition. The operator then effects the release of the outgoing connection by withdrawing the front plug P302 of the cord circuit #1; all in the manner previously explained. Thus it will be understood that when an all-trunks-busy signal is returned from the selector 706, the digit sender #1 and the digit registers #1 are automatically released and then the front supervisory lamp L304 is flashed 60 times per minute indicating the all-trunks-busy condition mentioned.

Further reconsidering the extension of the call from the calling first operator position at the toll board 50 to the called subscriber substation T701 in the C. A. X 40, and now assuming that when the combination connector 707 operates to select the subscriber line 702, that the called subscriber substation T701 is busy. In this event, the combination connector 707 operates to reverse 120 times per minute the polarity of the trunk 720 extending from the repeater 700; whereby the supervisory relay R740 follows causing 120 low resistance battery impulses to be returned over the simplex of the trunk line 710; whereupon the supervisory relay R665 in the toll line circuit 600 follows repeating corresponding low resistance ground impulses over the sleeve conductor C638 of the trunk 635. However, in the present example, since all of the digits registered in the digit registers #1 have been sent by the digit sender #1, the digit registers #1 and the digit sender #1 have already been released in the manner previously explained effecting the restoration of the #1 cord #1 send relay R1150 in the cord and sender control circuit 1000. Accordingly, at this time the 120 ground impulses per minute applied to the sleeve of the front plug P302 effect corresponding flashing of the front supervisory lamp L304 in order to indicate the busy condition of the called subscriber substation T701 in the C. A. X 40. The operator then withdraws the front plug P302 of the cord circuit #1 from the jack J610 releasing the switching apparatus in the manner previously explained.

Recapitulating, after the operator at the first position at the toll board 50 has keyed up on the key set K1000 all of the digits comprising the directory number of the called subscriber substation T701 in the C. A. X 40, she operates the called completed key or button of the key set K1000; whereupon she may restore the talk key K313 of the cord circuit #1. Subsequently, after all of the digits registered in the digit registers #1 have been sent by the digit sender #1, the digit registers #1 and the digit sender #1 are released and disconnected from the cord circuit #1. During the sending of the digits by the digit sender #1, should a delay-in-send signal be received over the connection further sending operation is delayed; which sending operation is subsequently resumed when the delay-in-send signal is removed from the connection. However, should the delay-in-send signal persist upon the connection for a predetermined time interval, the digit sender #1 is operated to its blocked sender condition causing the sender #1 lamp L1021 to be flashed 120 times per minute indicating the condition noted. The operator may then ascertain the particular cord circuit to which the blocked sender #1 is connected by operating the sender #1 check key K1025 bringing about flashing at 120 times per minute of the front supervisory lamp L304 associated with the front plug P302 of the cord circuit #1. Also during sending of the digits by the digit sender #1, should an all-trunks-busy signal be returned over the connection, the digit sender #1 and the connected digit registers #1 are automatically released and then the front supervisory lamp L304 is flashed 60 times per minute to indicate the condition noted. On the other hand, when a line busy signal is returned over the connection, the front supervisory lamp L304 is flashed directly since the digit sender #1 and the digit registers #1 have already been released.

*Sect. 7.—Calls from subscriber substations in the C. A. X 40 to the tool board 50 in the central office 10.*

Now assuming that a call is to be extended from a subscriber substation, such for example, as the calling subscriber substation T701 in the C. A. X 40 to the toll board 50 in the central office 10, the subscriber at the calling subscriber substation T701 initiates the call; whereby the line circuit 703 associated with the subscriber line 702 controls the distributor 704 in order to cause an idle finder-selector link to be assigned. Assuming that the distributor 704 assigns the finder-selector link illustrated, the finder 705 thereof is controlled to find the subscriber line 702; whereby the line circuit 703 is governed to mark the subscriber line 702 as busy to the combination connectors 707, etc., having access thereto; and a direct loop circuit is completed between the calling subscriber substation T701 and the selector 706. At this time, dial tone in the selector 706 is returned over the loop circuit to the calling subscriber substation T701 and the distributor 704 is dismissed. The subscriber at the calling subscriber substation T701 then dials the single digit 0 controlling operation of the selector 706 to select the group of trunks including the trunk 715 and then an idle trunk in the selected group. The selector 706 may select the particular trunk 715 extending to the repeater 700 assuming that the repeater 700 is idle at this time. The trunk 715 is marked as idle by the presence of battery potential upon the control conductor C718 thereof via the contacts 705′ and 778 and the associated resistor. Also the selector 706 switches through completing a loop circuit, including the line conductors C716 and C717 of the trunk 715 and the contacts 772 and 776, for energizing in series the upper and lower windings of the line relay R790; whereby the latter relay is operated. Upon operating the line relay R790 completes, at the contacts 793, a circuit for operating the hold relay R700. Upon operating the hold relay R700 interrupts, at the contacts 705′, the path for applying battery potential to the control conductor C718 of the trunk 715; and completes, at the contacts 704′, a path for applying ground potential to the control conductor C718; thereby to mark the trunk 715 as busy to the other selectors having access thereto. Also the line relay R790 interrupts, at the contacts 792 the normal connection between the upper and lower windings of the simplex relay R750 and the simplex of the trunk line 710; and completes, at the contacts 791, a connection, including the contacts 785, between the interrupter generator conductor C723 and the simplex of the trunk line 710. Also upon operating the hold relay R700 completes, at the contacts 706′, a circuit for operating the control relay R745; interrupts, at the contacts 701′, a further point in the connection between the repeater 700 and the line conductor C721 of the trunk 720 extending to the trunk line circuit 725; and completes, at the contacts 703', a connection, including the contacts 796 and the condenser 724, for energizing the upper winding of the ring-out relay R795 in series with the winding of the hold relay R700 via the interrupter generator conductor C723. When the upper winding of the ring-out relay R795 is thus energized, the latter relay being of the A. C. type, operates to complete, at the contacts 797, a circuit, including the contacts 704', for energizing the winding of the ring-out relay R780; whereby the latter relay operates shortly thereafter, it being of the slow-to-operate type. Also the ring-out relay R795 completes, at the contacts 797, a holding circuit including the contacts 704', for energizing the lower winding thereof; and interrupts, at the contacts 796, the previously traced operating circuit for energizing the upper winding thereof in series with the winding of the hold relay R700. Upon operating the ring-out relay R780 interrupts, at the contacts 785, the previously traced connection between the interrupter generator conductor C723 and the simplex of the trunk line 710; and completes, at the contacts 786, a path, including the contacts 791 for connecting battery potential by way of the upper and lower windings of the simplex relay R750 to the simplex of the trunk line 710. Also the ring-out relay R780 completes, at the contacts 781, a connection, including the condenser 726, the contacts 773, 702', the winding 733 of the repeating coil 730 and the contacts 772, between the ring-back tone conductor C719 and the line conductor C716 of the trunk 715; whereby ring-back tone current is returned over the loop circuit to the calling subscriber substation T701 in order to indicate to the subscriber thereat that the toll board 50 in the central office 10 is being signaled at this time. Accordingly, it will be understood that the interrupter generator conductor C723 is first connected to and then disconnected from the simplex of the trunk line 710; whereby a splash of ringing current is projected thereover.

The splash of ringing current projected over the trunk line 710 traverses the simplex thereof, the contacts 695 and 686, the condenser 616 and the winding of the ring-down relay R680 in the toll line circuit 600, causing the latter relay to operate, it being of the ring-down type. Upon operating the ring-down relay R680 completes, at the contacts 681, a circuit for energizing the winding of the control relay R670, thereby to cause the latter relay to operate shortly thereafter, it being of the slow-to-operate type. Also the ring-down relay R680 completes, at the contacts 682, a circuit for operating the switch relay R645. Upon operating the switch relay R645 interrupts, at the contacts 648', the normally completed path, including the contacts 671 and 690, for applying battery potential by way of the winding of the seize relay R685 to the control conductor C633 of the trunk 630, thereby to mark the trunk 630 as busy to the incoming selector 416, etc., having access thereto. Upon operating the control relay R670 completes, at the contacts 672, a holding circuit, including the contacts 691', for energizing the winding thereof; interrupts, at the contacts 671, a further point in the connection between the winding of the seize relay R685 and the control conductor C633 of the trunk 630; completes, at the contacts 673, a circuit for illuminating the busy lamp L612; and completes, at the contacts 674, a circuit for illuminating the answer lamp L613. At the conclusion of the splash of ringing current projected over the trunk line 710, the ring-down relay R680 restores, interrupting, at the contacts 682, the circuit for retaining operated the switch relay R645. The illumination of the busy lamp L612 indicates to the operator at the first position at the toll board 50 that the toll line circuit 600 is busy at this time; while the illumination of the answer lamp L613 indicates to the operator mentioned that a call is waiting to be answered on the toll line circuit 600 terminated by the jack J610.

In order to answer the call, the operator at the first position at the toll board 50 selects an idle cord circuit, such for example, as the cord circuit #1 and operates the talk key K313 thereof; whereby the cord circuit #1 is connected to the position circuit 500 and to the cord and sender control circuit 1000; all in the manner previously explained. At this time, the operator may answer the call by inserting either the rear plug P301 or the front plug P302 into the jack J610 terminating the toll line circuit 600. Normally the operator employs the rear or answer plug P301 for the purpose of answering calls; however, the front or call plug P302 may be utilized for this purpose; and in the present example, it is assumed that the operator utilizes the front plug P302. Accordingly, the front plug P302 is inserted into the jack J610; whereby the first contacts thereof are operated effecting operation of the jack relay R690. Upon operating the jack relay R690 interrupts, at the contacts 691', the holding circuit for retaining operated the control relay R670; and completes, at the contacts 692', a multiple circuit for illuminating the busy lamp L612. Upon restoring the control relay R670 interrupts, at the contacts 674, the circuit for illuminating the answer lamp L613, thereby indicating that the call on the toll line circuit 600 has been answered.

When the talk key K313 of the cord circuit #1 is operated, the connect relay R320 therein is operated together with the talk relay R210 in the telephone circuit 200, and the talk relay R1050 and the #1 cord relay R1140 in the cord and sender control circuit 1000. Again assuming that the sender #1 is in readiness for use and has been designated by the operated sequence relay R1180, the talk relay R1050 effects operation of the select #1 relay R1070 and the consequent operation of the connect #1 relay R1080; whereby the digit sender #1 is connected to the cord and sender control circuit 1000 and the digit registers #1 are connected to the key set K1000; all in the manner previously explained. At this time the previously traced circuit for energizing in series the winding of the front supervisory relay R535 and the upper winding of the sleeve relay R650 is completed; whereby the sleeve relay R650 operates; however, the front supervisory relay R535 does not operate as it is of the marginal type. Upon operating the sleeve relay R650 completes, at the contacts 652, the previously traced circuit for operating the switch relay R645; whereby the latter relay completes, at the contacts 645', the previously mentioned path for applying ground potential by way of the upper winding of the supervisory relay R665 and the contacts 697 and 696 to the simplex of the trunk line 710. At this time the upper winding of the supervisory relay R665 in the toll line circuit 600 is energized in series with the upper and lower windings of the simplex relay R750 in the repeater 700; whereby the supervisory relay R665 does not operate as it is of the marginal type;

however, the simplex relay R750 operates. Upon operating the simplex relay R750 completes, at the contacts 752, a circuit for operating the hold relay R760; and upon operating the hold relay R760 completes, at the contacts 761, a circuit for operating the cut-off relay R770. Upon operating the cut-off relay R770 interrupts, at the contacts 773, the previously traced path for returning ring-back tone current over the loop circuit extending back to the calling subscriber substation T701; and completes, at the contacts 771, 774 and 775, an alternative connection between the upper and lower windings of the line relay R790 and the line conductors C716 and C717 of the trunk 715. More particularly, the line conductor C716 of the trunk 715 is connected via the contacts 771, the winding 733 of the repeating coil 730, the contacts 781 and the upper winding of the line relay R790 to battery potential; and the conductor C717 of the trunk 715 is connected by way of the contacts 775, the winding 734 of the repeating coil 730, the contacts 774 and 783 and the lower winding of the line relay R790 to ground potential. Moreover, since the supervisory relay R665 in the toll line circuit 600 occupies its restored position, the front supervisory relay R535 is retained in its restored position, in order to cause the front control relay R540 to remain in its restored position; whereby the front supervisory lamp L304 is extinguished indicating that the subscriber at the calling subscriber substation T701 in the C. A. X 40 is connected at this time. Moreover, the calling subscriber substation T701 is operatively connected to the repeating coil 730; the repeating coil 730 is operatively connected to the repeating coil 620; the repeating coil 620 is operatively connected to the jack J610; and the jack J610 is operatively connected via the front plug P302 of the cord circuit #1 to the telephone circuit 200 at the first operator position at the toll board 50; whereby the operator answers the call and converses with the subscriber at the calling subscriber substation T701 in the C. A. X 40 and is advised concerning the extension of the connection.

*Sect. 8.—Calls from the toll board 50 to subscriber substations in the central office 10*

Now assuming that the call from the calling subscriber substation T701 in the C. A. X 40 answered at the first operator position at the toll board 50 is to be extended to a subscriber substation, such for example, as the called subscriber substation T401 in the central office 10, the operator must utilize the rear plug P301 of the cord circuit #1. Accordingly the send rear key K664 is operated interrupting, at the first contacts thereof, the previously prepared circuit for operating the send front relay R1045 and preparing, at the second contacts thereof a circuit traced hereinafter for operating the send rear relay R1040. At this time, the operator selects an idle outgoing trunk circuit, such for example, as the outgoing trunk circuit 800; and then the rear plug P301 of the cord circuit #1 is inserted into the jack J910 of the outgoing trunk circuit 800; whereby the first contacts thereof are operated completing a circuit for operating the jack relay R970. Upon operating the jack relay R970 completes, at the contacts 975, a circuit for illuminating the busy lamp L911 in order to indicate the busy condition of the outgoing trunk circuit 800 at this time. Also ground potential is connected via the lower winding of the sleeve relay R960 to the sleeve of the jack J910 and consequently to the sleeve of the rear plug P301, which is extended via the contacts 321, the conductor C332, the contacts 1068 and 1170, the conductor C571, the winding of the rear supervisory relay R520 and the resistor 515 to battery potential; whereby the lower winding of the sleeve relay R960 is energized in series with the winding of the rear supervisory relay R520. The sleeve relay R960 operates; however, the rear supervisory relay R520 does not operate, as it is of the marginal type. Upon operating the sleeve relay R960 completes, at the contacts 961 and 963, a path including the windings 921 and 922 of the repeating coil 920 and the resistors 913 and 916 for bridging the winding of the re-ring relay R860 across the tip and the ring of the jack J910. Also the sleeve relay R960 completes, at the contacts 967, a path, including the contacts 834, for energizing the upper winding thereof in multiple with the lower winding thereof; whereby the rear supervisory relay R520 operates, it being of the marginal type. Upon operating the rear supervisory relay R520 completes, at the contacts 521, the circuit for energizing the lower winding of the rear control relay R510 in order to cause the latter relay to operate shortly thereafter, it being rendered slightly slow-to-operate by virtue of the completed path for short-circuiting the upper winding thereof. Upon operating the rear control relay R510 completes, at the contacts 511, a circuit, including the contacts 521, the conductor C353, the first contacts of the talk key K313, and the conductor C331, for illuminating the rear supervisory lamp L303 in order to indicate to the operator at the first position at the toll board 50 that the call has not yet been answered. Also the sleeve relay R960 completes, at the contacts 964, a path, including the contacts 866 and 971, the winding 924 of the repeating coil 920, the contacts 881, the winding 923 of the repeating coil 920 and the contacts 861, for bridging the upper winding of the line seize relay R880 across the line conductors C811 and C812 of the trunk 810; and completes, at the contacts 966, a circuit, including the contacts 973 and the resistor 914 for energizing the lower winding of the line seizure relay R880. Also the sleeve relay R960 completes, at the contacts 968, a circuit, including the contacts 973, 932 and 972, for operating the busy relay R820. Upon operating the busy relay R820 interrupts, at the contacts 822, the normally completed path for applying battery potential by way of the lower winding of the ring start relay R920 to the control conductor C813 of the trunk 810; and completes, at the contacts 821, a direct path for applying ground potential to the control conductor C813. Also the busy relay R820 completes, at the contacts 823, a path, including the contacts 927 and 869, for applying ground potential to the control conductor C814 of the trunk 810. When ground potential is thus applied to the control conductor C813 of the trunk 810, the toll selector 417 is seized and the upper winding of the line seizure relay R880 is energized; however, the latter relay does not operate at this time since it is of the differential type, and the lower winding thereof is energized in opposing relation.

At this time the operator begins keying on the key set K1000 the digits comprising the directory number of the called subscriber substation T401; whereby the digits mentioned are registered in the digit registers #1 effecting operation of the hold relay R1370 in the digit sender #1 and the consequent return of ground potential over the conductor C1034 and via the contacts 1083, the conductor C576, the second contacts of the send rear key K564, the conductor C577, the contacts 1046 and the winding of the send rear relay R1040 to battery potential. When the winding of the send rear relay R1040 is thus energized, it operates to interrupt, at the contacts 1042, a further point in the circuit for operating the send front relay R1045; and to complete, at the contacts 1041, a holding circuit, including the grounded conductor C1034, for energizing the winding thereof. Also the send rear relay R1040 completes, at the contacts 1044, a circuit, including the contacts 1053 and 1082, and the grounded conductor C1032, for operating the connect rear #1 send relay R1060. Upon operating the connect rear #1 send relay R1060 completes, at the contacts 1060, a holding circuit, including the grounded conductor C1032, for energizing the winding thereof; and completes, at the contacts 1069, a holding circuit, including the contacts 1143 and the conductor C243 for energizing the winding of the talk relay R210 in series with the winding of the #1 cord relay R1140. Also the connect rear #1 send relay R1060 completes, at the contacts 1067, a connection, including the conductor C332 and the contacts 321, between the sleeve of the rear plug P301 and the conductor C1030; whereby the upper and lower windings of the sleeve relay R960 are energized in series with the windings of the stop send relay R1225 and the shunt relay R1215 in the digit sender #1; whereupon the sleeve relay R960 is retained in its operated position and the shunt relay R1215 and the stop send relay R1225 are operated. The digit sender #1 then operates to produce the initial space; whereby the test relay R1250 in the sender #1 is operated in order to retain operated the stop send relay R1225 and the shunt relay R1215 and to complete, at the contacts 1253, the connection, including the contacts 1421, between the conductors C1030 and C1029. At this time the conductor C1029 is extended via the contacts 1066 and the conductor C573 to ground potential at the automatic ring key K563; while the conductor C1030 is extended by way of the previously traced path to the sleeve of the rear plug P301 bringing about short-circuiting of the upper and lower windings of the sleeve relay R960 in the outgoing trunk circuit 800.

The sleeve relay R960 then restores completing, at the contacts 968, a circuit, including the contacts 974, the resistor 915 and the grounded sleeve of the jack J910, for operating the automatic ring relay R950. Upon operating the automatic ring relay R950 completes, at the contacts 951, a circuit, including the contacts 924 and 973, for operating the automatic ring relay R940. Upon operating the automatic ring relay R940 completes, at the contacts 941, a holding circuit, including the contacts 924 and 973, for energizing the winding thereof; and interrupts, at the contacts 942, a point in multiple to the contacts 927 in the path for applying ground potential to the control conductor C814 of the trunk 810 extending to the toll selector 417. Also the sleeve relay R960 interrupts, at the contacts 961 and 963, the connection bridging the winding of the re-ring relay R860 across the tip and the ring of the jack J910; and interrupts, at the contacts 964, the previously traced path for bridging the upper winding of the line seizure relay R880 across the line conductors C811 and C812 of the trunk 810; and interrupts, at the contacts 966, the circuit for energizing the lower winding of the line seizure relay R880 and the multiple circuit for energizing the winding of the busy relay R820; however, the busy relay R820 does not immediately restore as it is of the slow-to-release type. Further the sleeve relay R960 completes, at the contacts 962 and 965, a connection between the tip and the ring of the jack J910 and the line conductors C811 and C812 of the trunk 810. More particularly, the tip of the jack J910 is connected via the contacts 962, 921 and 861 to the line conductor C811 of the trunk 810; and the ring of the jack J910 is connected via the winding of the dial relay R930, the contacts 922, 965, 971 and 866 to the line conductor C812 of the trunk 810. Further the tip and the ring of the jack J910 are connected via the tip and the ring of the rear plug P301, the second and seventh contacts of the ring rear key K315, the contacts 326, 323, the conductors C334, C333 and the contacts 1063', 1063 to the dial conductors C1027, C1038 extending to the digit sender #1. Accordingly, the loop circuit for retaining operated the toll selector 417 is completed in the digit sender #1 effecting operation of the dial relay R930. Upon operating the dial relay R930 completes, at the contacts 931, an alternative holding circuit, including the contacts 973 and 972, for retaining operated the busy relay R820.

The sender #1 then sends the first digit over the dial conductors C1038 and C1027; whereby the dial relay R930 follows retaining operated the busy relay R820; and the line relay in the toll selector 417 follows effecting corresponding operation thereof. More particularly the toll selector 417 operates to select the group of trunks including the trunk 408 and then an idle trunk in the group mentioned. For example, the toll selector 417 may select the particular trunk 408 extending to the combination connector 407; whereupon the toll selector 417 switches through completing a loop circuit to the line relay in the combination connector 407.

At the conclusion of the first digit sent from the digit sender #1 the test relay R1250 in the digit sender #1 is restored; whereby the conductors C1029 and C1030 are disconnected. At this time the previously traced circuit for energizing the lower winding of the sleeve relay R960 in series with the windings of the stop send relay R1225 and the shunt relay R1215 is recompleted effecting reoperation of the sleeve relay R960 and the shunt relay R1215. Upon reoperating the sleeve relay R960 interrupts, at the contacts 968, the circuit for energizing the winding of the automatic ring relay R950 in order to cause the latter relay to restore. Also the sleeve relay R960 recompletes, at the contacts 967, the circuit for energizing in multiple the upper and lower windings thereof; whereby the stop send relay R1225 is operated indicating that the digit sender #1 may proceed to send the second digit since the toll selector 417 has operated to select the trunk 408 extending to the combination connector 407, no delay-in-send signal being encountered at this time. Also upon reoperating the sleeve relay R960 recompletes, at the contacts 961 and 963, the path bridging the winding of the re-ring relay R860 across the tip and the ring of the jack J910; and interrupts, at the contacts 962 and 965, the connection, including the winding of the dial relay R930, between the tip and the ring of the jack J910 and the line conductors of the trunk 810. Also the sleeve relay R960 recompletes, at the contacts 964, the path bridging the upper winding of the line seizure relay R880 across the line conductors of the trunk 810; and recompletes, at the contacts 866, the circuit for energizing the lower winding of the line seizure relay R880. However, the line seizure relay R880 does not operate at this time as it is of the differential type. Upon restoring the dial relay R930 recompletes, at the contacts 932, the original circuit for retaining operated the busy relay R820.

In a similar manner the second and third digits registered in the digit registers #1 are sent by the digit sender #1 in order to cause operation of the combination connector 407 to select the subscriber line 402 extending to the called subscriber substation T401. The subsequent operation of the combination connector 407 depends upon the idle or busy condition of the called subscriber substation T401 at this time; and assuming that the called subscriber substation T401 is idle the combination connector 407 operates to switch through and dry the loop circuit extending back over the trunk 810 to the upper winding of the line seizure relay R880 in the outgoing trunk circuit 800. When the upper winding of the line seizure relay R880 is thus deenergized this relay operates since the lower winding thereof is energized, it being of the differential type. More particularly, the line seizure relay R880 first operates through a first step to complete, at the contacts 884, a direct circuit shunting the resistor 914 for energizing the lower winding thereof; whereby the line seizure relay R880 operates fully. Upon operating fully the line seizure relay R880 interrupts, at the contacts 881, the path for bridging the upper winding thereof across the line conductors of the trunk 810; and completes, at the contacts 882 and 883 a circuit, including the windings 923 and 924 of the repeating coil 920, the contacts 964, 971, 861 and 866, for connecting the upper and lower windings of the supervisory relay R830 across the line conductors C811 and C812 of the trunk 810. Further the line seizure relay R880 completes, at the contacts 886, a circuit for energizing the upper winding of the ring start relay R920 in order to cause the latter relay to operate. Upon operating the ring start relay R920 completes, at the contacts 925, a multiple circuit for illuminating the busy lamp L811; completes, at the contacts 926, a multiple path, including the contacts 823, for applying ground potential to the control conductor C813 of the trunk 810; and interrupts, at the contacts 927, the previously traced path for applying ground potential to the control conductor C814 of the trunk 810. Also the ring start relay R920 interrupts, at the contacts 924, the holding circuit for energizing the winding of the automatic ring relay R940; whereby the latter relay restores shortly thereafter, it being of the slow-to-release type. Upon restoring the automatic ring relay R940 recompletes, at the contacts 942, a path, including the contacts 823 and 869, for applying ground potential to the control conductor C814 of the trunk 810. Accordingly, ground potential is first removed from and then reapplied to the control conductor C814 of the trunk 810 initiating a ringing cycle of the combination connector 407; whereby the combination connector 407 operates to project ringing current over the subscriber line 402 to the called subscriber substation T401. After all of the digits registered in the digit registers #1 have been sent by the digit sender #1 these pieces of apparatus are released in the manner previously explained.

More particularly, after all of the digits comprising the directory number of the called subscriber substation T401 have been keyed up on the key set K1000, the call completed key or button in the key set K1000 is operated effecting operation of the call complete relay R1210 in the digit sender #1; whereby ground potential is removed from the conductor C1028 effecting the restoration of the connect #1 relay R1080. Upon restoring the connect #1 relay R1080 interrupts, at the contacts 1083, the holding circuit for retaining operated the send rear relay R1040. After all of the digits registered in the digit registers #1 have been sent by the digit sender #1, ground potential is removed from the hold conductor C1032 interrupting the holding circuit for retaining operated the connect rear #1 send relay R1060. Upon restoring the connect rear #1 send relay R1060 interrupts, at the contacts 1063 and 1063', the connections between the tip and the ring of the rear plug P301 of the cord circuit #1 and the dial conductors C1038 and C1027 extending to the digit sender #1; and completes, at the contacts 1062 and 1062', the previously traced connections between the tip and the ring of the plug P301 and the upper and lower windings of the impedance element 545. Also the connect rear #1 send relay R1060 interrupts, at the contacts 1067, the connection between the sleeve of the rear plug P301 and the conductor C1030 extending to the digit sender #1; and completes, at the contacts 1068, the previously traced connection between the sleeve of the rear plug P301 and the winding of the rear supervisory relay R520. At this time the winding of the rear supervisory relay R520 is energized in series with the lower winding of the sleeve relay R960. The sleeve relay R960 operates; however, the rear supervisory relay R520 does not operate immediately, it being of the marginal type. Upon operating the sleeve relay R960 completes, at the contacts 967, the circuit for energizing in multiple the upper and lower windings thereof; whereby the sleeve relay R960 is retained in its operated position and the rear supervisory relay R520 operates effecting operation of the rear control relay R510 and the consequent illumination of the rear supervisory lamp L303 associated with the rear plug P301 of the cord circuit #1 in order to indicate to the operator at the first position at the toll board 50 that the call has not yet been answered at the called subscriber substation T401 in the central office 10.

When the subscriber at the called subscriber substation T401 answers the call, a loop circuit is completed therefrom to the upper and lower windings of the supervisory relay R830 over the trunk 810; whereby the latter relay operates. Upon operating the supervisory relay R830 completes, at the contacts 833, a circuit for operating the hold relay R870. Upon operating the hold relay R870 completes, at the contacts 874, a direct path for applying ground potential to the control conductor C814 of the trunk 810. Also the supervisory relay R830 interrupts, at the contacts 834, the circuit for energizing the upper winding of the sleeve relay R960 in multiple with the lower winding thereof: whereby high resistance ground potential is applied through the lower winding of the sleeve relay R960 to the sleeve of the jack J910. Now assuming that the operator at the first position at the toll board 50 still retains operated the talk key K313 of the cord circuit #1, the previously traced circuit for energizing in series the lower winding of the sleeve relay R960 and the winding of the rear supervisory relay R520 is completed; whereby the sleeve relay R960 is retained in its operated position and the rear supervisory relay R520 restores as it is of the marginal type. Upon restoring the rear supervisory relay R520 effects the restoration of the rear control relay R510; whereupon the rear supervisory lamp L303 is extinguished indicating to the operator that the subscriber at the called subscriber substation T401 has answered the call. At this time the operator at the first position at the toll board 50 converses with the subscriber at the called subscriber substation T401, if necessary, and then retires from the established connection by restoring the talk key K313 of the cord circuit #1. At this time an established connection is completed between the calling subscriber substation T701 in the C. A. X 40 and the called subscriber substation T401 in the central office 10. Also the operator restores the send rear key K564 so that the next time a digit sender is utilized, it will be operative to send digits over the front plug rather than the rear plug of the cord circuit in use.

Reconsidering the extension of the call from the first operator position at the toll board 50 to the called subscriber substation T401 in the central office 10, in the event the operator does not wish automatic ringing, she operates the automatic ring key K563 after operating the send rear key K564 in the present example and prior to keying up on the key set K1000 the digits comprising the directory number of the called subscriber substation T401. In this case during the sending of the first digit by the digit sender #1 when the test relay R1250 operates to connect the conductor C1030 to the conductor C1029, no ground potential is applied to the conductor C1029 by virtue of the operated position of the automatic ring key K563; whereby the circuit for energizing in multiple the upper and lower windings of the sleeve relay R960 in the outgoing trunk circuit 800 is merely interrupted. Specifically, ground potential is not returned over the sleeve of the jack J910; whereby the automatic ring relay R950 and the automatic ring relay R940 are not operated. Accordingly, after all of the digits have been sent from the digit sender #1 and the combination connector 407 is operated to select the subscriber line 402 extending to the called subscriber substation T401, operation of the line seizure relay R880 and the consequent operation of the ring start relay R920 do not bring about the removal of ground potential from the control conductor C814 of the trunk 810 since the automatic ring relay R940 occupies its restored position. More particularly, the restored automatic ring relay R940 retains completed, at the contacts 942, a point in multiple to the contacts 927 in the path for applying ground potential to the control conductor C814 of the trunk 810; whereby the ringing cycle of the combination connector 407 is not initiated.

More particularly, at this time the operator initiates ringing by operating the ring rear key K315; whereby ground and battery potentials are applied, at the third and eighth contacts thereof, to the tip and the ring of the rear plug P301 completing the circuit for energizing the winding of the re-ring relay R860 in order to cause the latter relay to operate. Upon operating the re-ring relay R860 interrupts, at the contacts 869, the path for applying ground potential to the control conductor C814 of the trunk 810. Thereafter, when the operator restores the ring key K315 the circuit for retaining operated the re-ring relay R860 is interrupted, causing the latter relay to restore and recomplete, at the contacts 869, the path for applying ground potential to the control conductor C814 of the trunk 810. When grounded potential is thus removed from and then reapplied to the control conductor C814 of the trunk 810, the ringing cycle of the combination connector 407 is initiated in the manner previously explained.

Reconsidering the extension of the call from the first operator position at the toll board 50 to the called subscribed substation T401 in the central office 10, it is noted that following the sending of the first digit the toll selector 417 may encounter an all-trunks-busy condition of the group of trunks, including the trunk 408. In this event the toll selector 417 operates to interrupt 60 times per minute the loop circuit extending therefrom back over the trunk 810 to the upper winding of the line seizure relay R880; whereby the latter relay operates effecting operation of the ring start relay R920 and the consequent restoration shortly thereafter of the automatic ring relay R940; all in the manner previously explained. Also upon operating the line seizure relay R880 connects the upper and lower windings of the supervisory relay R830 across the line conductors C811 and C812 of the trunk 810; whereby the supervisory relay R830 follows the 60 impulses per minute returned over the trunk 810. Each time the supervisory relay R830 operates and then restores, it completes and then interrupts, at the contacts 833, the circuit for energizing the winding of the hold relay R870; whereby the latter relay operates and remains operated during the return of the all-trunks-busy signal since it is of the slow-to-release type. In fact the hold relay R870 operates prior to the restoration of the automatic ring relay R940; whereby ground potential is never removed from the control conductor C814. Also each time the supervisory relay R830 operates and then restores, it interrupts and then recompletes, at the contacts 834, the path for connecting in multiple the upper and lower windings of the sleeve relay R960; whereby 60 low resistance ground impulses per minute are transmitted over the sleeve of the jack J910. The transmission of 60 impulses per minute over the sleeve of the jack J910 effects the release of the digit sender #1 and the digit registers #1 in the manner previously explained; and thereafter, the rear supervisory relay R520 follows causing the rear control relay R510 to follow and bring about flashing 60 times per minute of the rear supervisory lamp L303 indicating to the operator at the first position at the toll board 50 that the outgoing switch train has encountered an all-trunks-busy condition. In this case the operator withdraws the rear plug P301 and advises the subscriber at the calling subscriber substation T701 in the C. A. X 40 of the condition noted.

Again reconsidering the extension of the call from the first operator position at the toll board 50 to the called subscriber substation T401 in the central office 10, after all of the digits have been transmitted by the digit sender #1, the combination connector 407 may test the called subscriber substation T401 as busy. In this event the combination connector 407 switches through first drying the loop circuit extending back to the upper winding of the line seizure relay R880 and then returning 120 impulses per minute over the trunk 810 in the form of connections and disconnections between the line conductors C811 and C812 thereof. In this case the digit sender #1 and the digit registers #1 have already been released since all of the digits have been sent; and again the line seizure relay R880 operates effecting operation of the ring start relay R920 and the subsequent restoration of the automatic ring relay R940. Also the line seizure relay R880 connects the supervisory relay R830 across the line conductors of the trunk 810; whereby the latter relay follows effecting operation of the hold relay R870 before restoration of the automatic ring relay R940. At this time the supervisory relay R830 repeats, at the contacts 834, to the rear supervisory relay R520; whereby the latter relay follows causing the rear control relay R510 to follow and bring about flashing of the rear supervisory lamp L303 at 120 times per minute indicating to the operator that the called subscriber substation T401 in the central office 10 is busy at this time. In this case, the operator withdraws the rear plug P301 and advises the subscriber at the calling subscriber substation T701 in the C. A. X 40 of the condition noted.

At the conclusion of the established connection between the calling subscriber substation T701 in the C. A. X 40 and the called subscriber substation T401 in the central office 10, when the subscriber at the calling subcriber substation T701 disconnects, the loop circuit extending to the upper and lower windings of the line relay R790 is interrupted; whereby the latter relay restores. Upon restoring the line relay R790 interrupts, at the contacts 793, the circuit for energizing the winding of the hold relay R700 in order to cause the latter relay to restore shortly thereafter, it being of the slow-to-release type. Also the line relay R790 interrupts, at the contacts 791, the path for applying battery potential by way of the upper and lower windings of the simplex relay R740 to the simplex of the trunk line 710; and completes, at the contacts 792, the path including the contacts 746, for applying battery potential by way of the lower winding of the simplex relay R750 to the simplex of the trunk line 710. Accordingly, low resistance battery potential is substituted for high resistance battery potential upon the simplex of the trunk line 710 effecting operation of the supervisory relay R665 in the toll line circuit 600 since the latter relay is of the marginal type.

Upon operating the supervisory relay R665 completes, at the contacts 666, the path for connecting in multiple the upper and lower windings of the sleeve relay R650, thereby completing the previously traced circuit for illuminating the front supervisory lamp L304 indicating to the operator at the first position at the toll board 50 that the subscriber at the calling subscriber substation T701 has disconnected. The operator then withdraws the front plug P302 from the jack J610 extinguishing the front supervisory lamp L304 and effecting the restoration of the sleeve relay R650 and the jack relay R690 in the toll line circuit 600. Upon restoring the sleeve relay R650 interrupts, at the contacts 652, the circuit for retaining operated the switch relay R645. Upon restoring the jack relay R690 interrupts, at the contacts 696, the path for connecting ground potential via the upper winding of the supervisory relay R665 to the simplex of the trunk line 710 in order to cause the latter relay to restore. Also the jack relay R690 recompletes, at the contacts 695, the normal connection between the winding of the ring-down relay R680 and the simplex of the trunk line 710; recompletes, at the contacts 690, the normal path for applying battery potential by way of the winding of the seize relay R685 to control conductor C633 of the trunk 630 in order to mark the trunk 630 as idle to the incoming selectors 416, etc., having access thereto. Finally, the jack relay R690 interrupts, at the contacts 692', the circuit for illuminating the busy lamp L612 in order to indicate that the toll line circuit 600 is idle at this time.

When ground potential in the toll line circuit 600 is removed from the simplex of the trunk line 710, the circuit for retaining operated the simplex relay R750 in the repeater 700 is interrupted; whereby the latter relay, upon restoring, interrupts, at the contacts 752, the circuit for energizing the winding of the hold relay R760 in order to cause the latter relay to restore shortly thereafter, it being of the slow-to-release type. Upon restoring the hold relay R760 interrupts, at the contacts 761, the circuit for retaining operated the cut-off relay R770. Upon restoring the cut-off relay R770 interrupts, at the contacts 777, the multiple holding circuit for energizing the winding of the ring-out relay R780 and the lower winding of the ring-out relay R795 in order to cause the relays mentioned to restore. Upon restoring the ring-out relay R780 interrupts, at the contacts 787, the holding circuit for retaining operated the control relay R745. Upon restoring the control relay R745 interrupts, at the contacts 746, the previously traced path for connecting battery potential via the lower winding of the simplex relay R750 to the simplex of the trunk line 710; and recompletes, at the contacts 747, the previously traced path for applying battery potential by way of the upper and lower windings of the simplex relay R750 to the simplex of the trunk line 710. Also the cut-off relay R770 interrupts, at the contacts 777, a multiple path for applying ground potential to the control conductor C718 of the trunk 715; and recompletes, at the contacts 778, the normal path for applying battery potential via the associated resistor to the control conductor C718; whereby the selector 706 and the finder 705 are released. When the finder 705 is thus released, the line circuit 703 is controlled to mark the subscriber line 702 extending to the subscriber substation T701 as idle to the combination connector 707, etc., having access thereto.

When the subscriber at the called subscriber substation T401 disconnects, the loop circuit extending to the supervisory relay R830 in the outgoing trunk circuit 800 is interrupted; whereby the latter relay restores completing, at the contacts 834, the path for connecting the upper and lower windings of the sleeve relay R960 in multiple; whereby the rear supervisory lamp L303 is illuminated indicating to the operator at the first position at the toll board 50 that the subscriber at the called subscriber substation T401 has disconnected. Also upon restoring the supervisory relay R830 interrupts, at the contacts 833, the circuit for energizing the winding of the hold relay R870 in order to cause the latter relay to restore shortly thereafter, it being of the slow-to-release type. Upon restoring the hold relay R870 interrupts, at the contacts 874, the multiple path for applying ground potential to the control conductor C814 of the trunk 810. When the operator withdraws the rear plug P301 from the jack J910, the rear supervisory lamp L303 is extinguished and the sleeve relay R960 is restored together with the jack relay R970. Upon restoring the jack relay R970 interrupts, at the contacts 973, the holding circuit for energizing the lower winding of the line seizure relay R880 in order to cause the latter relay to restore. Also the jack relay R870 interrupts, at the contacts 872, the multiple circuit for energizing the winding of the busy relay R820 in order to cause the latter relay to restore shortly thereafter, it being of the slow-to-release type. Upon restoring the line seizure relay R880 interrupts, at the contacts 886, the circuit for energizing the upper winding of the ring start relay R920 in order to cause the latter relay to restore. Upon restoring the ring start relay R920 interrupts, at the contacts 925, the circuit for illuminating the busy lamp L911, thereby to indicate the idle condition to the outgoing trunk circuit 800 at this time. Upon restoring the busy relay R820 interrupts, at the contacts 821, the path for applying ground potential to the control conductor C813 of the trunk 810 and recompletes, at the contacts 822, the path for applying battery potential by way of the lower winding of the ring start relay R920 thereto. Also the busy relay R820 interrupts, at the contacts 823, the path for applying ground potential to the control conductor C814 of the trunk 810. When ground potential is thus removed from the control conductor C813 of the trunk 810, the toll selector 417 and the combination connector 407 are released. When the combination connector 407 is thus released, the line circuit 403 is controlled to mark the subscriber line 402 as idle to the combination connectors 407, etc., having access thereto.

Again reconsidering the established connection involving the called subscriber substation T401 in the central office 10, should the operator at the first position at the toll board 50 wish to recall the subscriber at the called subscriber substation T401 after receiving the disconnect signal, this may be accomplished merely by operating the ring rear key K315, while the talk key K313 occupies its operated position. At this time the ring rear key K315 is operated and then restored effecting operation and restoration of the re-ring relay R860 and the consequent momentary removal of ground potential from the control conductor C814 of the trunk 810 in the manner previously explained; whereby another ringing cycle of the combination connector 407 is initiated.

Also in this regard it is noted that should the subscriber at the called subscriber substation T401 fail to disconnect, at the conclusion of the established connection, the operator at the first position at the toll board 50 reoperates the talk key K313 and challenges the connection. In the event the operator is unable to communicate with the subscriber at the called subscriber substation T401, she may operate and then restore the ring rear key K315 effecting operation and restoration of the re-ring relay R860 in the outgoing trunk circuit 800. In this case since the subscriber at the called subscriber substation T401 has not disconnected, the supervisory relay R830 and the hold relay R870 occupy their operated positions. Accordingly, when the re-ring relay R860 is operated, it interrupts, at the contacts 861 and 866, the connection between the line conductors C811 and C812 of the trunk 810 and the upper and lower windings of the supervisory relay R830; and completes, at the contacts 864, a direct holding circuit, including the resistor 817 and the contacts 871, for energizing in series the upper and lower windings of the supervisory relay R830. Also upon operating the re-ring relay R860 completes, at the contacts 862 and 865, a connection including the contacts 872, for applying ground and generator potentials via the generator conductor C875 directly to the line conductors C811 and C812 respectively of the trunk 810 in order to cause the receiver of the telephone instrument at the called subscriber substation T401 to howl. This arrangement permits signaling of the subscriber at the called subscriber substation T401 at this time when he is not at the subscriber substation T401, but while the telephone instrument thereat is off of the associated switchhook. By appropriately manipulating the ring rear key K315, the operator may control the howling of the receiver of the telephone instrument at the called subscriber substation T401 in order to attract the attention of the subscriber thereat.

*Sect. 9.—Calls from the toll board 410 in the distant office 20 to subscriber substations in the central office 10*

In order to extend a call from the calling toll board 410 in the distant office 20 to a subscriber substation, such for example, as the called subscriber substation T401 in the central office 10, the operator at the toll board 410 after selecting link equipment, selects an idle trunk extending to a repeater terminating an idle toll line and then proceeds to dial the required digits. For example, the operator at the toll board 410 may select the trunk 411 extending to the repeater 412 terminating the toll line 413; whereby the repeater 412 seizes the repeater 414 over the toll line 413 causing the repeater 414 to seize over the trunk 415, the incoming selector 416. The digits dialed are repeated by the repeater 412 over the toll line 413 to the repeater 414 and then repeated thereby over the trunk 415. The incoming selector 416 responds to the first digit 9 to select the group of trunks, including the trunk 408, and then an idle trunk in the group mentioned. For example, the incoming selector 416 may select the particular trunk 408 extending to the combination connector 407; then the combination connector 407 responds to the second and third digits to select the subscriber line 402 extending to the called subscriber substation T401. The subsequent operation of the combination connector 407 depends upon the idle or busy condition of the called subscriber substation T401 at this time in accordance with conventional practice. The ultimate completion of the established connection, the supervision thereof and the final release thereof are all in accordance with conventional practice and are not described in detail in the interest of brevity.

*Sect. 10.—Calls from the toll board 410 in the distant office 20 to subscriber substations in the C. A. X 40*

Now assuming that a call is to be extended from the calling toll board 410 in the distant office 20 to a subscriber substation, such for example, as the called subscriber substation T701 in the C. A. X 40, the operator initiates the call and dials the required digits in the manner previously explained. This call may be routed from the toll board 410 via the trunk 411, the repeater 412, the toll line 413, the repeater 414, and the trunk 415 to the incoming selector 416. In this case the first digit received by the incoming selector 416 is the digit 8; whereby it operates to select the group of trunks, including the trunk 630, and then an idle trunk in the group mentioned. For example, the incoming selector 416 may select the particular trunk 630 extending to the toll line circuit 600, the trunk 630 being marked as idle by the application of battery potential via the winding of the seize relay R685 and the contacts 646′, 671, and 690 to the control conductor C633 thereof. When the incoming selector 416 seizes the trunk 630, it switches through extending the loop circuit from the repeater 414 via the trunk 415, the line conductors C631 and C632 of the trunk 630, the windings 623 and 624 of the repeating coil 620 and the contacts 692 and 693 to the upper and lower windings of the line relay R640 causing the latter relay to operate. Also ground potential in the incoming selector 416 is applied to the control conductor C633 of the trunk 630 completing the previously traced circuit for operating the seize relay R685. Upon operating the line relay R640 completes, at the contacts 642, a holding circuit, including the contacts 661′, for energizing the winding of the seize relay R685 and a multiple circuit, also including the contacts 646′, 671 and 690, for applying ground potential to the control conductor C633 of the trunk 630 in order to retain the incoming selector 416 in its operated position. Upon operating the seize relay R685 completes, at the contacts 689, a circuit for illuminating the busy lamp L612 in order to indicate the busy condition of the toll line circuit 600 at this time to the operator at the toll board 50. Also the line relay R640 completes, at the contacts 641, a path, including the upper winding of the supervisory relay R665 and the contacts 687 and 695, for applying ground potential to the simplex of the trunk line 710. At this time battery potential is applied by way of the upper and lower windings of the simplex relay R750 in the repeater 700 and the contacts 747 and 792 to the simplex of the trunk line 710. Accordingly, the simplex relay R750 operates; whereas the supervisory relay R665 does not operate as it is of the marginal type. Upon operating the simplex relay R750 effects operation of the hold relay R760; and upon operating the hold relay R760 completes, at the contacts 761, the circuit for operating the cut-off relay R770 and the multiple circuit for energizing the upper winding of the supervisory relay R740. Upon operating the cut-off relay R770 bridges the lower winding of the supervisory relay R740 across the trunk 720 extending to the trunk line circuit 725 and marks the trunk 715 as busy to the selectors 706, etc., having access thereto. At this time the supervisory relay R740 is not poled to operate; whereby battery potential is returned via the lower and upper windings of the simplex relay R750 over the simplex of the trunk line 710 preventing operation of the supervisory relay R665 in the toll line circuit 600. Also the trunk line circuit 725 initiates operation of the distributor 704 to assign an idle one of the finder-selector links. Also when the incoming selector 416 seizes the trunk 630 ground potential in the toll line circuit 600 is applied, at the contacts 656′ of the restored hold relay R655, to the control conductor C634 of the trunk 630 and constituting a delay-in-send signal. More particularly, the application of ground potential to the control conductor C634 of the trunk 630 cause the repeater 414 to be governed to transmit a delay-in-send signal over the toll line 413 to the repeater 412; which delay-in-send signal is repeated by the repeater 412 over the trunk 411 to the toll board 410 in the distant offi~e 20 in order to effect a delay-in-sending operation in the event register-sender apparatus is utilized at the toll board 410 and in order to operate a supervisory signal in the event manual dialing is utilized at the toll board 410. In any case, a delay-in-send or a delay-in-dial signal is transmitted to the toll board 410 at this time indicating that further digits should not be sent over the trunk 411 as the switching apparatus in the C. A. X 40 is not in readiness to receive the next digit.

Assuming that the distributor 704 assigns the finder-selector link illustrated when the finder 705 operates to find the trunk 720 extending from the repeater 700, the lower winding of the supervisory relay R740 is poled to operate. Upon operating the supervisory relay R740 effects operation of the control relay R745; whereby battery potential is connected via the lower winding of the simplex relay R750 to the simplex of the trunk line 710 effecting operation of the supervisory relay R665, the latter relay being of the marginal type. Upon operating the supervisory relay R665 completes, at the contacts 666, a circuit, including the contacts 664, 699 and 688, for operating the hold relay R655. Upon operating the hold relay R655 completes, at the contacts 657, a holding circuit, including the contacts 642, for energizing the winding thereof; and completes, at the contacts 658 a multiple holding circuit for energizing the winding of the seize relay R685. Also upon operating the hold relay R655 interrupts, at the contacts 656′, the path for applying ground potential to the control conductor C634 of the trunk 630; whereby the repeater 414 is controlled to return a ready signal over the toll line 413 to the repeater 412, which ready signal is repeated by the repeater 412 over the trunk 411 to the toll board 410 in the distant office 20 indicating that the transmission of further digits over the trunk 411 may proceed. The next digit is then transmitted over the trunk 411 to the repeater 412 and repeated thereby over the toll line 413 to the repeater 414 and repeated thereby over the loop circuit to the line relay R640 in the toll line circuit 600; whereby the line relay R640 follows. Each time the line relay R640 restores and then reoperates, it completes and then interrupts, at the contacts 643, a circuit, including the contacts 659, for energizing the winding of the dial relay R660; whereby the latter relay operates and remains operated during impulsing. Upon operating the dial relay R660 completes, at the contacts 661, a path, including the contacts 692, and the resistor 615, for short-circuiting the winding 623 of the repeating coil 620 in order to improve impulsing over the loop cricuit to the line relay R640 at this time. Also the dial relay R660 completes, at the contacts 663, a holding circuit, including the contacts 656, for energizing the lower winding of the supervisory relay R665 in order to retain the latter relay operated during impulsing. Also the dial relay R660 completes, at the contacts 662, a path, including the resistor 614, for short-circuiting the upper winding of the supervisory relay R665 in order to improve impulsing over the simplex of the trunk line 710. Also each time the line relay R640 restores and then reoperates, it interrupts and then recompletes, at the contacts 642, the circuit for energizing the winding of the hold relay R655, thereby to retain the latter relay in its operated position during impulsing as it is of the slow-to-release type. Finally, each time the line relay R640 restores and then reoperates, it interrupts and then recompletes, at the contacts 641, the path for applying ground potential to the simplex of the trunk line 710; whereby the simplex relay R750 in the repeater 700 follows. Each time the simplex relay R750 restores and then reoperates, it completes and then interrupts, at the contacts 753, a circuit, including the contacts 762 and 798, for energizing the winding of the dial relay R755 in order to cause the latter relay to operate and remain operated during impulsing. Upon operating the dial relay R755 completes, at the contacts 757, a holding circuit including the contacts 748, for retaining operated the control relay R745; and completes, at the contacts 756, the path including the resistors 709 and 708 and the contacts 782 for short-circuiting in series the lower winding of the supervisory relay R740 and the winding 733 of the repeating coil 730 in order to improve impulsing over the trunk 720. Also each time the simplex relay R750 restores and then reoperates, it interrupts and then recompletes, at the contacts 752, the circuit for energizing the winding of the hold relay R760; whereby the latter relay being of the slow-to-release type, is retained operated during impulsing. Finally, each time the simplex relay R750 restores and then reoperates, it interrupts and then recompletes, at the contacts 751, the loop circuit extending via the line conductors of the trunk 720 to the line relay in the selector 706; whereby the selector 706 is operated to select the group of combination connectors, including the combination connector 707, and then an idle combination connector in the group mentioned.

At the conclusion of the present digit, the line relay R640 in the toll line circuit 600 is retained in its operated position and shortly thereafter, the dial relay R660 restores as it is of the slow-to-release type. Upon restoring the dial relay R660 interrupts, at the contacts 661, the path for short-circuiting the winding 623 of the repeating coil 620; interrupts, at the contacts 662, the path for short-circuiting the upper winding of the supervisory relay R665; and interrupts, at the contacts 663, the holding circuit for energizing the lower winding of the supervisory relay R665; whereby the upper winding of the supervisory relay R665 is again placed on test as explained more fully hereinafter. Also, at the conclusion of the present digit, the simplex relay R750 is retained in its operated position and shortly thereafter the dial relay R755, being of the slow-to-release type, restores. Upon restoring the dial relay R755 interrupts, at the contacts 756, the path for short-circuiting in series the lower winding of the supervisory relay R740 and the winding 733 of the repeating coil 730; and interrupts, at the contacts 757, the holding circuit for energizing the winding of the control relay R745; whereby the position of the control relay R745 is determined in accordance with the position of the supervisory relay R740. More particularly, at this time since it has been assumed that the selector 706 operated to select the combination connector 707, the lower winding of the supervisory relay R740 is poled to reoperate whereby the latter relay upon reoperating retains the control relay R745 in its operated position; whereby battery potential is applied via the lower winding of the simplex relay R750 to the simplex of the trunk line 710 causing the supervisory relay R665 in the toll line circuit 600 to remain in its operated position. Accordingly ground potential disconnected from the control conductor C634 of the trunk 630 constitutes a ready signal. The repeater 414 repeats the ready signal over the toll line 413 to the repeater 412 and the repeater 412 repeats the ready signal over the trunk 411 to the toll board 410 indicating that further digits may be transmitted.

The next two digits transmitted from the toll board 410 are repeated in the manner explained above; whereby the combination connector 707 is operated to select the subscriber line 702 extending to the called subscriber substation T701; whereupon further operation of the combination connector 707 depends upon the idle or busy condition of the called subscriber substation T701 at this time. First assuming that the called subscriber substation T701 is idle, the combination connector 707 operates to project ringing current over the subscriber line 702; and subsequently, when the subscriber at the called subscriber substation T701 answers the call, the combination connector 707 switches through to reverse the polarity over the trunk 720 in order to pole the supervisory relay R740 to restore. Upon restoring the supervisory relay R740 effects the restoration of the control relay R745; whereupon battery potential via the upper and lower windings of the simplex relay R750 is returned over the simplex of the trunk line 710 in order to effect the restoration of the supervisory relay R665 in the toll line circuit 600. Upon restoring the supervisory relay R665 completes, at the contacts 667, a circuit, including the contacts 642 and 657, for operating the control relay R675; whereby the latter relay completes, at the contacts 676, an alternative path for applying ground potential to the control conductor C634 of the trunk 630 and constituting an answer signal. The repeater 414 repeats the answer signal over the toll line 413 to the repeater 412 and the repeater 412 repeats the answer signal over the trunk 411 to the toll board 410.

At the conclusion of the established connection, when the subscriber at the called subscriber substation T701 disconnects, the combination connector 707 operates to reverse the polarity of the trunk 720; whereby the supervisory relay R740 is poled to operate, thereby effecting operation of the control relay R745 and the consequent application of battery potential via the lower winding of the simplex relay R750 to the simplex of the trunk line 710 causing the supervisory relay R665 in the toll line circuit 600 to reoperate and effect the restoration of the control relay R675. Upon restoring the control relay R675 interrupts, at the contacts 676, the path for applying ground potential to the control conductor C634 of the trunk 630, and constituting a disconnect signal; which disconnect signal is repeated by the repeaters 414 and 412 to the toll board 410 in the distant office 20.

The operator at the toll board 410 then effects the release of the associated link equipment; whereupon the repeaters 412 and 414 are released and the repeater 414 interrupts the loop circuit for retaining operated the line relay R640 in the toll line circuit 600. Upon restoring the line relay R640 interrupts, at the contacts 641, the circuit for energizing in series the upper winding of the supervisory relay R665 in the toll line circuit 600 and the lower winding of the simplex relay R750 in the repeater 700; whereby the relays mentioned restore. Also the line relay R640 interrupts, at the contacts 642, the holding circuit for energizing the winding of the hold relay R655 in order to cause the latter relay to restore shortly thereafter, it being of the slow-to-release type. Upon restoring the hold relay R665 interrupts, at the contacts 658, the holding circuit for retaining operated the seize relay R685 and the multiple path for applying ground potential to the control conductor C633 of the trunk 630; whereupon battery potential is again applied via the winding of the seize relay R685 to the control conductor C633. When ground potential is thus removed from the control conductor C633 of the trunk 630, the incoming selector 416 is released; and when battery potential is returned upon the control conductor C633, the trunk 630 is marked as idle to the incoming selectors 416, etc., having access thereto. When the incoming selector 416 is thus released, the repeaters 414 and 412 are released; whereby the trunk 411 extending to the repeater 412 is marked as idle to the toll board 410. Also the hold relay R665 interrupts, at the contacts 655', the circuit for illuminating the busy lamp L612, thereby to indicate the idle condition of the toll line circuit 600 to the toll board 50 at this time.

Upon restoring the simplex relay R750 in the repeater 700 interrupts, at the contacts 752, the circuit for energizing the winding of the hold relay R760 in order to cause the latter relay to restore shortly thereafter, it being of the slow-to-release type. Also the simplex relay R750 interrupts, at the contacts 751, the loop circuit extending to the combination connector 707; whereby the supervisory relay R740 is restored. Upon restoring the supervisory relay R740 interrupts, at the contacts 741, the circuit for retaining operated the the control relay R745. Upon restoring the hold relay R760 interrupts, at the contacts 761, the circuit for retaining operated the cut-off relay R770 and the multiple circuit for energizing the upper winding of the supervisory relay R740. Upon restoring the cut-off relay R770 interrupts, at the contacts 777, the path for applying ground potential to the control conductor C718 of the trunk 715; and recompletes, at the contacts 778, the normal path for applying battery potential by way of the associated resistor to the control conductor C718; whereby the trunk 715 is marked as idle to the selectors 706, etc., having access thereto. When the loop circuit extending from the repeater 700 to the combination connector 707 is thus interrupted, the combination connector 707 is released effecting the release of the selector 706 and the finder 705; whereby the line circuit 703 is governed to mark the subscriber line 702 as idle to the combination connectors 707, etc., having access thereto. At this time, the established connection between the calling toll board 410 in the distant office 20 and the called subscriber substation T701 in the C. A. X 40 is released and all of the apparatus involved therein is completely released and available for further use.

Reconsidering the extension of the call from the calling toll board 410 in the distant office 20 to the called subscriber substation T701 in the C. A. X 40, it is noted that when the repeater 700 is seized over the trunk line 710, it returns high resistance battery potential over the simplex of the trunk line 710 as a delay-in-send signal prior to operation of the finder 706 to find the trunk 720 extending from the repeater 700. When the finder 705 finds the trunk 720 extending from the repeater 700, the repeater 700 operates to return low resistance battery potential over the simplex of the trunk line 710 as a ready signal. These signals are repeated by the toll line circuit 600 over the trunk 630, the incoming selector 416, and the trunk 415 to the repeater 414; which repeater 414 repeats the signals over the toll line 413 to the repeater 412; which repeater 412 repeats the signals over the trunk 411 to the calling toll board 410 in the distant office 20. Accordingly, after the selector 706 responds to the digit transmitted thereto, should it encounter an all-trunks-busy condition, it operates to reverse 60 times per minute the polarity of the trunk 720. Likewise, in the event the combination connector 707 tests the subscriber line 702 extending to the called subscriber station T701 as busy, it operates to reverse 120 times per minute the polarity of the trunk 720. The supervisory relay R740 follows the reversal of polarity of the trunk 720, repeating to the control relay R745; whereby corresponding high and low resistance battery impulses are transmitted over the simplex of the trunk line 710 and repeated by the toll line circuit 600 and the repeaters 414 and 412 to the toll board 410. Accordingly, either an all-trunks-busy signal or a line-busy signal may be repeated to the calling toll board 410 in the distant office in accordance with the respective conditions noted; whereupon the operator at the calling toll board 410 effects the release of the apparatus involved. In passing, it is noted that the incoming selector 416 may also encounter an all-trunks-busy condition when all of the trunks, including the trunk 630 are busy incident to operation thereof; whereby the incoming selector 416 operates to transmit an all-trunks-busy signal of 60 impulses per minute over the trunk 415; which signal is repeated by the repeaters 414 and 412 to the calling toll board 410 in an identical manner. In this case, the operator at the calling toll board 410 releases the operated apparatus upon receiving the all-trunks-busy signal mentioned.

*Sect. 11.—Calls between the toll board 50 in the central office 10 and the toll board 201 in the remote office 30*

First assuming that a call is to be extended from the first operator position at the toll board 50 in the central office 10 to the toll board 201 in the remote office 30, the operator after connecting an idle one of the cord circuits, such for example, as the cord circuit #1 to the associated position circuit 500, next selects an idle toll line, such for example, as the toll line 205 and then inserts the front plug P302 thereof into the terminating jack J310. The toll line 205 is indicated as being idle by the extinguished busy lamp L312 and when the front plug P302 is inserted into the terminating jack J310, the ring-down toll line circuit 204 is governed to illuminate the busy lamp L312 indicating the busy condition of the toll line 203 at this time. The operator then operates the ring front key K316 in the cord circuit #1; whereby ground and battery potentials are respectively connected, at the third and seventh contacts thereof, to the tip and the ring of the front plug P302 effecting operation of the ring-down toll line circuit 204 to project ringing current over the toll line 203. The ringing current projected over the toll line 203 effects operation of the ring-down toll line circuit 202; whereby a signal is transmitted over the associated trunk to the toll board 201 in the remote office 30. The operator at the first position at the toll board 50 then restores the ring front key K316; and when the operator at the toll board 201 answers the call, the ring-down toll line circuit 202 and the ring-down toll line circuit 204 switch through to complete a connection between the calling first operator position at the toll board 50 in the central office 10 and the called toll board 201 in the remote office 30.

Subsequently, after the connection has been extended by the operator at the toll board 201 and the operator at the first position at the toll board 50 has retired from the established connection, the operator at the first position at the toll board 50 receives disconnect supervision over the sleeve of the jack J310 effecting operation of the front supervisory lamp L304. The operator at the first position at the toll board 50 then withdraws the front plug P302 of the cord circuit #1 from the jack J310; whereby the ring-down toll line circuit 204 is controlled over the trunk 205 to govern over the toll line 203 the ring-down toll line circuit 202; whereby a disconnect signal is transmitted over the associated trunk to the operator at the toll board 201. The operator at the toll board 201 then takes down the connection; whereby the ring-down toll line circuit 202 is governed over the associated trunk to control the ring-down toll line circuit 204 over the toll line 203; whereupon the ring-down toll line circuit 204 extinguishes the busy lamp L312 indicating the idle condition of the toll line 203 at this time.

The extension of a call from the calling toll board 201 in the remote office 30 to the called first operator position at the toll board 50 in the central office 10 proceeds in a substantially identical manner. In this case, after the operator at the calling toll board 201 selects a trunk extending to an idle ring-down toll line circuit, such for example, as the ring-down toll line cirsuit 202, she operates her key equipment; whereby the ring-down toll line circuit 202 causes ringing current to be projected over the toll line 203 effecting operation of the ring-down toll line circuit 204; whereby the answer lamps L311 and L312 are illuminated. The answer lamp L311 indicates that a call is waiting to be answered on the trunk 205 extending to the ring-down toll line circuit 204 terminating the toll line 203; whereas the illuminated busy lamp L312 indicates the busy condition of the toll line 203 at this time. The operator at the first position at the toll board 50 may answer the call first by connecting an idle cord circuit, such for example, as the cord circuit #1 to the associated position circuit 500 and then by inserting one of the plugs of the cord circuit #1 into the terminating jack J310. As previously noted, the rear plug P301 of the cord circuit #1 is normally utilized for answering purposes since it is more convenient as the sender apparatus is normally arranged to send over the front plug P302 without operation of the send rear key K564; all in the manner previously explained. When the rear plug P301 of the cord circuit #1 is inserted into the terminating jack J310, the ring-down toll line circuit 204 is controlled over the trunk 205 to extinguish the answer lamp L311 indicating that the call on the toll line 203 has been answered. At this time an established connection is completed between the calling toll board 201 in the remote office 30 and the called first operator position at the toll board 50 in the central office 10. The subsequent handling of the call and the ultimate release of the established connection are the same as described above; the ultimate release taking place when the operator at the first position at the toll board 50 withdraws the rear plug P301 of the cord circuit #1 from the terminating jack J310.

*Sect. 12.—Conclusions*

In view of the foregoing, it is apparent that there has been provided a toll switching telephone system, including an operator switchboard of the cord circuit type, comprising improved register-sender apparatus and improved facility for setting up and for supervising connections.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including automatic switching apparatus, a trunk associated with said switching apparatus, an operator switchboard provided with a cord circuit terminating in a plug and a jack terminating said trunk and a digit set, a register, means controllable from said switchboard for connecting said digit set to said register, means including said digit set for registering digits in said register, a sender operative to send digits corresponding to the digits registered in said register and to clear the corresponding digits from said register, means responsive to the registration of a digit in said register for connecting said sender to said cord circuit, means responsive to the connection of said sender to said cord circuit only in the event said plug is in said jack for initiating sending operation of said sender, means controllable from said switchboard after all of the digits have been registered in said register for disconnecting said digit set therefrom, and means responsive to the clearing of all of the digits registered in said register for arresting operation of said sender and for disconnecting it from said cord circuit.

2. In a telephone system including automatic switching apparatus, a trunk associated with said switching apparatus, an operator switchboard provided with a cord circuit terminating in a plug and a jack terminating said trunk and a digit set, a register, means controllable from said switchboard for connecting said digit set to said register, means including said digit set for registering digits in said register, a sender operative to send digits corresponding to the digits registered in said register and to clear the corresponding digits from said register, means responsive to the registration of a digit in said register for connecting said sender to said cord circuit, means responsive to the connection of said sender to said cord circuit only in the event said plug is in said jack for initiating sending operation of said sender, means controllable from said switchboard after all of the digits have been registered in said register for disconnecting said digit set therefrom and for conditioning said sender for release, means responsive to the clearing of all of the digits registered in said register for arresting operation of said sender, means responsive to the arresting of operation of said sender for releasing it in the event it is conditioned for release, and means responsive to the release of said sender for disconnecting it from said cord circuit.

3. In a telephone system including automatic switching apparatus, a trunk associated with said switching apparatus, an operator switchboard provided with a position circuit and a cord circuit terminating in a plug and a jack terminating said trunk and a digit set, means controllable from said switchboard for connecting and for disconnecting said cord circuit with respect to said position circuit, a register, means responsive to the connection of said cord circuit to said position circuit for connecting said digit set to said register, means including said digit set for registering digits in said register, a sender operative to send digits corresponding to the digits registered in said register and to clear the corresponding digits from said register, means responsive to the registration of a digit in said register for connecting said sender to said cord circuit for holding said connection between said digit set and said register, whereby said cord circuit may be disconnected from said position circuit without interrupting said connection between said digit set and said register, means responsive to the connection of said sender to said cord circuit only in the event said plug is in said jack for initiating sending operation of said sender, means controllable from said switchboard after all of the digits have been registered in said register for interrupting said connection between said digit set and said register, and means responsive to the clearing of all of the digits registered in said register for arresting operation of said sender and for disconnecting it from said cord circuit.

4. In a telephone system including automatic switching apparatus, a trunk associated with said switching apparatus, an operator switchboard provided with a cord circuit terminating in front and rear plugs and a jack terminating said trunk and a digit set, means controllable from said switchboard for selecting either said front plug or said rear plug, a register, means controllable from said switchboard for connecting said digit set to said register, means including said digit set for registering digits in said register, a sender operative to send digits corresponding to the digits registered in said register and to clear the corresponding digits from said register, means responsive to the registration of a digit in said register for connecting said sender to the selected one of said plugs, means responsive to the connection of said sender to said selected one plug only in the event said selected one plug is in said jack for initiating sending operation of said sender, means controllable from said switchboard after all of the digits have been registered in said register for disconnecting said digit set therefrom, and means responsive to the clearing of all of the digits registered in said register for arresting operation of said sender and for disconnecting it from said selected one plug.

5. In a telephone system including automatic switching apparatus, a trunk associated with said switching apparatus, an operator switchboard provided with a position circuit and a plurality of cord circuits terminating in plugs and a jack terminating said trunk and a digit set, means controllable from said switchboard for connecting and for disconnecting any one of said cord circuits with respect to said position circuit, a register, means responsive to the connection of one of said cord circuits to said position circuit for preventing the connection of the other of said cord circuits to said position circuit and for connecting said digit set to said register, means including said digit set for registering digits in said register, a sender operative to send digits corresponding to the digits registered in said register and to clear the corresponding digits from said register, means responsive to the registration of a digit in said register for connecting said sender to said one cord circuit and for initiating operation of said sender and for holding said connection between said digit set and said register, whereby said one cord circuit may be disconnected from said position circuit without interrupting said connection between said digit set and said register, means controllable from said switchboard after all of the digits have been registered in said register for interrupting said connection between said digit set and said register, and means responsive to the clearing of all of the digits registered in said register for arresting operation of said sender and for disconnecting it from said one cord circuit.

6. In a telephone system including automatic switching apparatus, a trunk associated with said switching apparatus, an operator switchboard provided with a position circuit and a cord circuit terminating in a plug and a jack terminating said trunk and a digit set, means controllable from said switchboard for connecting and for disconnecting said cord circuit with respect to said position circuit, two registers, means responsive to the connection of said cord circuit to said position circuit for connecting said digit set to one of said registers, means including said digit set for registering digits in the connected one of said registers, two senders respectively associated with said two registers, each of said senders being operative to send digits corresponding to the digits registered in the associated register and to clear the corresponding digits from the associated register, means responsive to the registration of a digit in said one register for connecting the associated one of said senders to said cord circuit and for initiating operation of said one sender and for holding said connection between said digit set and said one register, whereby said cord circuit may be disconnected from said position circuit without interrupting said connection between said digit set and said one register, means controllable from said switchboard after all of the digits have been registered in said one register for interrupting said connection between said digit set and said one register, and means responsive to the clearing of all of the digits registered in said one register for arresting operation of said one sender and for disconnecting it from said cord circuit, and means responsive to the next connection of said cord circuit to said position circuit for connecting said digit set to the other of said registers.

7. In a telephone system including automatic switching apparatus, a trunk associated with said switching apparatus, an operator switchboard provided with a link circuit and means for connecting said link circuit to said trunk, and a register controllable from said switchboard to register digits; a sender comprising mechanism normally operative through a preliminary timing cycle and then alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said link circuit, and means governed by said preliminary timing cycle of said mechanism in the event said link circuit is disconnected from said trunk for clearing the digits registered in said register.

8. In a telephone system including automatic switching apparatus, a trunk associated with said switching apparatus, an operator switchboard provided with a cord circuit terminating in a plug and a jack terminating said trunk, and a register controllable from said switchboard to register digits; a sender comprising mechanism normally operative through a preliminary timing cycle and then alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said cord circuit, and means governed by said preliminary timing cycle of said mechanism in the event said plug is not in said jack for clearing the digits registered in said register.

9. In a telephone system including automatic switching apparatus, a trunk associated with said switching apparatus, an operator switchboard provided with a link circuit and means for connecting said link circuit to said trunk, and a register controllable from said switchboard to register digits; a sender provided with a set of counting relays normally operative through a preliminary counting cycle and then alternately through digit counting and inter-digit counting cycles, means controlled by operation of said set of counting relays through a given digit counting cycle for sending the corresponding digit registered in said register and then for clearing said corresponding digit from said register, means responsive to the registration of a digit in said register for initiating operation of said counting relays and for connecting said sender to said link circuit, and means governed by operation of said set of counting relays through said preliminary counting cycle in the event said link circuit is disconnected from said trunk for clearing the digits registered in said register.

10. In a telephone system including automatic switching apparatus, a trunk associated with said switching apparatus, an operator switchboard provided with a link circuit and means for connecting said link circuit to said trunk, and a register controllable from said switchboard to register digits; a sender comprising mechanism normally operative through a preliminary timing cycle and then alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said link circuit, a ready device operated jointly by the connection of said link circuit to said trunk and by the connection of said sender to said link circuit, and means governed jointly by failure of operation of said ready device and by said preliminary timing cycle of said mechanism for clearing the digits registered in said register.

11. In a telephone system including automatic switching apparatus, a trunk associated with said switching apparatus, an operator switchboard provided with a position circuit and a plurality of link circuits and means for connecting any one of said link circuits to said position circuit and means for connecting any one of said link circuits to said trunk, and a register controllable from said switchboard to register digits; a sender comprising mechanism normally operative through a preliminary timing cycle and then alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said position circuit, a ready device operated jointly by the connection of one of said link circuits to said position circuit and by the connection of said one link circuit to said trunk and by the connection of said sender to said position circuit, and means governed jointly by failure of operation of said ready device and by said preliminary timing cycle of said mechanism for clearing the digits registered in said register.

12. In a telephone system including automatic switching apparatus, a trunk associated with said switching apparatus, an operator switchboard provided with a link circuit and means for connecting said link circuit to said trunk, and a register controllable from said switchboard to register digits; a sender comprising mechanism operative alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said link circuit, means responsive to disconnection of said link circuit from said trunk for registering a disconnect signal, and means governed jointly by the registration of said disconnect signal and by the following inter-digit timing cycle of said mechanism for clearing the remaining digits registered in said register.

13. In a telephone system including automatic switching apparatus, a trunk associated with said switching apparatus, an operator switchboard provided with a cord circuit terminating in a plug and a jack terminating said trunk, and a register controllable from said switchboard to register digits; a sender comprising mechanism operative alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said cord circuit, means responsive to the withdrawal of said plug from said jack for registering a disconnect signal, and means governed jointly by the registration of said disconnect signal and by the following inter-digit timing cycle of said mechanism for clearing the remaining digits registered in said register.

14. In a telephone system including automatic switching apparatus, a trunk associated with said switching apparatus, an operator switchboard provided with a link circuit and means for connecting said link circuit to said trunk, and a register controllable from said switchboard to register digits; a sender provided with a set of counting relays operative alternately through digit counting and inter-digit counting cycles, means controlled by operation of said set of counting relays through a given digit counting cycle for sending the corresponding digit registered in said register and then for clearing said corresponding digit from said register, means responsive to the registration of a digit in said register for initiating operation of said counting relays and for connecting said sender to said link circuit, means responsive to disconnection of said link circuit from said trunk for registering a disconnect signal, and means governed jointly by the registration of said disconnect signal and by the following inter-digit counting cycle of said set of counting relays for clearing the remaining digits registered in said register.

15. In a telephone system including automatic switching apparatus, a trunk associated with said switching apparatus, an operator switchboard provided with a link circuit and means for connecting said link circuit to said trunk, and a register controllable from said switchboard to register digits; a sender comprising mechanism operative alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said link circuit, a ready device operated jointly by the connection of said link circuit to said trunk and by the connection of said sender to said link circuit, whereby said ready device is restored in the event said link circuit is disconnected from said trunk, and means governed jointly by restoration of said ready device and by the following inter-digit timing cycle of said mechanism for clearing the remaining digits registered in said register.

16. In a telephone system including automatic switching apparatus, a trunk associated with said switching apparatus, an operator switchboard provided with a position circuit and a plurality of link circuits and means for connecting any one of said link circuits to said position circuit and means for connecting any one of said link circuits to said trunk, and a register controllable from said switchboard to register digits; a sender comprising mechanism operative alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said position circuit, a ready device operated jointly by the connection of one of said link circuits to said position circuit and by the connection of said one link circuit to said trunk and by the connection of said sender to said position circuit, whereby said ready device is restored in the event said one link circuit is disconnected from said trunk, and means governed jointly by restoration of said ready device and by the following inter-digit timing cycle of said mechanism for clearing the remaining digits registered in said register.

17. In a telephone system including automatic switching apparatus, a trunk associated with said switching apparatus, an operator switchboard provided with a link circuit and means for connecting said link circuit to said trunk, and a register controllable from said switchboard to register digits; a sender comprising mechanism operative alternately through sending and inter-digit timing cycles, means controlled by operation of said mechanism through a given sending cycle for sending the corresponding digit registered in said register and then for clearing said corresponding digit from said register, means responsive to the registration of a digit in said register for initiating operation of said mechanism and for connecting said sender to said link circuit, means responsive to the clearing of all of the digits registered in said register for disconnecting said sender from said link circuit, means controllable from said switchboard for registering a release signal, and means governed jointly by the registration of said release signal and by the following inter-digit timing cycle of said mechanism for disconnecting said sender from said link circuit and for clearing the remaining digits registered in said register.

18. In a telephone system including automatic switching apparatus, a trunk associated with said switching apparatus, an operator switchboard provided with a link circuit and means for connecting said link circuit to said trunk, and a register controllable from said switchboard to register digits; a sender provided with a set of counting relays operative alternately through digit counting and inter-digit counting cycles, means controlled by operation of said set of counting relays through a given digit counting cycle for sending the corresponding digit registered in said register and then for clearing said corresponding digit from said register, means responsive to the registration of a digit in said register for initiating operation of said mechanism and for connecting said sender to said link circuit, means responsive to the clearing of all of the digits registered in said register for disconnecting said sender from said link circuit, means controllable from said switchboard for registering a release signal, and means governed jointly by the registration of said release signal and by the following inter-digit counting cycle of said set of counting relays for disconnecting said sender from said link circuit and for clearing the remaining digits registered in said register.

19. In a telephone system including automatic switching apparatus, a trunk associated with said switching apparatus, an operator switchboard provided with a link circuit and means for connecting said link circuit to said trunk, first and second register-senders, means controllable from said switchboard for registering digits in a connected one of said register-senders, means controllable from said switchboard for transmitting a disconnect signal to a connected one of said register-senders after all of the digits have been registered therein, means controllable from said switchboard for transmitting a release signal to a connected one of said register-senders before all of the digits have been registered therein, means responsive to the registration of digits in one of said register-senders for connecting it to said link circuit and for operating it to send corresponding digits, means governed jointly by said disconnect signal and by the sending of all of the digits registered in one of said register-senders for disconnecting it from said link circuit, timing means responsive to said release signal for arresting sending operation of one of said register-senders and then after a time interval for disconnecting it from both said switchboard and said link circuit, means for connecting one of said register-senders to said switchboard, and means responsive to the subsequent disconnection of said one register-sender from said switchboard for connecting the other of said register-senders to said switchboard.

20. In a telephone system including automatic switching apparatus for setting up connections, a directively controllable register operative to register digits indicative of routes of connections through said switching apparatus, and a sender normally operative to send switch directing signals to said switching apparatus corresponding to the digits registered in said register, said switching apparatus including means governed when it is not ready to receive a switch directing signal for returning a delay signal and governed when it is ready to receive a switch directing signal for returning a ready signal; said sender comprising mechanism capable of operation through either sending or timing cycles, means for initiating operation of said mechanism through a preliminary timing cycle, means responsive jointly to the return of said ready signal and to the completion of said preliminary timing cycle of said mechanism for initiating the first sending cycle thereof, means responsive jointly to the return of said delay signal and to the completion of said preliminary timing cycle of said mechanism for initiating an additional timing cycle thereof, and means responsive jointly to the return of said ready signal and to the completion of said additional timing cycle of said mechanism for initiating said first sending cycle thereof.

21. In a telephone system including automatic switching apparatus for setting up connections, a directively controllable register operative to register digits indicative of routes of connections through said switching apparatus, and a sender normally operative to send switch directing signals to said switching apparatus corresponding to the digits registered in said register, said switching apparatus including means governed when it is not ready to receive a switch directing signal for returning a delay signal and governed when it is ready to receive a switch directing signal for returning a ready signal; said sender comprising mechanism capable of operation through either sending or timing cycles, means for initiating operation of said mechanism through a preliminary timing cycle, means responsive jointly to the return of said ready signal and to the completion of said preliminary timing cycle of said mechanism for initiating the first sending cycle thereof, means responsive jointly to the return of said delay signal and to the completion of said preliminary timing cycle of said mechanism for initiating an additional timing cycle thereof, means responsive jointly to the return of said ready signal and to the completion of said additional timing cycle of said mechanism for initiating said first sending cycle thereof, and means responsive jointly to the continued return of said delay signal and to the completion of said additional timing cycle of said mechanism for arresting further operation thereof and for producing a blocked sender signal.

22. In a telephone system including automatic switching apparatus for setting up connections, a directively controllable register operative to register digits indicative of routes of connections through said switching apparatus, and a sender normally operative to send switch directing signals to said switching apparatus corresponding to the digits registered in said register, said switching apparatus including means governed when it is not ready to receive a switch directing signal for returning a delay signal and governed when it is ready to receive a switch directing signal for returning a ready signal; said sender comprising mechanism capable of operation through either sending or timing cycles, means for operating said mechanism through a given sending cycle and then for initiating an inter-digit timing cycle thereof, means responsive jointly to the return of said ready signal and to the completion of said inter-digit timing cycle of said mechanism for initiating another sending cycle thereof, means responsive jointly to the return of said delay signal and to operation of said mechanism in said inter-digit timing cycle thereof for extending the operation of said mechanism through a full timing cycle thereof, and means responsive jointly to the return of said ready signal and to the completion of said full timing cycle of said mechanism for initiating said other sending cycle thereof.

23. In a telephone system including automatic switching apparatus for setting up connections, a directively controllable register operative to register digits indicative of routes of connections through said switching apparatus, and a sender normally operative to send switch directing signals to said switching apparatus corresponding to the digits registered in said register, said switching apparatus including means governed when it is not ready to receive a switch directing signal for returning a delay signal and governed when it is ready to receive a switch directing signal for returning a ready signal; said sender comprising mechanism capable of operation through either sending or timing cycles, means for operating said mechanism through a given sending cycle and then for initiating an inter-digit timing cycle thereof, means responsive jointly to the return of said ready signal and to the completion of said inter-digit timing cycle of said mechanism for initiating another sending cycle thereof, means responsive jointly to the return of said delay signal and to operation of said mechanism in said inter-digit timing cycle thereof for extending the operation of said mechanism through a full timing cycle thereof, means responsive jointly to the return of said ready signal and to the completion of said full timing cycle of said mechanism for initiating said other sending cycle thereof, means responsive jointly to the continued return of said delay signal and to the completion of said full timing cycle of said mechanism for initiating an additional full timing cycle thereof, and means responsive jointly to the return of said ready signal and to the completion of said additional full timing cycle of said mechanism for initiating said other sending cycle thereof.

24. In a telephone system including automatic switching apparatus for setting up connections, a directly controllable register operative to register digits indicative of routes of connections through said switching apparatus, and a sender normally operative to send switch directing signals to said switching apparatus corresponding to the digits registered in said register, said switching apparatus including means governed when it is not ready to receive a switch directing signal for returning a delay signal and governed when it is ready to receive a switch directing signal for returning a ready signal; said sender comprising mechanism capable of operation through either sending or timing cycles, means for operating said mechanism through a given sending cycle and then for initiating an inter-digit timing cycle thereof, means responsive jointly to the return of said ready signal and to the completion of said inter-digit timing cycle of said mechanism for initiating another sending cycle thereof, means responsive jointly to the return of said delay signal and to operation of said mechanism in said inter-digit timing cycle thereof for extending the operation of said mechanism through a full timing cycle thereof, means responsive jointly to the return of said ready signal and to the completion of said full timing cycle of said mechanism for initiating said other sending cycle thereof, means responsive jointly to the continued return of said delay signal and to the completion of said full timing cycle of said mechanism for initiating an additional full timing cycle thereof, and means responsive to the continued return of said delay signal and to the completion of said additional full timing cycle of said mechanism for arresting further operation thereof and for producing a blocked sender signal.

25. In a telephone system including automatic switching apparatus for setting up connections, a directively controllable register operative to register digits indicative of routes of connections through said switching apparatus, and a sender normally operative to send switch directing signals to said switching apparatus corresponding to the digits registered in said register, said switching apparatus including means governed when it is not ready to receive a switch directing signal for returning a delay signal and governed when it is ready to receive a switch directing signal for returning a ready signal; said sender comprising mechanism capable of operation through either sending or timing cycles, means for operating said mechanism through a given sending cycle and then for initiating an inter-digit timing cycle thereof, means responsive jointly to the return of said ready signal and to the completion of said inter-digit timing cycle of said mechanism for initiating another sending cycle thereof, means responsive jointly to the return of said delay signal and to operation of said mechanism in said inter-digit timing cycle thereof for extending the operation of said mechanism through a full timing cycle thereof, means responsive jointly to the return of said ready signal and to the completion of said full timing cycle of said mechanism for initiating said other sending cycle thereof, means responsive jointly to the continued return of said delay signal and to the completion of said full timing cycle of said mechanism for initiating an additional full timing cycle thereof, means responsive jointly to the return of said ready signal and to the completion of said additional full timing cycle of said mechanism for initiating said other sending cycle thereof, and means responsive to the continued return of said delay signal and to the completion of said additional full timing cycle of said mechanism for arresting further operation thereof and for producing a blocked sender signal.

26. In a telephone system including automatic switching apparatus for setting up connections, a directively controllable register operative to register digits indicative of routes of connections through said switching apparatus, and a sender normally operative to send switch directing signals to said switching apparatus corresponding to the digits registered in said register and to clear the corresponding digits registered in said register, said switching apparatus including means governed when it is not ready to receive a switch directing signal for returning a delay signal and governed when it is ready to receive a switch directing signal for returning a ready signal and governed when a busy condition is encountered thereby for returning a busy signal; said sender comprising mechanism capable of operation through either sending or timing cycles, means for operating said mechanism through a given sending cycle and then for initiating an inter-digit timing cycle thereof, means responsive jointly to the return of said ready signal and to the completion of said inter-digit timing cycle of said mechanism for initiating another sending cycle of said mechanism, means responsive jointly to the return of said delay signal and to operation of said mechanism in said inter-digit timing cycle thereof for extending the operation of said mechanism through a full timing cycle thereof, means responsive jointly to the return of said ready signal and to the completion of said full timing cycle of said mechanism for initiating said other sending cycle thereof, and means responsive to the return of said busy signal for clearing the remaining digits registered in said register.

27. In a telephone system including automatic switching apparatus for setting up connections, a directively controllable register operative to register digits indicative of routes of connections through said switching apparatus, and a sender normally operative to send switch directing signals to said switching apparatus corresponding to the digits registered in said register and to clear the corresponding digits registered in said register, said switching apparatus including means governed when it is not ready to receive a switch directing signal for returning a delay signal and governed when it is ready to receive a switch directing signal for returning a ready signal and governed when a busy condition is encountered thereby for returning a busy signal; said sender comprising mechanism capable of operation through either sending or timing cycles, means for operating said mechanism through a given sending cycle and then for initiating an inter-digit timing cycle thereof, means responsive jointly to the return of said ready signal and to the completion of said inter-digit timing cycle of said mechanism for initiating another sending cycle of said mechanism, means responsive jointly to the return of said delay signal and to operation of said mechanism in said inter-digit timing cycle thereof for extending the operation of said mechanism through a full timing cycle thereof, means responsive jointly to the return of said ready signal and to the completion of said full timing cycle of said mechanism for initiating said other sending cycle thereof, means responsive jointly to the continued return of said delay signal and to the completion of said full timing cycle of said mechanism for initiating an additional full timing cycle thereof, means responsive to the continued return of said delay signal and to the completion of said additional full timing cycle of said mechanism for arresting further operation thereof and for producing a blocked sender signal, and means responsive to the return of said busy signal for clearing the remaining digits registered in said register.

28. In a telephone system, a trunk, an operator switchboard provided with a link circuit and means for connecting said link circuit to said trunk, automatic switching apparatus, means responsive to the connection of said link circuit to said trunk for immediately returning a delay signal over said trunk and for initiating the connection of said trunk to said switching apparatus, means responsive to the connection of said trunk to said switching apparatus for returning a ready signal over said trunk, a register controllable from said switchboard to register digits, a sender normally operative to send over said link circuit switch directing signals corresponding to the digits registered in said register, and means responsive to the return of said delay signal over said trunk for preventing said sending operation of said sender and responsive to the return of said ready signal over said trunk for permitting said sending operation of said sender.

29. In a telephone system, a trunk, an operator switchboard provided with a link circuit and means for connecting said link circuit to said trunk, automatic switching apparatus, means responsive to the connections of said link circuit to said trunk for returning a delay signal over said trunk and for initiating the connection of said trunk to said switching apparatus, means responsive to the connection of said trunk to said switching apparatus for returning a ready signal over said trunk, a register controllable from said switchboard to register digits, a sender normally operative to send over said link circuit switch directing signals corresponding to the digits registered in said register, a timer, means responsive to the return of said delay signal over said trunk for initiating a predetermined timing operation of said timer, means responsive jointly to the return of said ready signal over said trunk and to the completion of said predetermined timing operation of said timer for arresting said timing operation of said timer, and means governed during said timing operation of said timer for preventing said sending operation of said sender.

30. In a telephone system, a trunk, automatic switching apparatus associated with said trunk, a link circuit provided with a pair of line conductors and a control conductor, means for connecting said link circuit to said trunk and for imposing a hold signal upon said control conductor, whereby said switching apparatus is seized and held, a directively controllable register operative to register digits indicative of routes of connections through said switching apparatus, a sender, means for connecting said sender to said line conductors, said sender being normally operative to send switch directing signals corresponding to the digits registered in said register, said switching apparatus including means governed when it is not ready to receive a switch directing signal for immediately returning a delay signal over said trunk and governed when it is ready to receive a switch directing signal for immediately returning a ready signal over said trunk, means responsive to respective delay and ready signals returned over said trunk for superimposing respective delay and ready signals upon said control conductor, and means responsive to said delay signal on said control conductor for preventing said sending operation of said sender and responsive to said ready signal on said control conductor for permitting said sending operation of said sender.

31. In a telephone system, a trunk, automatic switching apparatus associated with said trunk, a link circuit provided with a pair of line conductors and a control conductor, means for connecting said line circuit to said trunk and for imposing a hold signal upon said control conductor, whereby said switching apparatus is seized and held, a directively controllable register operative to register digits indicative of routes of connections through said switching apparatus, a sender, means for connecting said sender to said line conductors, said sender being normally operative to send switch directing signals corresponding to the digits registered in said register and to clear the corresponding digits registered in said register, said switching apparatus including means governed when it is not ready to receive a switch directing signal for returning a delay signal over said trunk and governed when it is ready to receive a switch directing signal for returning a ready signal over said trunk and governed when a busy condition is encountered thereby for returning a busy signal over said trunk, means responsive to respective delay and ready and busy signals returned over said trunk for superimposing respective delay and ready and busy signals upon said control conductor, means responsive to said delay signal on said control conductor for preventing said sending operation of said sender and responsive to said ready signal on said control conductor for permitting said sending operation of said sender, and means responsive to said busy signal on said control conductor for clearing the remaining digits registered in said register.

32. In a telephone system including a trunk line, first and second trunk circuits terminating the opposite ends of said trunk line, a link having access to said first trunk circuit, a trunk terminated by said second trunk circuit, and automatic switching apparatus associated with said trunk; means included in said first trunk circuit and responsive to the connection of said link thereto for returning a delay signal over said link and for placing a seizure signal on said trunk line, means included in said second trunk circuit and responsive to said seizure signal on said trunk line for initiating the connection of said switching apparatus to said trunk, additional means included in said second trunk circuit and responsive to the connection of said switching apparatus to said trunk for superimposing a ready signal on said trunk line, additional means included in said first trunk circuit and responsive to said ready signal on said trunk line for returning a ready signal over said link, further means included in said first trunk circuit and responsive to a digit received over said link for repeating the digit over said trunk line, and further means included in said second trunk circuit and responsive to a digit received over said trunk line for repeating the digit over said trunk to said switching apparatus.

33. In a telephone system including a trunk line, first and second truck circuits terminating the opposite ends of said trunk line, a link having access to said first trunk circuit, a trunk terminated by said second trunk circuit, and automatic switching apparatus associated with said trunk; means included in said first trunk circuit and responsive to the connection of said link thereto for returning a delay signal over said link and for placing a seizure signal on said trunk line, means included in said second trunk circuit and responsive to said seizure signal on said trunk line for initiating the connection of said switching apparatus to said trunk, additional means included in said second trunk circuit and responsive to the connection of said switching apparatus to said trunk for superimposing a ready signal on said trunk line, additional means included in said first trunk circuit and responsive to said ready signal on said trunk line for returning a ready signal over said link, further means included in said first trunk circuit and responsive to a digit received over said link for repeating the digit over said trunk line, further means included in said second trunk circuit and responsive to a digit received over said trunk line for repeating the digit over said trunk to said switching apparatus, and means governed by an operation of said switching apparatus requiring an interval of time for applying a delay signal to said trunk and then after such operation for applying a ready signal to said trunk, said additional means included in said second trunk circuit being responsive to said delay and ready signals on said trunk to superimpose respective delay and ready signals on said trunk line, said additional means included in said first trunk circuit being responsive to said delay and ready signals on said trunk line to return respective delay and ready signals over said link.

34. In a telephone system including a trunk line, first and second trunk circuits terminating the opposite ends of said trunk line, a link having access to said first trunk circuit, a trunk terminated by said second trunk circuit, and automatic switching apparatus associated with said trunk; means included in said first trunk circuit and responsive to the connection of said link thereto for returning a delay signal over said link and for placing a seizure signal on said trunk line, means included in said second trunk circuit and responsive to said seizure signal on said trunk line for initiating the connection of said switching apparatus to said trunk, additional means included in said second trunk circuit and responsive to the connection of said switching apparatus to said trunk for superimposing a ready signal on said trunk line, additional means included in said first trunk circuit and responsive to said ready signal on said trunk line for returning a ready signal over said link, further means included in said first trunk circuit and responsive to a digit received over said link for repeating the digit over said trunk line, further means included in said second trunk circuit and responsive to a digit received over said trunk line for repeating the digit over said trunk to said switching apparatus, and means governed by operation of said switching apparatus to encounter a busy condition for applying a busy signal to said trunk, said additional means included in said second trunk circuit being responsive to said busy signal on said trunk to superimpose a busy signal on said trunk line, said additional means included in said first trunk circuit being responsive to said busy signal on said trunk line to return a busy signal over said link.

35. In a telephone system including a trunk line, first and second trunk circuits terminating the opposite ends of said trunk line, a link having access to said first trunk circuit, a trunk terminated by said second trunk circuit, and automatic switching apparatus associated with said trunk; said first trunk circuit including a control relay of the marginal type, said second trunk circuit including a simplex relay and a supervisory relay of the polarized type, means responsive to the connection of said link to said first trunk circuit for returning a delay signal over said link and for completing a first high resistance circuit including the simplex of said trunk line for energizing in series said control relay and said simplex relay, whereby said control relay is not operated and said simplex relay is operated, means responsive to operation of said simplex relay for completing a second circuit including said trunk for energizing said supervisory relay, whereby said supervisory relay is not poled to operate, means responsive to the completion of said second circuit for initiating the conditioning of said switching apparatus to be operated, means responsive to the conditioning of said switching apparatus to be operated for reversing the polarity of said second circuit, whereby said supervisory relay is poled to operate, means responsive to operation of said supervisory relay for decreasing the resistance of said first circuit, whereby said control relay is operated, means responsive to operation of said control relay for returning a ready signal over said link, means responsive to a digit received over said link for repeating the digit over said trunk line, and means responsive to a digit received over said trunk line for repeating the digit over said trunk to said switching apparatus.

36. In a telephone system including a trunk line, first and second trunk circuits terminating the opposite ends of said trunk line, a link having access to said first trunk circuit, a trunk terminated by said second trunk circuit, and automatic switching apparatus associated with said trunk; said first trunk circuit including a control relay of the marginal type, said second trunk circuit including a simplex relay and a supervisory relay of the polarized type, means responsive to the connection of said link to said first trunk circuit for returning a delay signal over said link and for completing a first high resistance circuit including the simplex of said trunk line for energizing in series said control relay and said simplex relay, whereby said control relay is not operated and said simplex relay is operated, means responsive to operation of said simplex relay for completing a second circuit including said trunk for energizing said supervisory relay, whereby said supervisory relay is not poled to operate, means responsive to the completion of said second circuit for initiating the conditioning of said switching apparatus to be operated, means responsive to the conditioning of said switching apparatus to be operated for reversing the polarity of said second circuit, whereby said supervisory relay is poled to operate, means responsive to operation of said supervisory relay for decreasing the resistance of said first circuit, whereby said control relay is operated, means responsive to operation of said control relay for returning a ready signal over said link, means responsive to a digit received over said link for repeating the digit over said trunk line, means responsive to a digit received over said trunk line for repeating the digit over said trunk to said switching apparatus, means governed by an operation of said switching apparatus requiring an interval of time for restoring the polarity of said second circuit and then after such operation for reversing the polarity of said second circuit, whereby said supervisory relay is poled to restore and is then poled to operate, means responsive to restoration and then to reoperation of said supervisory relay for restoring and then for decreasing the resistance of said first circuit, whereby said control relay restores and then reoperates, and means responsive to restoration and then to reoperation of said control relay for returning a relay signal and then for returning a ready signal over said link.

37. In a telephone system including a trunk line, first and second trunk circuits terminating the opposite ends of said trunk line, a link having access to said first trunk circuit, a trunk terminated by said second trunk circuit, and automatic switching apparatus associated with said trunk; said first trunk circuit including a control relay of the marginal type, said second trunk circuit including a simplex relay and a supervisory relay of the polarized type, means responsive to the connection of said link to said first trunk circuit for returning a delay signal over said link and for completing a first high resistance circuit including the simplex of said trunk line for energizing in series said control relay and said simplex relay, whereby said control relay is not operated and said simplex relay is operated, means responsive to operation of said simplex relay for completing a second circuit including said trunk for energizing said supervisory relay, whereby said supervisory relay is not poled to operate, means responsive to the completion of said second circuit for initiating the conditioning of said switching apparatus to be operated, means responsive to the conditioning of said switching apparatus to be operated for reversing the polarity of said second circuit, whereby said supervisory relay is poled to operate, means responsive to operation of said supervisory relay for decreasing the resistance of said first circuit, whereby said control relay is operated, means responsive to operation of said control relay for returning a ready signal over said link, means responsive to a digit received over said link for repeating the digit over said trunk line, means responsive to a digit received over said trunk line for repeating the digit over said trunk to said switching apparatus, means governed by operation of said switching apparatus to encounter a busy condition for alternately restoring and reversing the polarity of said second circuit, whereby said supervisory relay follows, means responsive to following by said supervisory relay for alternately restoring and decreasing the resistance of said first circuit, whereby said control relay follows, and means responsive to following by said control relay for alternately returning delay and ready signals over said link, the alternate return of delay and ready signals over said link constituting a busy signal.

38. In a telephone system including a trunk line, first and second trunk circuits terminating the opposite ends of said trunk line, a first trunk terminated by said first trunk circuit, an operator position provided with a cord circuit terminating in a plug and a jack terminating said first trunk, a second trunk terminated by said second trunk circuit, and automatic switching apparatus associated with said second trunk; means included in said first trunk circuit and responsive to the insertion of said plug into said jack for returning a delay signal over said first trunk and said cord circuit and for placing a seizure signal on said trunk line, means included in said second trunk circuit and responsive to said seizure signal on said trunk line for initiating the connection of said switching apparatus to said second trunk, additional means included in said second trunk circuit and responsive to the connection of said switching apparatus to said second trunk for superimposing a ready signal on said trunk line, additional means included in said first trunk circuit and responsive to said ready signal on said trunk line for returning a ready signal over said first trunk and said cord circuit, further means included in said first trunk circuit and responsive to a digit received over said cord circuit and said first trunk for repeating the digit over said trunk line, and further means included in said second trunk circuit and responsive to a digit received over said trunk line for repeating the digit over said second trunk to said switching apparatus.

39. In a telephone system including a trunk line, first and second trunk circuits terminating the opposite ends of said trunk line, a first trunk terminated by said first trunk circuit, an automatic switch having access to said first trunk, a second trunk terminated by said second trunk circuit, and automatic switching apparatus associated with said second trunk; means included in said first trunk circuit and responsive to the seizure of said first trunk by said automatic switch for returning a delay signal over said first trunk and said automatic switch and for placing a seizure signal on said trunk line, means included in said second trunk circuit and responsive to said seizure signal on said trunk line for initiating the connection of said switching apparatus to said second trunk, additional means included in said second trunk circuit and responsive to the connection of said switching apparatus to said second trunk for superimposing a ready signal on said trunk line, additional means included in said first trunk circuit and responsive to said ready signal on said trunk line for returning a ready signal over said first trunk and said automatic switch, further means included in said first trunk circuit and responsive to a digit received over said automatic switch and said first trunk for repeating the digit over said trunk line, and further means included in said second trunk circuit and responsive to a digit received over said trunk line for repeating the digit over said second trunk to said switching apparatus.

40. In a telephone system including a trunk line, first and second trunk circuits terminating the opposite ends of said trunk line, a first trunk terminated by said first trunk circuit, an operator position provided with a cord circuit terminating in a plug and a jack terminating said first trunk, a second trunk terminated by said first trunk circuit, an automatic switch having access to said second trunk, a third trunk terminated by said second trunk circuit, and automatic switching apparatus associated with said third trunk; means included in said first trunk circuit and responsive to the insertion of said plug into said jack for returning a delay signal over said first trunk and said cord circuit and for placing a seizure signal on said trunk line and for busying said second trunk, means included in said first trunk circuit and responsive to seizure of said second trunk by said automatic switch for returning a delay signal over said second trunk and said automatic switch and for placing a seizure signal on said trunk line and for busying said first trunk, means included in said second trunk circuit and responsive to said seizure signal on said trunk line for initiating the connection of said switching apparatus to said third trunk, additional means included in said second trunk circuit and responsive to the connection of said switching apparatus to said third trunk for superimposing a ready signal on said trunk line, additional means included in said first trunk circuit and responsive to said ready signal on said trunk line for returning a ready signal over said first trunk and said cord circuit or over said second trunk and said automatic switch depending upon the route over which said first trunk circuit is seized, further means included in said first trunk circuit and responsive to a digit received over said cord circuit and said first trunk or over said automatic switch and said second trunk for repeating the digit over said trunk line, and further means included in said second trunk circuit and responsive to a digit received over said trunk line for repeating the digit over said third trunk to said switching apparatus.

HARVEY W. BALZER.

REFERENCES CITED

The following references are of record in the file of this patent:

UNITED STATES PATENTS

| Number | Name | Date |
|---|---|---|
| 2,353,212 | Balzer | July 11, 1944 |